(12) United States Patent
Ropel et al.

(10) Patent No.: US 12,545,274 B2
(45) Date of Patent: Feb. 10, 2026

(54) PEER-TO-PEER VEHICULAR PROVISION OF ARTIFICIALLY INTELLIGENT TRAFFIC ANALYSIS

(71) Applicant: Volvo Car Corporation, Gothenburg (SE)

(72) Inventors: Andreas Martin Viktor Ropel, Gothenburg (SE); Martin Arvid Hubert Krampell, Gothenburg (SE); Robert Gunnar Eriksson, Hålta (SE); Arsam Golriz, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 220 days.

(21) Appl. No.: 18/050,531

(22) Filed: Oct. 28, 2022

(65) Prior Publication Data

US 2024/0140459 A1 May 2, 2024

(51) Int. Cl.
*B60W 50/12* (2012.01)
*B60W 40/06* (2012.01)
(Continued)

(52) U.S. Cl.
CPC ............ *B60W 50/12* (2013.01); *B60W 40/06* (2013.01); *B60W 50/14* (2013.01); *G06V 20/58* (2022.01);
(Continued)

(58) Field of Classification Search
CPC ...... B60W 50/12; B60W 40/06; B60W 50/14; B60W 2050/146; B60W 2420/403;
(Continued)

(56) References Cited

U.S. PATENT DOCUMENTS

| 8,520,695 B1* | 8/2013 | Rubin | H04W 72/30 370/445 |
| 2019/0384303 A1* | 12/2019 | Muller | G08G 1/166 |

(Continued)

FOREIGN PATENT DOCUMENTS

| WO | 2016/123424 A1 | 8/2016 |
| WO | 2021118675 A1 | 6/2021 |

OTHER PUBLICATIONS

Anurag Arnab and Philip H.S. Torr, Pixelwise Instance Segmentation with a Dynamically Instantiated Network, University of Oxford, 441-446 (Year: 2017).*

(Continued)

*Primary Examiner* — Aniss Chad
*Assistant Examiner* — Chase L Cooley
(74) *Attorney, Agent, or Firm* — Amin, Turocy & Watson, LLP

(57) ABSTRACT

Systems/techniques that facilitate peer-to-peer vehicular provision of artificially intelligent traffic analysis are provided. In various embodiments, a system can be onboard a first vehicle. In various aspects, the system can capture, via one or more cameras, one or more microphones, or one or more other sensors of the first vehicle, roadside data associated with a road on which the first vehicle is traveling. In various instances, the system can execute a deep learning neural network on the roadside data, wherein the deep learning neural network can produce as output a classification label, a bounding box, or a pixel-wise segmentation mask localizing an unsafe driving condition along the road. In various cases, the system can transmit, via a peer-to-peer communication link to a second vehicle traveling on the road, an electronic alert based on the unsafe driving condition.

20 Claims, 38 Drawing Sheets

(51) Int. Cl.
 *B60W 50/14* (2020.01)
 *G06V 20/58* (2022.01)
 *G08G 1/01* (2006.01)
(52) U.S. Cl.
 CPC ..... *G08G 1/0116* (2013.01); *B60W 2050/146* (2013.01); *B60W 2420/403* (2013.01)
(58) Field of Classification Search
 CPC ........ G06V 20/58; G06V 10/82; G06V 20/54; G06V 10/764; G06V 20/588; G08G 1/0116; G08G 1/0133; G08G 1/0141; G08G 1/096716; G08G 1/162; G08G 1/165; G08G 1/166; G08G 1/0112; G08G 1/0125; G06N 3/045
 See application file for complete search history.

(56) References Cited

U.S. PATENT DOCUMENTS

| | | |
|---|---|---|
| 2020/0293796 A1 | 9/2020 | Sajjadi et al. |
| 2021/0063578 A1* | 3/2021 | Wekel ................... G01S 17/894 |
| 2021/0065551 A1 | 3/2021 | Manohar et al. |
| 2021/0097311 A1 | 4/2021 | McBeth et al. |
| 2022/0126864 A1* | 4/2022 | Moustafa ................ H04W 4/46 |
| 2022/0281456 A1* | 9/2022 | Giovanardi ........... B60W 30/09 |
| 2022/0388505 A1 | 12/2022 | Sharma Banjade et al. |
| 2023/0221942 A1* | 7/2023 | Zhang ..................... G06F 8/71 |
| | | 717/168 |

OTHER PUBLICATIONS

European Search Report for European Patent Application No. EP23205603 dated Mar. 22, 2024, 9 pages.
Razi et al., "Deep Learning Serves Traffic Safety Analysis: A Forward-looking Review," IET Intelligent Transport Systems, Published Aug. 27, 2022, pp. 22-71, vol. 17, Issue 1, https://doi.org/10.1049/itr2.12257.
Non-Final Office Action received for U.S. Appl. No. 18/050,534 dated Nov. 15, 2024, 46 pages.
Non-Final Office Action received for U.S. Appl. No. 18/050,525 dated Feb. 28, 2025, 23 pages.
Final Office Action received for U.S. Appl. No. 18/050,534 dated Apr. 1, 2025, 37 pages.
Communication pursuant to Article 94(3) EPC received for EP Patent Application Serial No. 23205603.6 dated Feb. 3, 27, 2025, 8 pages.
Yang et al., "Vehicle-to-vehicle Communication Based on a Peer-topeer Network with Graph Theory and Consensus Algorithm", IET Intelligent Transport Systems, The Institution of Engineering and Technology, vol. 13, Issue No. 2, 2019, pp. 280-285.
Ameur et al., "Peer-to-peer Overlay Techniques for Vehicular Ad Hoc Networks: Survey and Challenges", Vehicular Communications, vol. 34, Issue No. 100455, Jan. 25, 2022, 32 pages.
Yang et al., "Research on V2V Communication Based on Peer to Peer Network", 2018 International Conference on Intelligent Autonomous Systems, 2018, pp. 105-110.
Yang et al., "A Real-time Road Traffic Information System Based on a Peer-to-peer Approach", Computers and Communications, 2008, pp. 513-518.

* cited by examiner

PEER-TO-PEER VEHICULAR PROVISION OF ARTIFICIALLY INTELLIGENT TRAFFIC ANALYSIS

TECHNICAL FIELD

The subject disclosure relates generally to traffic analysis, and more specifically to peer-to-peer vehicular provision of artificially intelligent traffic analysis.

BACKGROUND

Many modern vehicles implement electronic navigation displays. An electronic navigation display usually renders navigation data provided by a cloud server. Unfortunately, the data provided by the cloud server can be unreliable.

Accordingly, systems or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate peer-to-peer vehicular provision of artificially intelligent traffic analysis are described.

According to one or more embodiments, a system is provided. The system can be onboard a vehicle, and the system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise a sensor component that can capture, via one or more external sensors of the vehicle, roadside data associated with a road on which the vehicle is traveling. In various aspects, the computer-executable components can comprise an inference component that can localize, via execution of a deep learning neural network, an unsafe driving condition along the road based on the roadside data. In various instances, the computer-executable components can comprise a broadcast component that can broadcast, via one or more peer-to-peer communication links, an electronic alert regarding the unsafe driving condition to one or more other vehicles traveling on the road.

According to one or more embodiments, a system is provided. The system can be onboard a first vehicle, and the system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise a sensor component that can capture, via one or more cameras, one or more microphones, or one or more other sensors of the first vehicle, roadside data associated with a road on which the first vehicle is traveling. In various aspects, the computer-executable components can comprise an inference component that can execute a deep learning neural network on the roadside data, wherein the deep learning neural network can produce as output a classification label, a bounding box, or a pixel-wise segmentation mask localizing an unsafe driving condition along the road. In various instances, the computer-executable components can comprise a broadcast component that can transmit, via a peer-to-peer communication link to a second vehicle traveling on the road, an electronic alert based on the unsafe driving condition.

According to one or more embodiments, a system is provided. The system can be onboard a vehicle traveling on a road, and the system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise a receiver component that can receive, via a peer-to-peer communication link, an electronic alert broadcasted by another vehicle traveling on the road. In various aspects, the computer-executable components can comprise a determination component that can determine, via parsing, whether the electronic alert indicates that an unsafe driving condition is located along the road ahead of the vehicle. In various instances, the computer-executable components can comprise an execution component that can initiate, in response to a determination that the electronic alert indicates that the unsafe driving condition is located along the road ahead of the vehicle, one or more electronic actions based on the unsafe driving condition.

According to one or more embodiments, the above-described systems can be implemented as computer-implemented methods or computer program products.

DETAILED DESCRIPTION

Figure 1:
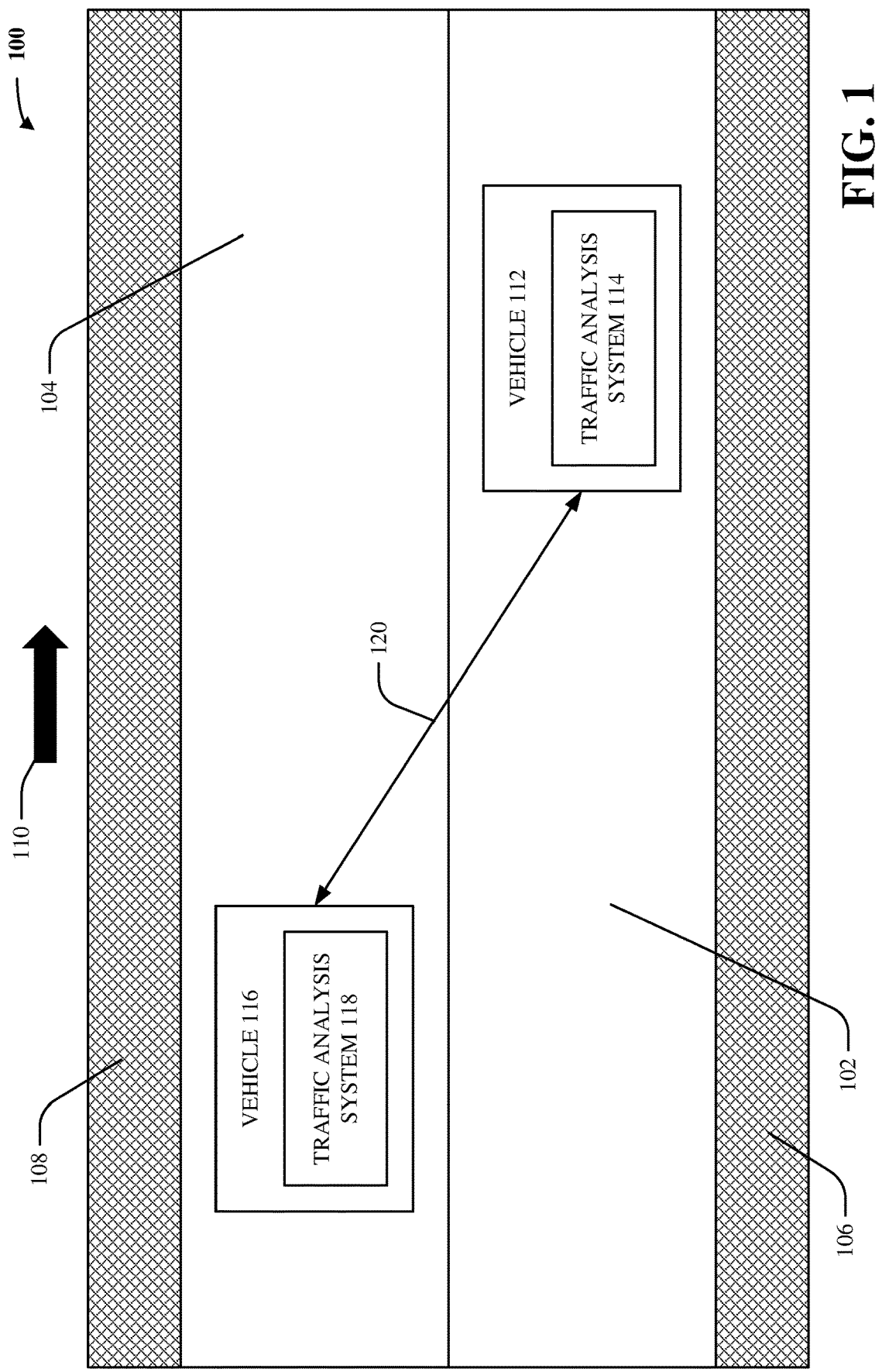
FIG. 1 illustrates an example, non-limiting block diagram showing vehicles traveling on a road, where such vehicles can facilitate peer-to-peer vehicular provision of artificially intelligent traffic analysis in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Many modern vehicles implement electronic navigation displays. An electronic navigation display can be any suitable electronic screen, electronic monitor, or electronic visual projection within a vehicle (e.g., on a dashboard or center console of the vehicle), on which navigation data (e.g., an electronic navigation route, electronic travel directions, electronic notifications of traffic congestion, electronic notifications of road construction, electronic notifications of road closures) can be rendered. The visual rendition of such navigation data can help to guide a driver of the vehicle (e.g., such that the driver does not get lost, such that the driver can be notified of upcoming traffic congestion).

Usually, such navigation data is transmitted to the electronic navigation display from a centralized server. Such centralized server is often implemented in a cloud-computing environment. In other words, the centralized server, which can be located in the cloud, can electronically store or maintain navigation data; any suitable number of vehicles can electronically transmit, via Internet connections, requests to the centralized server; the centralized server can electronically provide, via the Internet connections, the navigation data (or portions thereof) in response to such requests; and electronic navigation displays of such vehicles can render the navigation data so as to be visible to drivers of the vehicles.

Unfortunately, and as recognized by the inventors of various embodiments described herein, the navigation data provided by the centralized server can be unreliable for various reasons.

First, the present inventors realized that, when a centralized server is employed to store or maintain navigation data, the centralized server often facilitates such storage or maintenance in a substantially static, periodic fashion. That is, the navigation data can be regularly uploaded to the centralized server (e.g., via technicians or operators overseeing the centralized server) according to relatively long periodic intervals. In other words, the navigation data can remain un-updated for relatively long spans of time. In still other words, the navigation data can often be considered as being frozen in time, such that it often does not reflect current or up-to-date traffic information. For example, suppose that navigation data is uploaded to the centralized server once every eight hours by technicians or operators overseeing the centralized server. In such case, the navigation data can be considered as being frozen for each eight-hour interval between consecutive uploads. Thus, if a new traffic phenomenon (e.g., new traffic congestion, new road construction, new road closure) occurs during any such eight-hour interval, such new traffic phenomenon is not reflected in the navigation data until such eight-hour interval elapses (e.g., until the next periodic upload).

Second, the present inventors realized that, although some centralized servers store or maintain navigation data in a substantially dynamic, ad hoc fashion, such centralized servers rely on manual entry of updated navigation data. In particular, a centralized server can store or maintain navigation data, and the centralized server can be configured to receive ad hoc electronic updates to the navigation data from computing devices of drivers who encounter new traffic phenomena. That is, when a driver encounters a new traffic phenomenon (e.g., when the driver encounters traffic congestion that is not reflected in the navigation data, when the driver encounters road construction that is not reflected in the navigation data, when the driver encounters a road closure that is not reflected in the navigation data), that driver can use their computing device to inform the centralized server of such new traffic phenomenon. However, such ad hoc updates rely on manual data entry, which is inherently unreliable. After all, manual data entry is highly vulnerable to input errors. For example, when a driver attempts to inform the centralized server of a new traffic phenomenon, the driver can mistakenly misrepresent to the centralized server a time or location of the new traffic phenomenon. As another example, a driver can inform the centralized server of a new traffic phenomenon a long span of time after the driver actually encounters the new traffic phenomenon (e.g., during such long span of time, the navigation data can be considered as failing to be current or up-to-date). As yet another example, a driver can encounter a new traffic phenomenon, but the driver can forget or otherwise choose not to inform the centralized server of the new traffic phenomenon. In some cases, manual data entry can even be dangerous. For instance, a driver who encounters a new traffic phenomenon can immediately attempt to use their computing device to inform the centralized server of the new traffic phenomenon. However, such immediate use of the computing device while driving can be considered as distracting to the driver and can accordingly increase a risk of the driver causing a vehicular accident.

Third, the present inventors realized that, regardless of whether the centralized server receives updates to the navigation data statically or dynamically, electronic communication with the centralized server can rely upon an Internet connection. Accordingly, when a driver is driving in an area that lacks a sufficiently strong Internet connection, the computing device of the driver can be unable to communicate with the centralized server, meaning that the driver cannot inform the centralized server of a new traffic phenomenon in such area. Conversely, when a driver is driving in an area that lacks a sufficiently strong Internet connection, the electronic navigation display of the driver's vehicle can be unable to receive navigation data from the centralized server, which can increase a likelihood of the driver getting lost.

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate peer-to-peer vehicular provision of artificially intelligent traffic analysis. That is, the present inventors realized that various disadvantages associated with centralized provision of navigation data can be ameliorated by automated peer-to-peer vehicular provision of navigation data that leverages artificial intelligence. More specifically, a vehicle can be outfitted with various external sensors, such as road-facing cameras or road-facing microphones. In various aspects, the vehicle can utilize such external sensors to capture roadside data of a road on which the vehicle is traveling (e.g., to capture pictures of the road, to capture sounds that occur on the road). Furthermore, the vehicle can be outfitted with a deep learning neural network that can be trained or otherwise configured to localize unsafe driving conditions based on data captured by the external sensors. Thus, in various instances, the vehicle can execute the deep learning neural network on the roadside data, which can cause the deep learning neural network to produce an outputted localization. In various aspects, the outputted localization can exhibit any suitable format or dimensionality. For example, the unsafe driving condition can be an object that is obstructing a lane or a shoulder of the road, the roadside data can include an image of the road that depicts the object, and the outputted localization can be that image with a bounding box circumscribing the object. As another example, the unsafe driving condition can be an object that is obstructing a lane or a shoulder of the road, the roadside data can include an image of the road that depicts the object, and the outputted localization can be a pixel-wise segmentation mask of that image, where the pixel-wise segmentation mask shows which pixels make-up the object and which pixels instead make-up the road. As still another example, the unsafe driving condition can be an object that is obstructing a lane or a shoulder of the road, and the outputted localization can be a classification label indicating that the object has been detected in the roadside data. In any case, when the outputted localization indicates that an unsafe driving condition has been detected/localized along the road, the vehicle can electronically transmit the outputted localization to another vehicle traveling on the road via any suitable peer-to-peer (P2P) communication link, such as Wireless Fidelity (Wi-Fi) P2P or BLUETOOTH® P2P.

In various aspects, the external sensors and the deep learning neural network of the vehicle can be configured to constantly, continuously, or continually scan the road for unsafe driving conditions. Whenever an unsafe driving condition is detected or localized, it can be automatically shared with another vehicle on the road via the P2P communication link. In this way, various disadvantages of centralized provision of navigation data can be ameliorated. More specifically, the constant, continuous, or continual scanning of the external sensors or of the deep learning neural network can be more reliable than the manual data entry employed by centralized provision techniques (e.g., the external sensors or the deep learning neural network cannot forget to detect/localize an unsafe driving condition, unlike a driver; the external sensors or the deep learning neural network cannot choose to ignore an unsafe driving condition, unlike a driver; the external sensors or the deep learning neural network can operate without distracting a driver). Furthermore, the P2P communication link can operate in the absence of Internet connectivity, unlike centralized provision techniques. Accordingly, various embodiments described herein can help to more reliably provide up-to-date navigation data than centralized provision techniques.

Various embodiments described herein can be considered as a computerized tool (e.g., any suitable combination of computer-executable hardware or computer-executable software) that can facilitate peer-to-peer vehicular provision of artificially intelligent traffic analysis. In various aspects, there can be a first vehicle and a second vehicle traveling on a road, where the first vehicle is any suitable distance ahead of the second vehicle. In various instances, the first vehicle can be outfitted with a first instance of the computerized tool, and the second vehicle can be outfitted with a second instance of the computerized tool. In various cases, the first instance of the computerized tool can comprise a sensor component, an inference component, or a broadcast component. In various aspects, the second instance of the computerized tool can comprise a receiver component, a determination component, or an execution component.

In various embodiments, the sensor component of the first instance of the computerized tool can electronically record, measure, or otherwise capture roadside data associated with the road on which the first vehicle is traveling. More specifically, the sensor component can electronically access or otherwise control various sensors of the first vehicle. Such sensors can include one or more cameras of the first vehicle, one or more microphones of the first vehicle, one or more thermometers of the first vehicle, one or more hygrometers of the first vehicle, or one or more proximity sensors (e.g., radar, sonar, lidar) of the first vehicle. In various aspects, the sensor component can leverage such sensors to obtain the roadside data. For example, the one or more cameras can capture one or more images of the road (e.g., images of portions of the road that lie in front of the first vehicle, images of portions of the road that lie behind the first vehicle, images of portions of the road that lie beside the first vehicle). As another example, the one or more microphones can record one or more noises that occur on the road near the first vehicle. As still another example, the one or more thermometers can measure one or more temperatures associated with the road (e.g., air or surface temperatures associated with the road near the first vehicle). As yet another example, the one or more hygrometers can measure one or more humidities associated with the road (e.g., air or surface moisture levels associated with the road near the first vehicle). As even another example, the one or more proximity sensors can measure one or more proximity detections associated with the road (e.g., can detect when tangible objects on the road are within a threshold distance of the front, sides, or rear of the first vehicle). In various cases, such one or more images, such one or more noises, such one or more temperatures, such one or more humidities, or such one or more proximity detections can collectively be considered as the roadside data.

In various embodiments, the inference component of the first instance of the computerized tool can electronically store, maintain, control, or otherwise access a first deep learning neural network. In various instances, the first deep learning neural network can exhibit any suitable internal architecture. For example, the first deep learning neural network can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the first deep learning neural network can include any suitable numbers of neurons in various layers (e.g., different layers can have the same or different numbers of neurons as each other). As yet another example, the first deep learning neural network can include any suitable activation functions (e.g., softmax, sigmoid, hyperbolic tangent, rectified linear unit) in various neurons (e.g., different neurons can have the same or different activation functions as each other). As still another example, the first deep learning neural network can include any suitable interneuron connections or interlayer connections (e.g., forward connections, skip connections, recurrent connections).

In any case, the first deep learning neural network can be configured to receive, as input, data captured, measured, or recorded by the various sensors of the sensor component and to detect or localize, as output, an unsafe driving condition on the road based on such data. In some cases, the unsafe driving condition can be an object that is located in a lane of the road. In other cases, the unsafe driving condition can be an object that is located in a shoulder of the road or that is located within any suitable threshold distance of the shoulder. Non-limiting examples of such objects can include: potholes; fallen tree limbs or branches; fallen rocks; fallen power lines; abandoned pieces of furniture; damaged tires or tire shreds; stationary, stranded, or abandoned vehicles; animals or animal carcasses; ice patches; flood patches; or fog patches.

Accordingly, in various aspects, the inference component can electronically execute the first deep learning neural network on the roadside data. In various instances, such execution can cause the first deep learning neural network to generate an outputted localization. For example, the inference component can feed the roadside data to an input layer of the first deep learning neural network, the roadside data can complete a forward pass through one or more hidden layers of the first deep learning neural network, and an output layer of the first deep learning neural network can compute the outputted localization based on activations from the one or more hidden layers. In any case, the outputted localization can be one or more scalars, one or more vectors, one or more matrices, one or more tensors, or one or more character strings that indicate whether or not an unsafe driving condition is located on the road. As mentioned above, such unsafe driving condition can be an object that is obstructing a lane or a shoulder of the road. In such case, the outputted localization can indicate (e.g., via bounding boxes, segmentation masks, or classification labels) which specific lanes or which specific shoulders of the road are obstructed by the object.

For example, suppose that the road has a left lane, a right lane, a left shoulder, and a right shoulder. Furthermore, suppose that the unsafe driving condition is a pothole in the right lane of the road. Further still, suppose that the roadside data includes an image of the road, which image depicts the left lane, the right lane, the left shoulder, the right shoulder, and the pothole. In some instances, the outputted localization can be a version of that image having a first bounding box circumscribed about the left lane of the road, having a second bounding box circumscribed about the right lane of the road, having a third bounding box circumscribed about the left shoulder of the road, having a fourth bounding box circumscribed about the right shoulder of the road, and having a fifth bounding box circumscribed about the pothole. In such cases, the relative position of the fifth bounding box with respect to the other four bounding boxes can indicate that the pothole is located in the right lane (e.g., the fifth bounding box can be overlapping with or otherwise circumscribed by the second bounding box and not by any of the first, third, or fourth bounding boxes).

As another example, suppose that the road has a left lane, a right lane, a left shoulder, and a right shoulder. Furthermore, suppose that the unsafe driving condition is an animal in the left shoulder of the road. Further still, suppose that the roadside data includes an image of the road, which image depicts the left lane, the right lane, the left shoulder, the right shoulder, and the animal. In some instances, the outputted localization can be a segmentation mask of that image that indicates a first class of pixels that belong to the left lane of the road, a second class of pixels that belong to the right lane of the road, a third class of pixels that belong to the left shoulder of the road, a fourth class of pixels that belong to the right shoulder of the road, and a fifth class of pixels that belong to the animal. In such cases, the relative position of the fifth class of pixels with respect to the other four classes of pixels can indicate that the animal is located in the left shoulder (e.g., the fifth class of pixels can be immediately surrounded by the third class of pixels and not by the first, second, or fourth classes of pixels).

As still another example, suppose that the road has a left lane, a right lane, a left shoulder, and a right shoulder. Furthermore, suppose that the unsafe driving condition is an ice patch in both the left lane and the right lane of the road. Further still, suppose that the roadside data includes an image of the road, which image depicts the left lane, the right lane, the left shoulder, the right shoulder, and the ice patch. In some instances, the deep learning neural network can determine (e.g., via bounding boxes or pixel classes, as mentioned above) that the ice patch is in both the left lane and the right lane but is not in the left shoulder or the right shoulder, and the outputted localization can be a classification label indicating such.

In any case, the first deep learning neural network can be trained or otherwise configured, as described herein, to recognize, based on the roadside data, where on the road (e.g., in which lanes or shoulders) the unsafe driving condition (e.g., the detected pothole, the detected animal, the detected ice patch) is located, and the outputted localization can be one or more bounding boxes, segmentation masks, or classification labels representing, indicating, specifying, or otherwise conveying such information. Note that, in some cases, the outputted localization can indicate that no unsafe driving condition was located or detected.

To help cause the outputted localization to be accurate, the first deep learning neural network can first undergo any suitable type or paradigm of training (e.g., supervised training, unsupervised training, reinforcement learning). Accordingly, in various aspects, the first instance of the computerized tool can comprise a training component that can train the first deep learning neural network on a training dataset.

In some instances, the training dataset can be an annotated training dataset. In such cases, the training dataset can include a set of training inputs and a set of ground-truth annotations that respectively correspond to the set of training inputs. In various aspects, any given training input can have the same format, size, or dimensionality as the roadside data discussed above. In various instances, since it can be desired to train the deep learning neural network to localize unsafe driving conditions, each training input can correspond to a ground-truth annotation. In various cases, a ground-truth annotation, which can have the same format, size, or dimensionality as the outputted localization discussed above, can be considered as a correct or accurate unsafe driving condition localization that is known or deemed to correspond to a respective training input.

If the training dataset is annotated, then the training component can, in various aspects, perform supervised training on the first deep learning neural network. Prior to the start of such supervised training, the internal parameters (e.g., weights, biases, convolutional kernels) of the first deep learning neural network can be randomly initialized.

In various aspects, the training component can select from the training dataset any suitable training input and any suitable ground-truth annotation corresponding to such selected training input. In various instances, the training component can feed the selected training input to the first deep learning neural network, which can cause the first deep learning neural network to produce an output. For example, the training input can be received by an input layer of the first deep learning neural network, the training input can complete a forward pass through one or more hidden layers of the first deep learning neural network, and an output layer of the first deep learning neural network can compute the output based on activations generated by the one or more hidden layers.

In various aspects, the output can be considered as a predicted or inferred unsafe driving condition localization which the first deep learning neural network believes should correspond to the selected training input. In contrast, the selected ground-truth annotation can be considered as the correct or accurate unsafe driving condition localization that is known or deemed to correspond to the selected training input. Note that, if the first deep learning neural network has so far undergone no or little training, then the output can be highly inaccurate (e.g., the output can be very different from the selected ground-truth annotation).

In any case, the training component can compute one or more errors or losses (e.g., mean absolute errors (MAE), mean squared errors (MSE), cross-entropies) between the output and the selected ground-truth annotation. In various aspects, the training component can update the internal parameters of the first deep learning neural network by performing backpropagation (e.g., stochastic gradient descent) driven by such computed errors or losses.

In various instances, such supervised training procedure can be repeated for each training input in the training dataset, with the result being that the internal parameters of the first deep learning neural network can become iteratively optimized to accurately localize unsafe driving condition based on inputted roadside data. In various cases, the training component can implement any suitable training batch sizes, any suitable training termination criteria, or any suitable error, loss, or objective functions.

In any case, the sensor component can obtain the roadside data, and the inference component can execute (after training) the first deep learning neural network on the roadside data, thereby yielding the outputted localization.

In various embodiments, the broadcast component of the first instance of the computerized tool can electronically broadcast, to the second instance of the computerized tool via a P2P communication link, an electronic alert based on the outputted localization. In various aspects, the P2P communication link can be any suitable wireless communication channel or wireless electronic connection that can function in the absence of an intermediary access point or intermediary router. As a non-limiting example, the P2P communication link can be a BLUETOOTH® P2P connection, which can have an operable range on the order of tens or dozens of meters. As another non-limiting example, the P2P communication link can be a Wi-Fi P2P connection, which can have an operable range on the order of tens, dozens, or even hundreds of meters. Accordingly, if the first vehicle and the second vehicle are within an operable range of the P2P communication link, the first instance of the computerized tool can transmit to the second instance of the computerized tool the electronic alert, notwithstanding that the first vehicle and the second vehicle might be in an area with little to no Internet access.

In various aspects, the electronic alert can be any suitable electronic message that contains information pertaining to the unsafe driving condition localized by the first deep learning neural network. As an example, the electronic alert can, in some instances, include the outputted localization itself. That is, the electronic alert can include or otherwise specify the bounding boxes, the segmentation masks, or the classification labels produced by the first deep learning neural network. As another example, the electronic alert can, in some cases, include the roadside data itself. That is, the electronic alert can include or otherwise specify the raw images, noises, temperatures, humidities, or proximity detections that were measured, recorded, or otherwise captured by the sensors of the first vehicle.

In some aspects, the sensor component can comprise a geolocation sensor, such as a global positioning sensor or a Wi-Fi positioning sensor. In such cases, the geolocation sensor can capture or otherwise generate a geolocation stamp that indicates where (e.g., at which mile-marker) along the road the roadside data was captured, measured, or recorded by the sensor component. Because the geolocation stamp can indicate where along the road the roadside data was captured, and because the unsafe driving condition can be localized or detected based on the roadside data, the geolocation stamp can be considered as indicating where along the road the unsafe driving condition is located. In any case, the electronic alert can, in various instances, include or otherwise specify such geolocation stamp.

In some aspects, the sensor component can comprise a time sensor, such as a digital clock. In such cases, the time sensor can capture or otherwise generate a timestamp that indicates when (e.g., at what time or date) the roadside data was captured, measured, or recorded by the sensor component. Because the timestamp can indicate when the roadside data was captured, and because the unsafe driving condition can be localized or detected based on the roadside data, the timestamp can be considered as indicating when the unsafe driving condition was located or otherwise present on the road. In any case, the electronic alert can, in various instances, include or otherwise specify such timestamp.

In various aspects, the electronic alert can further include an identifier associated with the first vehicle. In various instances, the identifier can be any suitable piece of electronic data (e.g., an alphanumeric code) that indicates or otherwise represents an identity of the first vehicle. For example, the identifier can be a make, model, or manufacturing year of the first vehicle (e.g., such make, model, or manufacturing year can be hardcoded into the first instance of the computerized tool). As another example, the identifier can be a license plate number of the first vehicle (e.g., such license plate number can be hardcoded into the first instance of the computerized tool). As yet another example, the identifier can be a vehicle identification number (VIN) of the first vehicle (e.g., such VIN can be hardcoded into the first instance of the computerized tool). As still another example, the identifier can be a name or residential address of an owner of the first vehicle (e.g., such name or address can be hardcoded into the first instance of the computerized tool; or the broadcast component can determine such name or address by searching any suitable database for the owner, where such database can be collated by license plate number or VIN). As even another example, the identifier can be a name or residential address of a current driver of the first vehicle (e.g., the identity of the current driver can be determined via facial recognition, voice recognition, retina recognition, wearable beacon, or manual input).

In various aspects, the electronic alert can further comprise a recommendation based on the outputted localization. In various instances, the recommendation can suggest how the unsafe driving condition can be handled or otherwise overcome. For example, if the outputted localization indicates that one or more (but fewer than all) lanes of the road are obstructed by the unsafe driving condition, then the recommendation can suggest that such one or more lanes be avoided (e.g., the recommendation can suggest a lane-change). As another example, if the outputted localization indicates that the unsafe driving condition obstructs a shoulder of the road but not any lanes of the road, the recommendation can suggest that extra caution be exercised when passing the unsafe driving condition (e.g., the recommendation can suggest that speed be decreased or that hazard lights be activated).

In any case, the first instance of the computerized tool (e.g., onboard the first vehicle) can transmit, via the P2P communication link, the electronic alert to the second instance of the computerized tool (e.g., onboard the second vehicle), if a distance between the first vehicle and the second vehicle is less than or equal to an operable range of the P2P communication link.

In various embodiments, the receiver component of the second instance of the computerized tool can electronically receive or otherwise access the electronic alert. More specifically, the P2P communication link can operatively couple the broadcast component of the first instance of the computerized tool to the receiver component of the second instance of the computerized tool, without requiring an intermediate access point or router. Accordingly, the broadcast component of the first instance of the computerized tool can transmit the electronic alert, and the receiver component of the second instance of the computerized tool can receive the electronic alert, even in the absence of an Internet connection. In any case, the receiver component can electronically obtain or access the electronic alert, such that other components of the second instance of the computerized tool (e.g., the determination component, the execution component) can electronically interact with the electronic alert.

In various aspects, the determination component of the second instance of the computerized tool can electronically parse, via any suitable parsing technique, the electronic alert. In other words, the determination component can read the contents of the electronic alert. In various instances, the determination component can generate a determination indicator based on such contents. In various cases, the determination indicator can be any suitable binary variable whose value represents whether or not the electronic alert indicates that an unsafe driving condition has been located along the road. For example, the electronic alert can include the outputted localization and the geolocation stamp, and the determination component can identify the outputted localization and the geolocation stamp by parsing the electronic alert. If the outputted localization indicates an unsafe driving condition, then the determination component can conclude that the unsafe driving condition is located along the road at a position (e.g., at a mile-marker) represented by the geolocation stamp, and the determination indicator can accordingly be set to an active value or an active state. On the other hand, if the outputted localization indicates no unsafe driving condition, then the determination component can conclude that no unsafe driving condition is located along the road at the position (e.g., at the mile-marker) represented by the geolocation stamp, and the determination indicator can accordingly be set to an inactive value or an inactive state.

In various aspects, the execution component of the second instance of the computerized tool can facilitate, perform, conduct, or otherwise initiate any suitable electronic actions, in response to the determination indicator being set to the active value or the active state.

As an example, such one or more electronic actions can include adjusting, updating, or otherwise modifying an electronic navigation display of the second vehicle. In some cases, the electronic navigation display of the second vehicle can be any suitable computer screen, monitor, or visual projection that is integrated into a dashboard of the second vehicle. In other cases, the electronic navigation display of the second vehicle can be any suitable computer screen, monitor, or visual projection that is integrated into a central console of the second vehicle. In still other cases, the electronic navigation display of the second vehicle can be any suitable computer screen, monitor, or visual projection that is integrated into a heads-up-display of the second vehicle. In any case, in response to the determination indicator being set to the active value or the active state, the execution component can render any suitable graphical representation of the unsafe driving condition on the electronic navigation display. For instance, the electronic navigation display can illustrate a first symbol representing the second vehicle, can illustrate a second symbol representing the road on which the second vehicle is traveling, and can illustrate a third symbol representing the presence of the unsafe driving condition.

As another example, the one or more electronic actions can include adjusting, updating, or otherwise modifying an electronic navigation route of the second vehicle. In various aspects, the electronic navigation display can illustrate the electronic navigation route. That is, the electronic navigation display can depict one or more graphical representations of a route (e.g., of traffic directions) which the second vehicle is following. In various instances, the electronic navigation route can be leading the second vehicle to any suitable desired destination. In various cases, the execution component can determine whether or not the unsafe driving condition is located along the electronic navigation route. If the unsafe driving condition is located along the electronic navigation route, the execution component can recalculate or recompute the electronic navigation route, such that the unsafe driving condition is not located along the recalculated or recomputed route. In various aspects, the execution component can accordingly remove from the electronic navigation display the one or more graphical representations of the original route, and the execution component can render on the electronic navigation display one or more graphical representations corresponding to the recalculated or recomputed route.

As still another example, the one or more electronic actions can include adjusting any suitable autonomous driving controls of the second vehicle as the vehicle passes the unsafe driving condition. Indeed, as mentioned above, the electronic alert can include the geolocation stamp indicating the roadside position (e.g., the mile-marker) of the unsafe driving condition. In various instances, the second vehicle can itself have a geolocation sensor indicating its own roadside position. In various cases, when the roadside position of the second vehicle is within any suitable threshold margin of the roadside position of the unsafe driving condition, the second vehicle can be considered as passing (or about to pass) the unsafe driving condition, and the execution component can adjust the autonomous driving controls. In some aspects, such autonomous driving controls can include a speed reduction of the second vehicle. In other words, the execution component can cause the second vehicle to decelerate as the second vehicle passes (or is about to pass) the unsafe driving condition. In other aspects, such autonomous driving controls can include light activation (e.g., activation of high-beams, fog-lights, or hazard lights) of the second vehicle. That is, the execution component can cause any of the second vehicle's lights to be powered-on as the second vehicle passes (or is about to pass) the unsafe driving condition. In still other aspects, such autonomous driving control scan include a lane-change. In other words, the execution component can cause the second vehicle to shift lanes (e.g., from a lane that is obstructed by the unsafe driving condition to a lane that is not obstructed by the unsafe driving condition) as the second vehicle passes (or is about to pass) the unsafe driving condition.

As yet another example, the one or more electronic actions can include verifying whether or not the unsafe driving condition was properly localized (e.g., was properly localized by the first vehicle). In particular, as mentioned above, the electronic alert can include the roadside data captured by the sensors of the first vehicle, and the electronic alert can also include the outputted localization generated by the first deep learning neural network of the first vehicle. As explained above, the outputted localization can indicate that the unsafe driving condition is located on the road. In other words, the first deep learning neural network can have inferred the presence of the unsafe driving condition, based on the roadside data captured by the sensors of the first vehicle.

In various aspects, the execution component can electronically store, maintain, control, or otherwise access a second deep learning neural network that can be configured to localize unsafe driving conditions based on inputted sensor data. In various instances, the second deep learning neural network can exhibit any suitable artificial intelligence architecture and can be trained in any suitable fashion, as described above with respect to the first deep learning neural network.

In any case, in response to the determination indicator being set to the active value or active state, the execution component can execute the second deep learning neural network on the roadside data captured by the first vehicle, so as to double-check or otherwise verify the inference/conclusion of the first deep learning neural network.

More specifically, an input layer of the second deep learning neural network can receive the roadside data captured by the first vehicle, the roadside data captured by the first vehicle can complete a forward pass through one or more hidden layers of the second deep learning neural network, and an output layer of the second deep learning neural network can compute a redundancy localization based on activations provided by the one or more hidden layers. In various aspects, the redundancy localization can have the same format, size, or dimensionality as the outputted localization produced by the first deep learning neural network (e.g., if the outputted localization is one or more bounding boxes, then the redundancy localization can be one or more bounding boxes; if the outputted localization is one or more segmentation masks, then the redundancy localization can be one or more segmentation masks; if the outputted localization is one or more classification labels, then the redundancy localization can be one or more classification labels). In other words, the redundancy localization can indicate (e.g., via bounding boxes, segmentation masks, or classification labels) what lanes or shoulders (if any) of the road the second deep learning neural network believes are obstructed by the unsafe driving condition.

In various aspects, the execution component can compare the redundancy localization (produced by the second deep learning neural network) to the outputted localization (produced by the first deep learning neural network). If the redundancy localization matches the outputted localization (e.g., if the redundancy localization does not differ by more than any suitable threshold margin from the outputted localization), then the execution component can verify the unsafe driving condition (e.g., can conclude that the first deep learning neural network correctly analyzed the roadside data captured by the sensors of the first vehicle). In contrast, if the redundancy localization does not match the outputted localization (e.g., if the redundancy localization differs by more than any suitable threshold margin from the outputted localization), then the execution component can fail to verify the unsafe driving condition (e.g., can conclude that the first deep learning neural network incorrectly analyzed the roadside data captured by the sensors of the first vehicle). In any of these cases, the second deep learning neural network of the second vehicle can be considered as double-checking the analytical work performed by the first deep learning neural network of the first vehicle.

As even another example, the one or more electronic actions can include confirming whether or not the unsafe driving condition is still present along the road. Indeed, as mentioned above, the execution component can store, maintain, control, or otherwise access the second deep learning neural network. As also mentioned above, the electronic alert can include the geolocation stamp indicating the roadside position (e.g., the mile-marker) of the unsafe driving condition. When the second vehicle is passing (or about to pass) that roadside position (e.g., as determined using a geolocation sensor of the second vehicle), the execution component can capture, measure, or otherwise record a second version of the roadside data, using various sensors of the second vehicle (e.g., cameras of the second vehicle, microphones of the second vehicle, thermometers of the second vehicle, hygrometers of the second vehicle, proximity sensors of the second vehicle). Because the first vehicle can have passed the roadside position first, the roadside data captured by the first vehicle can be considered as representing an earlier state of the roadside position, whereas the roadside data captured by the second vehicle can be considered as representing a later state of the roadside position. In any case, the execution component can execute the second deep learning neural network on the roadside data captured by the second vehicle, as a follow-up to confirm whether or not the unsafe driving condition detected by the first vehicle is still present.

More specifically, an input layer of the second deep learning neural network can receive the roadside data captured by the second vehicle (not by the first vehicle), the roadside data captured by the second vehicle (not by the first vehicle) can complete a forward pass through one or more hidden layers of the second deep learning neural network, and an output layer of the second deep learning neural network can compute a follow-up localization based on activations provided by the one or more hidden layers. In various aspects, the follow-up localization can have the same format, size, or dimensionality as the outputted localization produced by the first deep learning neural network (e.g., if the outputted localization is one or more bounding boxes, then the follow-up localization can be one or more bounding boxes; if the outputted localization is one or more segmentation masks, then the follow-up localization can be one or more segmentation masks; if the outputted localization is one or more classification labels, then the follow-up localization can be one or more classification labels). In other words, the follow-up localization can indicate (e.g., via bounding boxes, segmentation masks, or classification labels) what lanes or shoulders (if any) of the road are obstructed by the unsafe driving condition.

In various aspects, the execution component can compare the follow-up localization (produced by the second deep learning neural network based on sensor data captured by the second vehicle) to the outputted localization (produced by the first deep learning neural network based on sensor data captured by the first vehicle). If the follow-up localization matches the outputted localization (e.g., if the follow-up localization does not differ by more than any suitable threshold margin from the outputted localization), then the execution component can conclude that the unsafe driving condition is still present on the road at the roadside position. In contrast, if the follow-up localization does not match the outputted localization (e.g., if the follow-up localization differs by more than any suitable threshold margin from the outputted localization), then the execution component can conclude that the unsafe driving condition is no longer present on the road at the roadside position (e.g., the roadside position might now be safe, or a different unsafe driving condition might now be present at the roadside position). In any of these cases, the second deep learning neural network of the second vehicle can be considered as following-up on the inference generated by the first deep learning neural network of the first vehicle.

Various embodiments described herein can be employed to use hardware or software to solve problems that are highly technical in nature (e.g., to facilitate peer-to-peer vehicular provision of artificially intelligent traffic analysis), that are not abstract and that cannot be performed as a set of mental acts by a human. Further, some of the processes performed can be performed by a specialized computer (e.g., a deep learning neural network having internal parameters such as convolutional kernels) for carrying out defined tasks related to peer-to-peer vehicular provision of artificially intelligent traffic analysis.

For example, such defined tasks can include: capturing, by a device operatively coupled to a processor and via one or more external sensors of a vehicle, roadside data associated with a road on which the vehicle is traveling; localizing, by the device and via execution of a deep learning neural network, an unsafe driving condition along the road based on the roadside data; and broadcasting, by the device and via one or more peer-to-peer communication links, an electronic alert regarding the unsafe driving condition to one or more other vehicles traveling on the road.

As another example, such defined tasks can include: capturing, by a device operatively coupled to a processor and via one or more cameras, one or more microphones, or one or more other sensors of a first vehicle, roadside data associated with a road on which the first vehicle is traveling; executing, by the device, a deep learning neural network on the roadside data, wherein the deep learning neural network produces as output a classification label, a bounding box, or a pixel-wise segmentation mask localizing an unsafe driving condition along the road; and transmitting, by the device and via a peer-to-peer communication link to a second vehicle traveling on the road, an electronic alert based on the unsafe driving condition.

As yet another example, such defined tasks can include: receiving, by a device operatively coupled to a processor aboard a vehicle traveling on a road and via a peer-to-peer communication link, an electronic alert broadcasted by another vehicle traveling on the road; determining, by the device and via parsing, whether the electronic alert indicates that an unsafe driving condition is located along the road ahead of the vehicle; and initiating, by the device and in response to a determination that the electronic alert indicates that the unsafe driving condition is located along the road ahead of the vehicle, one or more electronic actions based on the unsafe driving condition. In various cases, such one or more electronic actions can include executing a deep learning neural network on roadside data specified in the electronic alert or on roadside captured by various sensors (e.g., cameras, microphones, thermometers, hygrometers, proximity detectors) of the vehicle.

Such defined tasks are not performed manually by humans. Indeed, neither the human mind nor a human with pen and paper can: electronically capture, measure, or otherwise record roadside data using vehicle sensors (e.g., cameras, microphones, thermometers, hygrometers, or proximity sensors); electronically localize an unsafe driving condition by executing a deep learning neural network on such roadside data; and electronically transmit or receive information pertaining to such unsafe driving condition via a P2P communication link. Indeed, vehicle sensors, deep learning neural networks, and P2P communication links are inherently-computerized devices that simply cannot be implemented in any way by the human mind without computers. Accordingly, a computerized tool that can control vehicle sensors, that can train or execute a deep learning neural network on data captured by such vehicle sensors, or that can transmit or receive deep learning results on a P2P communication link is likewise inherently-computerized and cannot be implemented in any sensible, practical, or reasonable way without computers.

Moreover, various embodiments described herein can integrate into a practical application various teachings relating to peer-to-peer vehicular provision of artificially intelligent traffic analysis. As explained above, existing techniques provide navigation data by a centralized server. Usually, the navigation data of the centralized server is updated statically, according to long, regular intervals during which the navigation data can be considered as frozen or otherwise not up-to-date. Even in cases where the navigation data of the centralized server is updated in a dynamic, ad hoc fashion, manual data entry by human drivers is employed, which is highly unreliable (e.g., drivers can mistakenly or erroneously report newfound traffic phenomena to the centralized server; drivers can delay reporting newfound traffic phenomena to the centralized server; drivers can forget to report or choose to not report newfound traffic phenomena to the centralized server; drivers can become distracted and cause a vehicular accident if they attempt to report newfound traffic phenomena while driving). Moreover, regardless of whether the navigation data of the centralized server is updated statically or dynamically, the centralized server cannot communicate with vehicles in the absence of a sufficiently strong Internet connection. These can be considered as various disadvantages of centralized provision of navigation data.

Various embodiments described herein can address various of these technical problems. Specifically, various embodiments described herein can include outfitting a vehicle with a computerized tool, where such computerized tool can: automatically capture roadside data via vehicle sensors (e.g., cameras, microphones, thermometers, hygrometers, proximity detectors); automatically execute a deep learning neural network on the roadside data, thereby localizing or detecting an unsafe driving condition along whichever road on which the vehicle is traveling; and automatically transmit, via a P2P communication channel, an electronic alert concerning such unsafe driving condition to another vehicle. In various aspects, the another vehicle can be outfitted with a computerized tool, where such computerized tool can: automatically receive, via the P2P communication channel, the electronic alert; automatically parse the electronic alert to identify the unsafe driving condition; and automatically initiate any suitable electronic actions in response to the unsafe driving condition, such as updating an electronic navigation display, recomputing an electronic navigation route, performing autonomous driving maneuvers, double-checking the unsafe driving condition via its own deep learning neural network analysis, or confirming whether the unsafe driving condition is still present via its own deep learning neural network analysis. Such embodiments can reduce the number of instances in which navigation data is not up-to-date, do not rely upon manual data entry, and can function even in the absence of Internet connections. Accordingly, such embodiments can help to ameliorate various disadvantages suffered by techniques that utilize centralized provision of navigation data. Thus, various embodiments described herein certainly constitute a concrete and tangible technical improvement in the field of traffic analysis. Therefore, various embodiments described herein clearly qualify as useful and practical applications of computers.

Furthermore, various embodiments described herein can control real-world tangible devices based on the disclosed teachings. For example, various embodiments described herein can electronically control real-world vehicle sensors (e.g., real-world vehicle cameras, real-world vehicle microphones, real-world vehicle thermometers, real-world vehicle hygrometers, real-world vehicle proximity detectors), can electronically execute (or train) real-world deep learning neural networks on data captured by such real-world vehicle sensors, can electronically transmit or receive, via real-world P2P connections, results outputted by such real-world deep learning neural networks, and can electronically render such results on real-world computer screens or monitors.

It should be appreciated that the herein figures and description provide non-limiting examples of various embodiments and are not necessarily drawn to scale.

FIG. 1 illustrates an example, non-limiting block diagram showing vehicles traveling on a road, where such vehicles can facilitate peer-to-peer vehicular provision of artificially intelligent traffic analysis in accordance with one or more embodiments described herein.

In various embodiments, there can be a road 100. In various aspects, as shown, the road 100 can comprise a lane 102, a lane 104, a shoulder 106, or a shoulder 108. In various instances, the lane 102 can be any suitable vehicle lane having any suitable shape, any suitable dimensions, or any suitable composition (e.g., can be made of asphalt, concrete, gravel, or dirt). Likewise, the lane 104 can be any suitable vehicle lane having any suitable shape, any suitable dimensions, or any suitable composition. As shown, the lane 104 can be adjacent to and parallel with the lane 102. In various cases, the shoulder 106 can be any suitable vehicle shoulder having any suitable shape, any suitable dimensions, or any suitable composition, and the shoulder 106 can be adjacent to and parallel with the lane 102. Similarly, the shoulder 108 can be any suitable vehicle shoulder having any suitable shape, any suitable dimensions, or any suitable composition, and the shoulder 108 can be adjacent to and parallel with the lane 104. In various aspects, the road 100 (e.g., both the lane 102 and the lane 104) can have a direction of travel 110. In such case, the road 100 can, as illustrated in FIG. 1, be considered as a unidirectional, two-lane road.

Although FIG. 1 depicts the road 100 as being a unidirectional, two-lane road, this is a mere non-limiting example for ease of illustration. In various aspects, the road 100 can have any suitable number of lanes (e.g., can have fewer than two lanes, can have more than two lanes) and any suitable directions of travel (e.g., some lanes of the road 100 can have the direction of travel 110, while other lanes of the road 100 can have an opposite direction of travel).

In any case, there can be a vehicle 112 and a vehicle 116 traveling on the road 100. In various aspects, the vehicle 112 can be any suitable vehicle or automobile (e.g., can be a car, a truck, a van, a motorcycle). Likewise, the vehicle 116 can be any suitable vehicle or automobile. In the non-limiting example shown in FIG. 1, the vehicle 112 can be traveling in the lane 102 in the direction of travel 110, and the vehicle 116 can be traveling in the lane 104 in the direction of travel 110.

Although FIG. 1 depicts the vehicle 112 and the vehicle 116 as traveling along the road 100 in adjacent lanes, this is a mere non-limiting example. In various aspects, the vehicle 112 and the vehicle 116 can be in the same lane as each other. In various other aspects (e.g., in situations where the road 100 includes three or more lanes), the vehicle 112 and the vehicle 116 can be in different, non-adjacent lanes.

In any case, the vehicle 112 and the vehicle 116 can be traveling on the road 100 in the direction of travel 110. Given the direction of travel 110 depicted in FIG. 1, the vehicle 112 can be considered as being ahead of the vehicle 116.

In various embodiments, as shown, the vehicle 112 can comprise a traffic analysis system 114. In other words, the traffic analysis system 114 can be onboard the vehicle 112. Similarly, as shown, the vehicle 116 can comprise a traffic analysis system 118. That is, the traffic analysis system 118 can be onboard the vehicle 116. In various aspects, as described herein, the traffic analysis system 114 and the traffic analysis system 118 can be configured so as to facilitate peer-to-peer vehicular provision of artificially intelligent traffic analysis between the vehicle 112 and the vehicle 116. In particular, the traffic analysis system 114 and the traffic analysis system 118 can be communicatively coupled or connected together via a peer-to-peer (P2P) communication link 120. In various instances, the P2P communication link 120 can be any suitable wireless electronic communication channel that can operate in the absence of an intermediate access point or an intermediate router. In other words, the P2P communication link 120 can function without having an Internet connection.

As a non-limiting example, the P2P communication link can be a Wi-Fi peer-to-peer communication link, such as Wi-Fi DIRECT®, which can have an operable range of tens, dozens, or even hundreds of meters. In other words, a Wi-Fi peer-to-peer communication link can facilitate wireless and Internet-less electronic communication between two computing devices that are separated by tens, dozens, or even hundreds of meters.

As another non-limiting example, the P2P communication link 120 can be a BLUETOOTH® peer-to-peer communication link, which can have an operable range of tens or dozens of meters. That is, a BLUETOOTH® peer-to-peer communication link can facilitate wireless and Internet-less electronic communication between two computing devices that are separated by tens or dozens of meters.

In any case, the P2P communication link 120 can have any suitable operable range, and the P2P communication link 120 can facilitate wireless and Internet-less electronic communication between the traffic analysis system 114 and the traffic analysis system 118, when the vehicle 112 and the vehicle 116 are separated by a distance that is less than or equal to that operable range.

As described herein, the vehicle 112 and the vehicle 116 can travel along the road 100, with the vehicle 112 being ahead of the vehicle 116. In various aspects, as the vehicle 112 travels along the road 100, the traffic analysis system 114 can automatically scan, using vehicle sensors and deep learning, the road 100 for unsafe driving conditions. When the traffic analysis system 114 recognizes an unsafe driving condition on the road 100, the traffic analysis system 114 can inform, via the P2P communication link 120, the traffic analysis system 118 of such unsafe driving condition. Accordingly, the vehicle 116 can be notified in advance of such unsafe driving condition, even in the absence of an Internet connection. Furthermore, as described herein, the traffic analysis system 118 can initiate any suitable electronic actions based on such unsafe driving condition.

In some cases, because the vehicle 112 can comprise the traffic analysis system 114, the vehicle 112 can be considered as a smart vehicle. Likewise, because the vehicle 116 can comprise the traffic analysis system 118, the vehicle 116 can also be considered as a smart vehicle.

Figure 2:
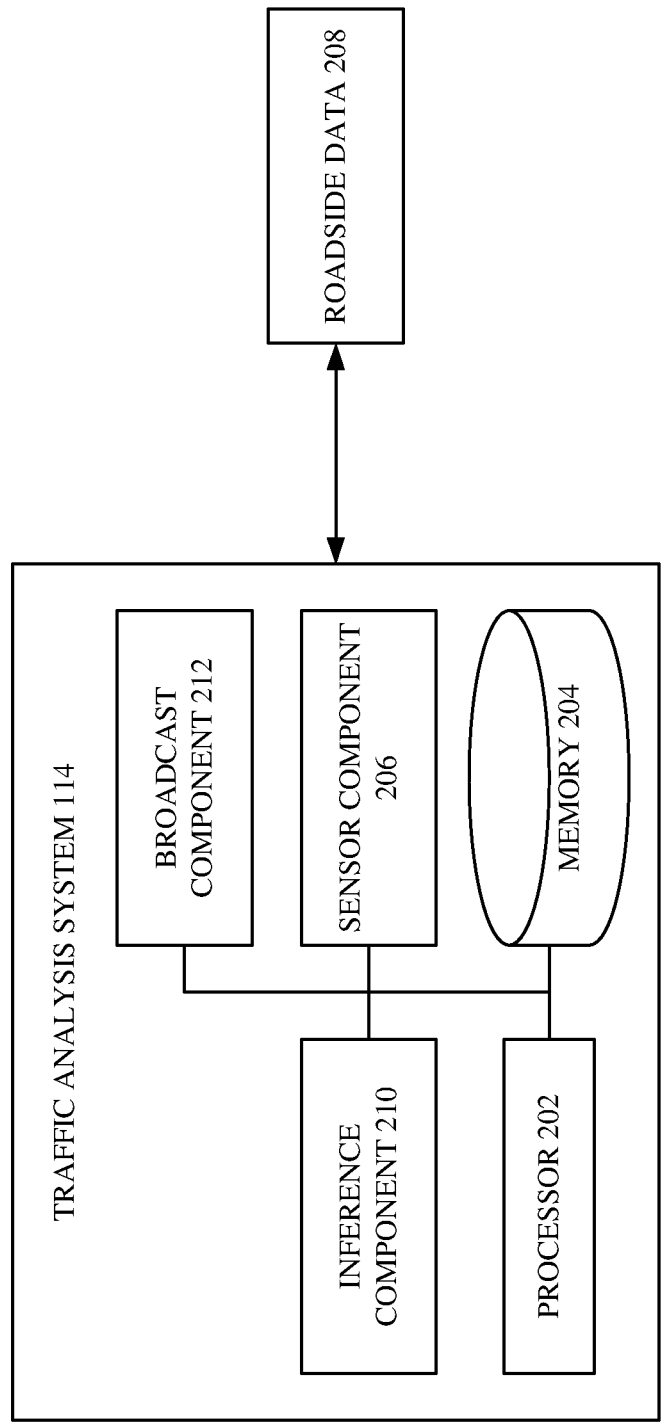
FIG. 2 illustrates a block diagram of an example, non-limiting system that facilitates a broadcast-side of peer-to-peer vehicular provision of artificially intelligent traffic analysis in accordance with one or more embodiments described herein.

FIG. 2 illustrates a block diagram of an example, non-limiting system 200 that can facilitate a broadcast-side of peer-to-peer vehicular provision of artificially intelligent traffic analysis in accordance with one or more embodiments described herein. In other words, FIG. 2 depicts a non-limiting example embodiment of the traffic analysis system 114.

In various embodiments, the traffic analysis system 114 can comprise a processor 202 (e.g., computer processing unit, microprocessor) and a non-transitory computer-readable memory 204 that is operably or operatively or communicatively connected or coupled to the processor 202. The non-transitory computer-readable memory 204 can store computer-executable instructions which, upon execution by the processor 202, can cause the processor 202 or other components of the traffic analysis system 114 (e.g., sensor component 206, inference component 210, broadcast component 212) to perform one or more acts. In various embodiments, the non-transitory computer-readable memory 204 can store computer-executable components (e.g., sensor component 206, inference component 210, broadcast component 212), and the processor 202 can execute the computer-executable components.

In various embodiments, the traffic analysis system 114 can comprise a sensor component 206. In various aspects, as described herein, the sensor component 206 can obtain, via any suitable sensors of the vehicle 112, roadside data 208. In various cases, the roadside data 208 can exhibit any suitable format, size, or dimensionality. For example, the roadside data 208 can comprise one or more scalars, one or more vectors, one or more matrices, one or more tensors, one or more character strings, or any suitable combination thereof.

In various embodiments, the traffic analysis system 114 can comprise an inference component 210. In various instances, as described herein, the inference component 210 can localize or detect an unsafe driving condition along the road 100, based on the roadside data 208.

In various embodiments, the traffic analysis system 114 can comprise a broadcast component 212. In various cases, as described herein, the broadcast component 212 can inform, via the P2P communication link 120, the traffic analysis system 118 of the unsafe driving condition.

Figure 3:
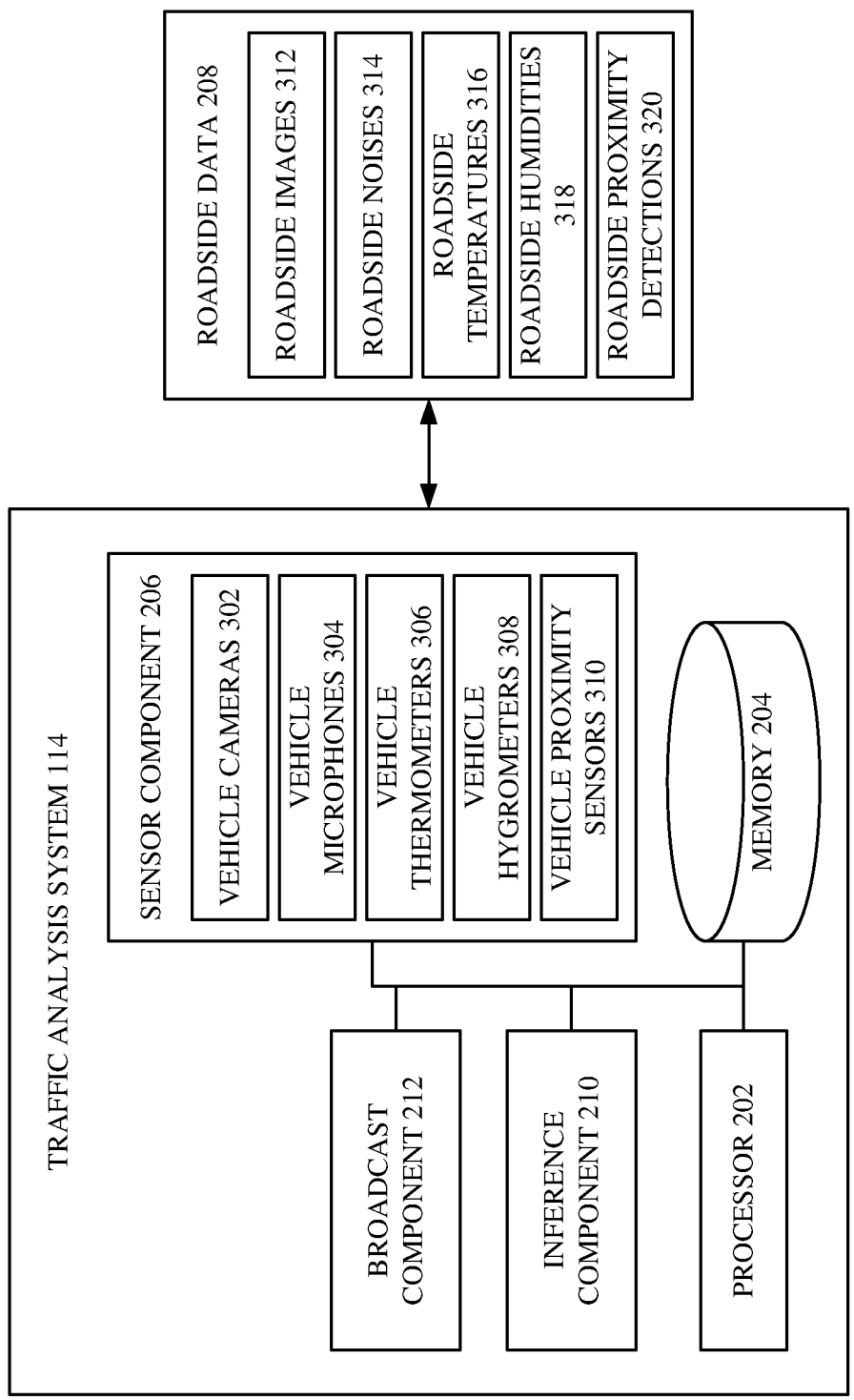
FIG. 3 illustrates a block diagram of an example, non-limiting system including various sensors that facilitates a broadcast-side of peer-to-peer vehicular provision of artificially intelligent traffic analysis in accordance with one or more embodiments described herein.

FIG. 3 illustrates a block diagram of an example, non-limiting system 300 including various sensors that can facilitate a broadcast-side of peer-to-peer vehicular provision of artificially intelligent traffic analysis in accordance with one or more embodiments described herein.

In various embodiments, the sensor component 206 can electronically control, electronically execute, electronically activate, or otherwise electronically access any suitable sensors of the vehicle 112. In various aspects, such sensors can be road-facing. In other words, such sensors can be oriented or otherwise configured to monitor the road 100 as the vehicle 112 drives on the road 100.

As a non-limiting example, such sensors can include a set of vehicle cameras 302. In various aspects, the set of vehicle cameras 302 can include any suitable number of any suitable types of cameras (e.g., of image-capture devices). In various instances, the set of vehicle cameras 302 can be integrated into or onto the vehicle 112. In various cases, one or more of the set of vehicle cameras 302 can be forward-facing. For example, such one or more cameras can be integrated into or onto any suitable forward-facing surfaces, whether interior or exterior, of the vehicle 112 (e.g., can be built on a dash of the vehicle 112 so as to look through a front windshield of the vehicle 112, can be built around the front windshield of the vehicle 112, can be built into a front bumper of the vehicle 112, can be built around headlights of the vehicle 112, can be built into a hood of the vehicle 112). Because such one or more cameras can be forward-facing, such one or more cameras can be configured to capture or otherwise record images or video frames of portions of the road 100 that lie in front of the vehicle 112. In various aspects, one or more of the set of vehicle cameras 302 can be rearward-facing. For example, such one or more cameras can be integrated into or onto any suitable rearward-facing surfaces, whether interior or exterior, of the vehicle 112 (e.g., can be built into or on a rearview mirror of the vehicle 112, can be built into or onto sideview mirrors of the vehicle 112, can be built around a rear windshield of the vehicle 112, can be built into a rear bumper of the vehicle 112, can be built around taillights of the vehicle 112, can be built into a trunk-cover of the vehicle 112). Because such one or more cameras can be rearward-facing, such one or more cameras can be configured to capture or otherwise record images or video frames of portions of the road 100 that lie behind the vehicle 112. In various instances, one or more of the set of vehicle cameras 302 can be laterally-facing. For example, such one or more cameras can be integrated into or onto any suitable lateral surfaces, whether interior or exterior, of the vehicle 112 (e.g., can be built into or around doors or door handles of the vehicle 112, can be built into or around fenders of the vehicle 112). Because such one or more cameras can be laterally-facing, such one or more cameras can be configured to capture or otherwise record images or video frames of portions of the road 100 that lie beside the vehicle 112.

As another non-limiting example, such sensors can include a set of vehicle microphones 304. In various aspects, the set of vehicle microphones 304 can include any suitable number of any suitable types of microphones (e.g., of sound-capture devices). In various instances, the set of vehicle microphones 304 can be integrated into or onto the vehicle 112. In various cases, one or more of the set of vehicle microphones 304 can be forward-facing. For example, such one or more microphones can be integrated into or onto any suitable forward-facing surfaces, whether interior or exterior, of the vehicle 112, so as to capture or otherwise record sounds or noises that occur on portions of the road 100 that lie in front of the vehicle 112. In various aspects, one or more of the set of vehicle microphones 304 can be rearward-facing. For example, such one or more microphones can be integrated into or onto any suitable rearward-facing surfaces, whether interior or exterior, of the vehicle 112, so as to capture or otherwise record sounds or noises that occur on portions of the road 100 that lie behind the vehicle 112. In various instances, one or more of the set of vehicle microphones 304 can be laterally-facing. For example, such one or more microphones can be integrated into or onto any suitable lateral surfaces, whether interior or exterior, of the vehicle 112, so as to capture or otherwise record sounds or noises that occur on portions of the road 100 that lie beside the vehicle 112.

As yet another non-limiting example, such sensors can include a set of vehicle thermometers 306. In various aspects, the set of vehicle thermometers 306 can include any suitable number of any suitable types of thermometers (e.g., of temperature sensors). In various instances, the set of vehicle thermometers 306 can be integrated into or onto the vehicle 112. In various cases, one or more of the set of vehicle thermometers 306 can be forward-facing. For example, such one or more thermometers can be integrated into or onto any suitable forward-facing surfaces, whether interior or exterior, of the vehicle 112, so as to capture or otherwise record air temperatures or road surface temperatures associated with portions of the road 100 that lie in front of the vehicle 112. In various aspects, one or more of the set of vehicle thermometers 306 can be rearward-facing. For example, such one or more thermometers can be integrated into or onto any suitable rearward-facing surfaces, whether interior or exterior, of the vehicle 112, so as to capture or otherwise record air temperatures or road surface temperatures associated with portions of the road 100 that lie behind the vehicle 112. In various instances, one or more of the set of vehicle thermometers 306 can be laterally-facing. For example, such one or more thermometers can be integrated into or onto any suitable lateral surfaces, whether interior or exterior, of the vehicle 112, so as to capture or otherwise record air temperatures or road surface temperatures associated with portions of the road 100 that lie beside the vehicle 112.

As even another non-limiting example, such sensors can include a set of vehicle hygrometers 308. In various aspects, the set of vehicle hygrometers 308 can include any suitable number of any suitable types of hygrometers (e.g., of moisture or humidity sensors). In various instances, the set of vehicle hygrometers 308 can be integrated into or onto the vehicle 112. In various cases, one or more of the set of vehicle hygrometers 308 can be forward-facing. For example, such one or more hygrometers can be integrated into or onto any suitable forward-facing surfaces, whether interior or exterior, of the vehicle 112, so as to capture or otherwise record air humidities or road surface moisture levels associated with portions of the road 100 that lie in front of the vehicle 112. In various aspects, one or more of the set of vehicle hygrometers 308 can be rearward-facing. For example, such one or more hygrometers can be integrated into or onto any suitable rearward-facing surfaces, whether interior or exterior, of the vehicle 112, so as to capture or otherwise record air humidities or road surface moisture levels associated with portions of the road 100 that lie behind the vehicle 112. In various instances, one or more of the set of vehicle hygrometers 308 can be laterally-facing. For example, such one or more hygrometers can be integrated into or onto any suitable lateral surfaces, whether interior or exterior, of the vehicle 112, so as to capture or otherwise record air humidities or road surface moisture levels associated with portions of the road 100 that lie beside the vehicle 112.

As still another non-limiting example, such sensors can include a set of vehicle proximity sensors 310. In various aspects, the set of vehicle proximity sensors 310 can include any suitable number of any suitable types of proximity sensors (e.g., of radar, sonar, or lidar sensors). In various instances, the set of vehicle proximity sensors 310 can be integrated into or onto the vehicle 112. In various cases, one or more of the set of vehicle proximity sensors 310 can be forward-facing. For example, such one or more proximity sensors can be integrated into or onto any suitable forward-facing surfaces, whether interior or exterior, of the vehicle 112, so as to capture or otherwise record proximities of tangible objects located on portions of the road 100 that lie in front of the vehicle 112. In various aspects, one or more of the set of vehicle proximity sensors 310 can be rearward-facing. For example, such one or more proximity sensors can be integrated into or onto any suitable rearward-facing surfaces, whether interior or exterior, of the vehicle 112, so as to capture or otherwise record proximities of tangible objects located on portions of the road 100 that lie behind the vehicle 112. In various instances, one or more of the set of vehicle proximity sensors 310 can be laterally-facing. For example, such one or more proximity sensors can be integrated into or onto any suitable lateral surfaces, whether interior or exterior, of the vehicle 112, so as to capture or otherwise record proximities of tangible objects located on portions of the road 100 that lie beside the vehicle 112.

In any case, the sensor component 206 can utilize such sensors to capture, record, or otherwise measure the roadside data 208.

For example, the set of vehicle cameras 302 can capture a set of roadside images 312 while the vehicle 112 is traveling on the road 100. In various aspects, the set of roadside images 312 can include any suitable number of images or video frames (e.g., any suitable number of two-dimensional pixel arrays) that can depict portions of the road 100 (e.g., portions of the road 100 that lie in front of, behind, or beside the vehicle 112).

As another example, the set of vehicle microphones 304 can capture a set of roadside noises 314 while the vehicle 112 is traveling on the road 100. In various instances, the set of roadside noises 314 can include any suitable number of audio clips that can represent noises occurring on portions of the road 100 (e.g., on portions of the road 100 that lie in front of, behind, or beside the vehicle 112).

As yet another example, the set of vehicle thermometers 306 can capture a set of roadside temperatures 316 while the vehicle 112 is traveling on the road 100. In various aspects, the set of roadside temperatures 316 can include any suitable number of temperature measurements that can represent air temperatures or road surface temperatures associated with portions of the road 100 (e.g., with portions of the road 100 that lie in front of, behind, or beside the vehicle 112).

As still another example, the set of vehicle hygrometers 308 can capture a set of roadside humidities 318 while the vehicle 112 is traveling on the road 100. In various aspects, the set of roadside humidities 318 can include any suitable number of humidity measurements or moisture measurements that can represent air humidity levels or road surface moisture levels associated with portions of the road 100 (e.g., with portions of the road 100 that lie in front of, behind, or beside the vehicle 112).

As even another example, the set of vehicle proximity sensors 310 can capture a set of roadside proximity detections 320 while the vehicle 112 is traveling on the road 100. In various aspects, the set of roadside proximity detections 320 can include any suitable number of proximity detections (e.g., of radar, sonar, or lidar detections) that can represent distances between the vehicle 112 and nearby objects on portions of the road 100 (e.g., on portions of the road 100 that lie in front of, behind, or beside the vehicle 112).

Although not explicitly shown in the figures, any of the set of vehicle cameras 302, any of the set of vehicle microphones 304, any of the set of vehicle thermometers 306, any of the set of vehicle hygrometers 308, or any of the set of vehicle proximity sensors 310 can be integrated into or onto a drone (e.g., an autonomous or remotely-operated drone) that can be launched by, controlled by, or otherwise associated with the vehicle 112. For example, the vehicle 112 can launch an air-based or ground-based drone, and such drone can travel along the road 100 (e.g., can travel in front of the vehicle 112, behind the vehicle 112, or beside the vehicle 112). As such drone travels along the road 100, such drone can utilize any suitable sensors (e.g., cameras, microphones, thermometers, hygrometers, proximity sensors) integrated into or onto the drone to monitor the road 100. In various cases, such drone can electronically transmit (e.g., via a P2P communication link) any data captured by its sensors back to the vehicle 112, and such captured data can be considered as part of the roadside data 208.

In any case, the set of roadside images 312, the set of roadside noises 314, the set of roadside temperatures 316, the set of roadside humidities 318, and the set of roadside proximity detections 320 can collectively be considered as the roadside data 208.

Figure 4:
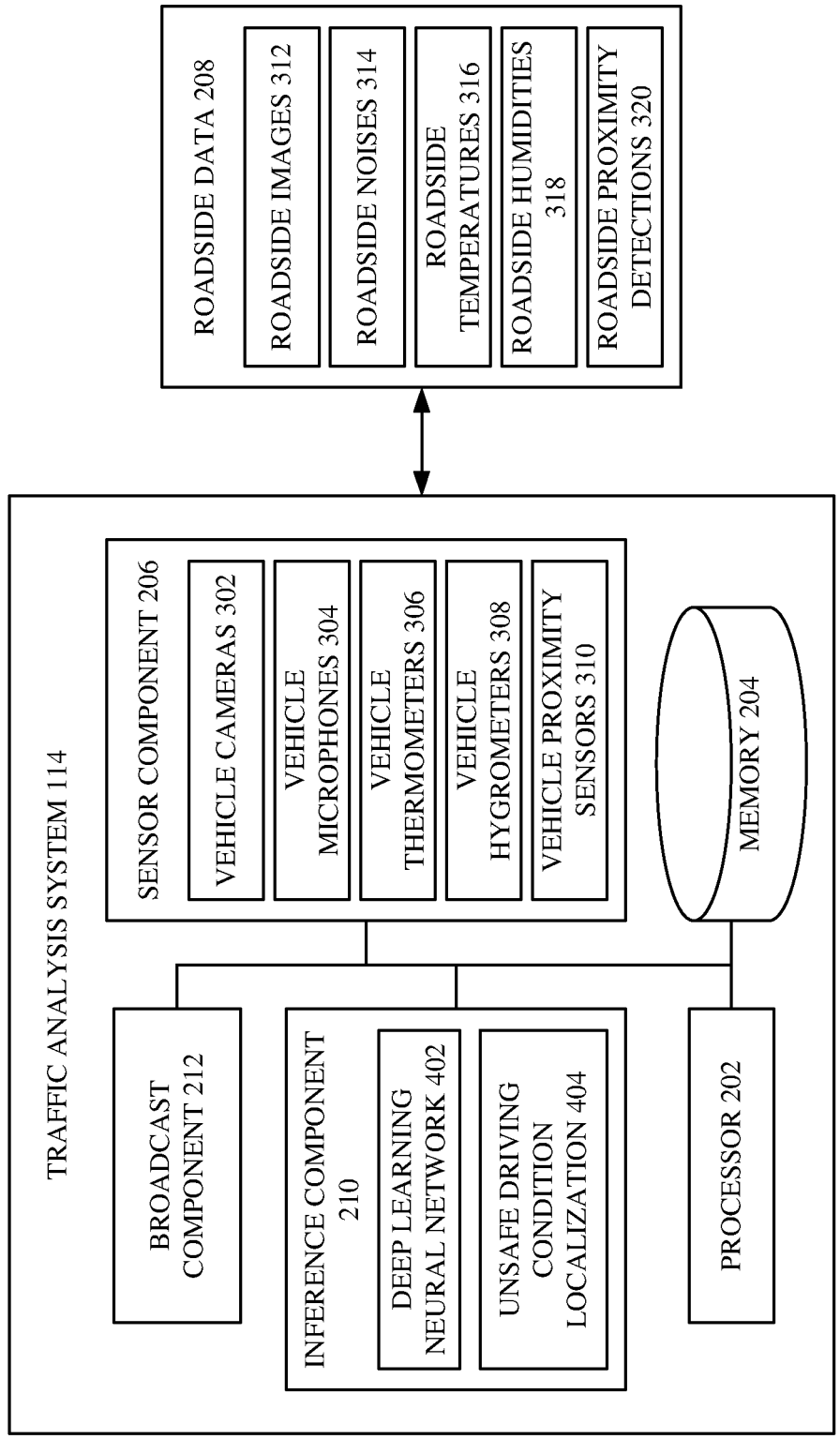
FIG. 4 illustrates a block diagram of an example, non-limiting system including a deep learning neural network and an unsafe driving condition localization that facilitates a broadcast-side of peer-to-peer vehicular provision of artificially intelligent traffic analysis in accordance with one or more embodiments described herein.

FIG. 4 illustrates a block diagram of an example, non-limiting system 400 including a deep learning neural network and an unsafe driving condition localization that can facilitate a broadcast-side of peer-to-peer vehicular provision of artificially intelligent traffic analysis in accordance with one or more embodiments described herein. As shown, the system 400 can, in some cases, comprise the same components as the system 300, and can further comprise a deep learning neural network 402 or an unsafe driving condition localization 404.

In various embodiments, the inference component 210 can electronically store, electronically maintain, electronically control, or otherwise electronically access the deep learning neural network 402. In various aspects, the deep learning neural network 402 can have or otherwise exhibit any suitable internal architecture. For instance, the deep learning neural network 402 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

No matter the internal architecture of the deep learning neural network 402, the deep learning neural network 402 can be configured to localize or otherwise detect unsafe driving conditions based on inputted roadside data. Accordingly, the inference component 210 can electronically execute the deep learning neural network 402 on the roadside data 208, thereby yielding the unsafe driving condition localization 404. Various non-limiting aspects are described with respect to FIG. 5.

Figure 5:
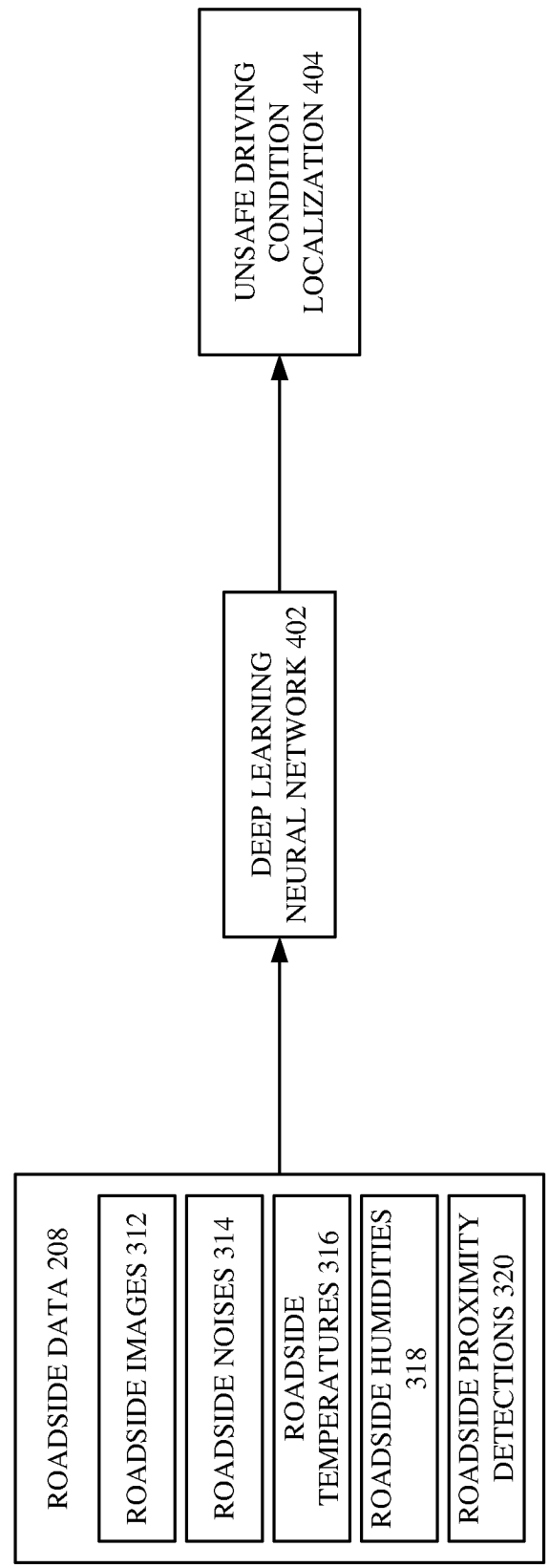
FIG. 5 illustrates an example, non-limiting block diagram showing how a deep learning neural network can generate an unsafe driving condition localization based on roadside data in accordance with one or more embodiments described herein.

FIG. 5 illustrates an example, non-limiting block diagram 500 showing how the deep learning neural network 402 can generate the unsafe driving condition localization 404 based on the roadside data 208 in accordance with one or more embodiments described herein.

As shown, the inference component 210 can, in various aspects, execute the deep learning neural network 402 on the roadside data 208, and such execution can cause the deep learning neural network 402 to produce the unsafe driving condition localization 404. More specifically, the inference component 210 can feed the roadside data 208 (e.g., the set of roadside images 312, the set of roadside noises 314, the set of roadside temperatures 316, the set of roadside humidities 318, or the set of roadside proximity detections 320) to an input layer of the deep learning neural network 402. In various instances, the roadside data 208 (e.g., the set of roadside images 312, the set of roadside noises 314, the set of roadside temperatures 316, the set of roadside humidities 318, or the set of roadside proximity detections 320) can complete a forward pass through one or more hidden layers of the deep learning neural network 402. In various cases, an output layer of the deep learning neural network 402 can compute the unsafe driving condition localization 404, based on activation maps or intermediate features produced by the one or more hidden layers.

In various aspects, the unsafe driving condition localization 404 can be any suitable electronic data exhibiting any suitable format, size, or dimensionality. That is, the unsafe driving condition localization 404 can be one or more scalars, one or more vectors, one or more matrices, one or more tensors, one or more character strings, or any suitable combination thereof. In various instances, the sensor component 206 can capture, measure, or otherwise record the roadside data 208 at any given roadside position (e.g., at any given mile-marker) along the road 100, and the unsafe driving condition localization 404 can indicate, specify, convey, or otherwise represent which (if any) lanes or shoulders of the road 100 at such roadside position are affected by an unsafe driving condition.

In some cases, the unsafe driving condition can be any suitable object that is obstructing one or more lanes or one or more shoulders of the road 100, and the unsafe driving condition localization 404 can be any suitable electronic data that identifies such object or that identifies which lanes or shoulders are obstructed by such object.

As a non-limiting example, such object can be a pothole. In other words, the sensor component 206 can capture the roadside data 208 at a given roadside position (e.g., at a given mile-marker) along the road 100, and the deep learning neural network 402 can be trained or otherwise configured, as described herein, to determine, based on the roadside data 208, whether a pothole is located in the lane 102, in the lane 104, in the shoulder 106, or in the shoulder 108 at that given roadside position. In still other words, if a pothole is located on the road 100 at that given roadside position, some manifestation of such pothole can be conveyed in the roadside data 208 (e.g., the pothole can be depicted in the set of roadside images 312), and the deep learning neural network 402 can recognize such manifestation of the pothole.

As another non-limiting example, such object can be a fallen tree branch. Accordingly, the sensor component 206 can capture the roadside data 208 at a given roadside position (e.g., at a given mile-marker) along the road 100, and the deep learning neural network 402 can be trained or otherwise configured, as described herein, to determine, based on the roadside data 208, whether a fallen tree branch is located in the lane 102, in the lane 104, in the shoulder 106, or in the shoulder 108 at that given roadside position. That is, if a fallen tree branch is located on the road 100 at that given roadside position, some manifestation of such fallen tree branch can be conveyed in the roadside data 208 (e.g., the fallen tree branch can be depicted in the set of roadside images 312, the sound of a tree cracking or breaking can be captured in the set of roadside noises 314, the fallen tree branch can cause an anomaly in the set of roadside proximity detections 320), and the deep learning neural network 402 can recognize such manifestation of the fallen tree branch.

As yet another non-limiting example, such object can be a fallen rock. In other words, the sensor component 206 can capture the roadside data 208 at a given roadside position (e.g., at a given mile-marker) along the road 100, and the deep learning neural network 402 can be trained or otherwise configured, as described herein, to determine, based on the roadside data 208, whether a fallen rock is located in the lane 102, in the lane 104, in the shoulder 106, or in the shoulder 108 at that given roadside position. In still other words, if a fallen rock is located on the road 100 at that given roadside position, some manifestation of such fallen rock can be conveyed in the roadside data 208 (e.g., the fallen rock can be depicted in the set of roadside images 312, the sound of a rock crashing or rolling can be captured in the set of roadside noises 314, the fallen rock can cause an anomaly in the set of roadside proximity detections 320), and the deep learning neural network 402 can recognize such manifestation of the fallen rock.

As still another non-limiting example, such object can be a fallen power line (e.g., electricity pole or cable). Accordingly, the sensor component 206 can capture the roadside data 208 at a given roadside position (e.g., at a given mile-marker) along the road 100, and the deep learning neural network 402 can be trained or otherwise configured, as described herein, to determine, based on the roadside data 208, whether a fallen power line is located in the lane 102, in the lane 104, in the shoulder 106, or in the shoulder 108 at that given roadside position. That is, if a fallen power line is located on the road 100 at that given roadside position, some manifestation of such fallen power line can be conveyed in the roadside data 208 (e.g., the fallen power line can be depicted in the set of roadside images 312, the sound of a electricity surging or sparking can be captured in the set of roadside noises 314, the fallen power line can cause an anomaly in the set of roadside proximity detections 320), and the deep learning neural network 402 can recognize such manifestation of the fallen power line.

As even another non-limiting example, such object can be a piece of discarded or lost furniture (e.g., a couch that fell off a trailer). In other words, the sensor component 206 can capture the roadside data 208 at a given roadside position (e.g., at a given mile-marker) along the road 100, and the deep learning neural network 402 can be trained or otherwise configured, as described herein, to determine, based on the roadside data 208, whether a piece of discarded or lost furniture is located in the lane 102, in the lane 104, in the shoulder 106, or in the shoulder 108 at that given roadside position. In still other words, if a piece of discarded or lost furniture is located on the road 100 at that given roadside position, some manifestation of such discarded or lost furniture can be conveyed in the roadside data 208 (e.g., the furniture can be depicted in the set of roadside images 312, the sound of furniture tumbling off a trailer can be captured in the set of roadside noises 314, the furniture can cause an anomaly in the set of roadside proximity detections 320), and the deep learning neural network 402 can recognize such manifestation of the piece of discarded or lost furniture.

As another non-limiting example, such object can be a damaged tire (e.g., shreds of a tire that has exploded). In other words, the sensor component 206 can capture the roadside data 208 at a given roadside position (e.g., at a given mile-marker) along the road 100, and the deep learning neural network 402 can be trained or otherwise configured, as described herein, to determine, based on the roadside data 208, whether a damaged tire is located in the lane 102, in the lane 104, in the shoulder 106, or in the shoulder 108 at that given roadside position. In still other words, if a damaged tire is located on the road 100 at that given roadside position, some manifestation of such damaged tire can be conveyed in the roadside data 208 (e.g., the damaged tire can be depicted in the set of roadside images 312, the sound of a tire bursting can be captured in the set of roadside noises 314, the damaged tire can cause an anomaly in the set of roadside proximity detections 320), and the deep learning neural network 402 can recognize such manifestation of the damaged tire.

As yet another non-limiting example, such object can be a stationary or stranded vehicle. In other words, the sensor component 206 can capture the roadside data 208 at a given roadside position (e.g., at a given mile-marker) along the road 100, and the deep learning neural network 402 can be trained or otherwise configured, as described herein, to determine, based on the roadside data 208, whether a stationary or stranded vehicle is located in the lane 102, in the lane 104, in the shoulder 106, or in the shoulder 108 at that given roadside position. In still other words, if a stationary or stranded vehicle is located on the road 100 at that given roadside position, some manifestation of such stationary or stranded vehicle can be conveyed in the roadside data 208 (e.g., the stationary or stranded vehicle can be depicted in the set of roadside images 312, the stationary or stranded vehicle can cause an anomaly in the set of roadside proximity detections 320), and the deep learning neural network 402 can recognize such manifestation of the stationary or stranded vehicle.

As even another non-limiting example, such object can be a damaged or toppled vehicle (e.g., a vehicle that has gotten into an accident, that is on fire, or that is rolled over). In other words, the sensor component 206 can capture the roadside data 208 at a given roadside position (e.g., at a given mile-marker) along the road 100, and the deep learning neural network 402 can be trained or otherwise configured, as described herein, to determine, based on the roadside data 208, whether a damaged or toppled vehicle is located in the lane 102, in the lane 104, in the shoulder 106, or in the shoulder 108 at that given roadside position. In still other words, if a damaged or toppled vehicle is located on the road 100 at that given roadside position, some manifestation of such damaged or toppled vehicle can be conveyed in the roadside data 208 (e.g., the damaged or toppled vehicle can be depicted in the set of roadside images 312, the sound of a vehicle accident or a gasoline explosion can be captured in the set of roadside noises 314, the heat from a vehicular fire can be captured in the set of roadside temperatures 316, the damaged or toppled vehicle can cause an anomaly in the set of roadside proximity detections 320), and the deep learning neural network 402 can recognize such manifestation of the damaged or toppled vehicle.

As still another non-limiting example, such object can be a vehicle that is speeding or traveling in the wrong direction. Accordingly, the sensor component 206 can capture the roadside data 208 at a given roadside position (e.g., at a given mile-marker) along the road 100, and the deep learning neural network 402 can be trained or otherwise configured, as described herein, to determine, based on the roadside data 208, whether a vehicle that is speeding, weaving, or traveling the wrong way is located in the lane 102, in the lane 104, in the shoulder 106, or in the shoulder 108 at that given roadside position. That is, if a speeding, weaving, or wrong-way vehicle is located on the road 100 at that given roadside position, some manifestation of such speeding, weaving, or wrong-way vehicle can be conveyed in the roadside data 208 (e.g., the speeding, weaving, or wrong-way vehicle can be depicted in the set of roadside images 312, the sound of a speeding vehicle can be captured in the set of roadside noises 314, the speeding, weaving, or wrong-way vehicle can cause an anomaly in the set of roadside proximity detections 320), and the deep learning neural network 402 can recognize such manifestation of the speeding, weaving, or wrong-way vehicle.

As another non-limiting example, such object can be an animal (e.g., a live animal or an animal carcass, such as a deer, a horse, a dog, or a squirrel). In other words, the sensor component 206 can capture the roadside data 208 at a given roadside position (e.g., at a given mile-marker) along the road 100, and the deep learning neural network 402 can be trained or otherwise configured, as described herein, to determine, based on the roadside data 208, whether an animal is located in the lane 102, in the lane 104, in the shoulder 106, or in the shoulder 108 at that given roadside position. In still other words, if an animal is located on the road 100 at that given roadside position, some manifestation of such animal can be conveyed in the roadside data 208 (e.g., the animal can be depicted in the set of roadside images 312, barks or squeals of the animal can be captured in the set of roadside noises 314, the animal can cause an anomaly in the set of roadside proximity detections 320), and the deep learning neural network 402 can recognize such manifestation of the animal.

As still another non-limiting example, such object can be a weather anomaly (e.g., an ice patch, a flood patch, a fog patch). Accordingly, the sensor component 206 can capture the roadside data 208 at a given roadside position (e.g., at a given mile-marker) along the road 100, and the deep learning neural network 402 can be trained or otherwise configured, as described herein, to determine, based on the roadside data 208, whether a weather anomaly is located in the lane 102, in the lane 104, in the shoulder 106, or in the shoulder 108 at that given roadside position. That is, if a weather anomaly is located on the road 100 at that given roadside position, some manifestation of such weather anomaly can be conveyed in the roadside data 208 (e.g., the weather anomaly can be depicted in the set of roadside images 312, the sound of thunder or rain can be captured in the set of roadside noises 314, cold or freezing temperatures associated with the weather anomaly can be captured in the set of roadside temperatures 316, heightened moisture levels associated with the weather anomaly can be captured in the set of roadside humidities 318), and the deep learning neural network 402 can recognize such manifestation of the weather anomaly.

As another non-limiting example, such object can be a pedestrian (e.g., injured or uninjured). Accordingly, the sensor component 206 can capture the roadside data 208 at a given roadside position (e.g., at a given mile-marker) along the road 100, and the deep learning neural network 402 can be trained or otherwise configured, as described herein, to determine, based on the roadside data 208, whether a pedestrian is located in the lane 102, in the lane 104, in the shoulder 106, or in the shoulder 108 at that given roadside position. That is, if a pedestrian is located on the road 100 at that given roadside position, some manifestation of such pedestrian can be conveyed in the roadside data 208 (e.g., the pedestrian can be depicted in the set of roadside images 312, the sound of the pedestrian's voice can be captured in the set of roadside noises 314, the pedestrian can cause an anomaly in the set of roadside proximity detections 320), and the deep learning neural network 402 can recognize such manifestation of the pedestrian.

Accordingly, the unsafe driving condition can be an object obstructing one or more lanes or shoulders of the road 100, and the unsafe driving condition localization 404 can be any suitable electronic data that indicates which specific lanes or which specific shoulders of the road 100 the object obstructs. In particular, the unsafe driving condition localization 404 can be one or more bounding boxes, one or more pixel-wise segmentation masks, or one or more classification labels that can indicate which specific lanes or which specific shoulders of the road 100 the object obstructs. Various non-limiting details are explained with respect to FIGS. 6-8.

Figure 6:
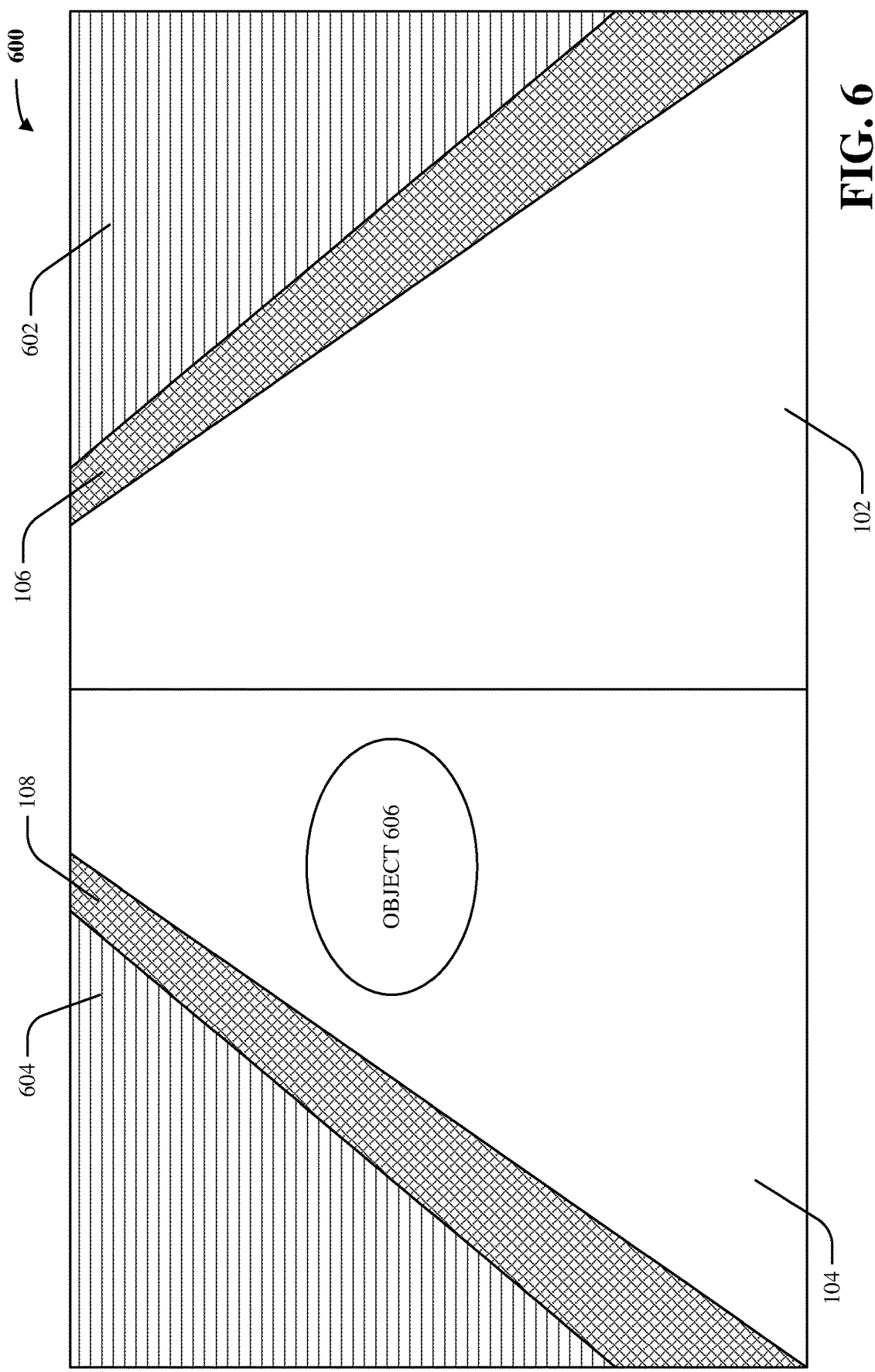
FIGS. 6-8 illustrate example, non-limiting images of unsafe driving conditions in accordance with one or more embodiments described herein.
Figure 7:
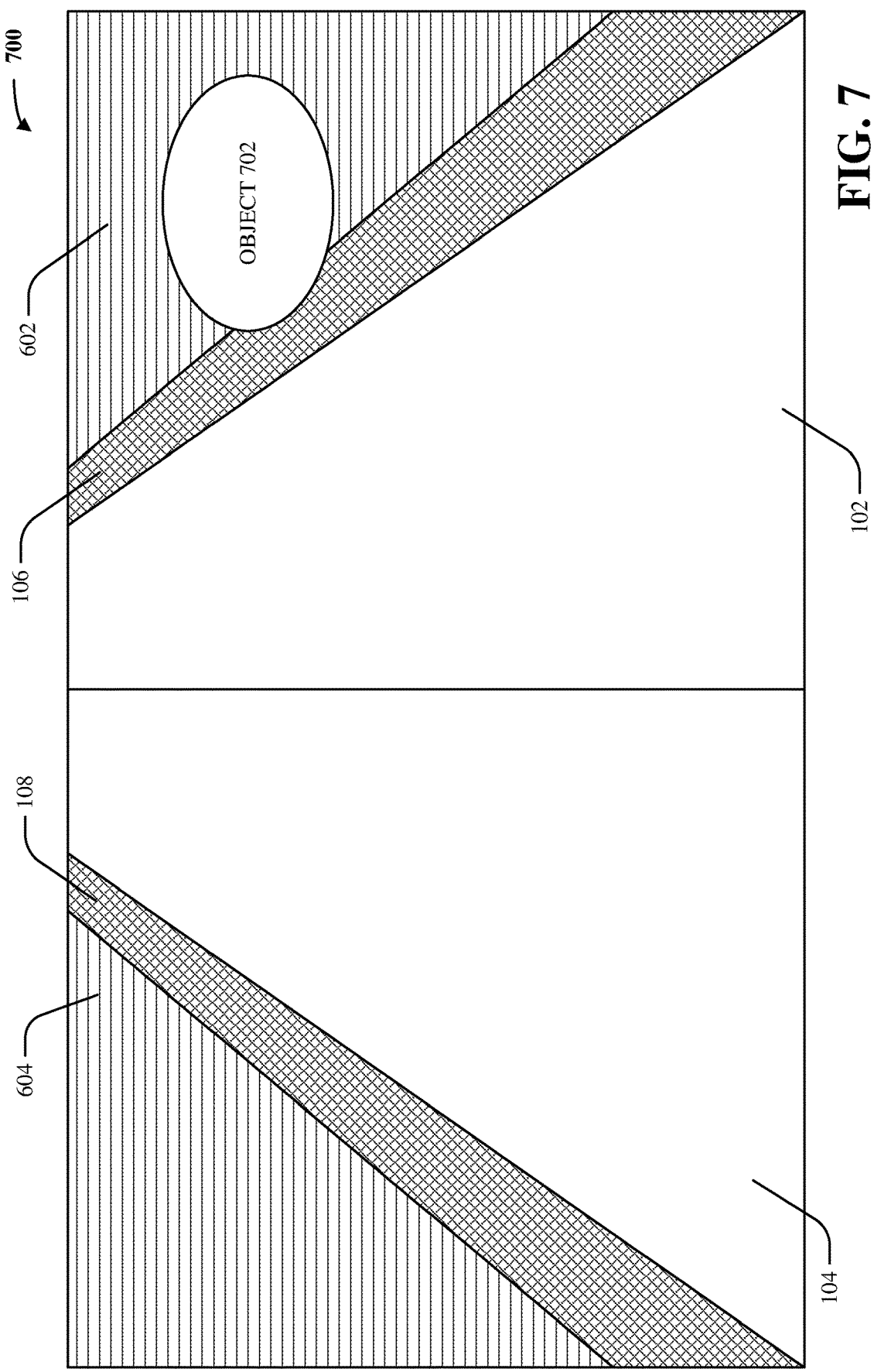
Figure 8:
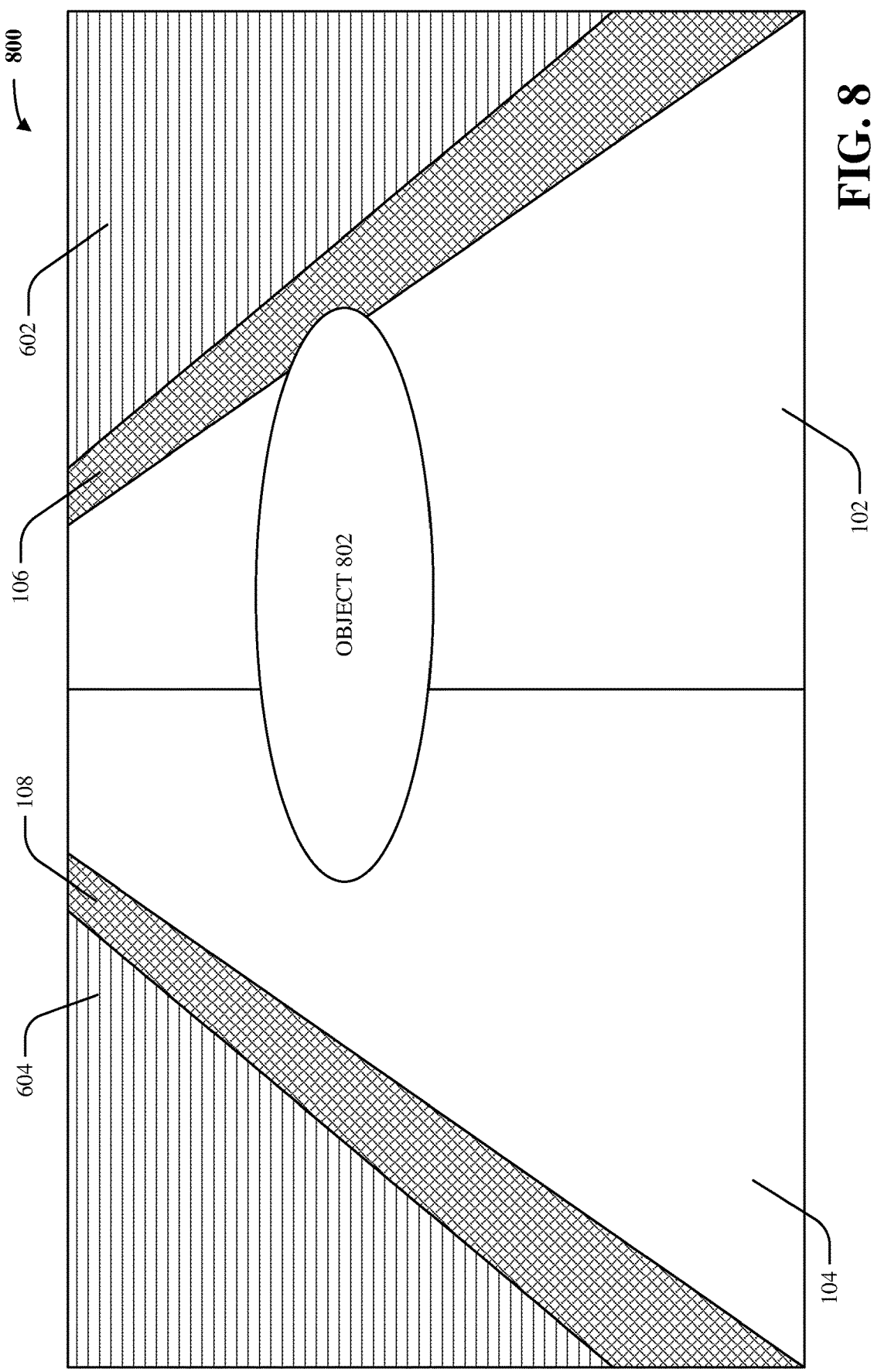

FIGS. 6-8 illustrate example, non-limiting images 600, 700, and 800 of unsafe driving conditions in accordance with one or more embodiments described herein.

First, consider FIG. 6, which illustrates an image 600. In various cases, the image 600 can be any of the set of roadside images 312. As shown in the non-limiting example of FIG. 6, the image 600 can depict the lane 102, the lane 104, the shoulder 106, and the shoulder 108, from a forward-facing perspective of the vehicle 112. In other words, the image 600 can be considered as depicting a view of a portion of the road 100, which portion of the road 100 lies in front of the vehicle 112. As also shown, the image 600 can include a non-road region 602 that is beyond or outside of the shoulder 106. In various cases, the non-road region 602 can be any terrain that is off the road 100 and beside the shoulder 106. As a non-limiting example, the non-road region 602 can be grass, gravel, or dirt, such as might be found on a highway median. Likewise, as shown, the image 600 can also include a non-road region 604 that is beyond or outside of the shoulder 108. As above, the non-road region 604 can be any terrain that is off the road 100 and beside the shoulder 108 (e.g., grass, gravel, dirt).

In various aspects, as shown, the image 600 can depict an object 606 in the lane 104. As mentioned above, such object 606 can, as some non-limiting examples, be a pothole, a fallen tree branch, a fallen rock, a piece of discarded or lost furniture, a fallen power line, a damaged tire, a stationary or stranded vehicle, a damaged or toppled vehicle, a speeding or wrong-way vehicle, an animal, an ice patch, a flood patch, a fog patch, or a pedestrian. In any case, the deep learning neural network 402 can detect or localize the object 606, and the unsafe driving condition localization 404 can indicate or otherwise convey that the object 606 is located in the lane 104.

In some cases, the unsafe driving condition localization 404 can indicate that the object 606 is located in the lane 104 via one or more bounding boxes. Indeed, as mentioned above, the image 600 can be within the set of roadside images 312. Accordingly, the deep learning neural network 402 can receive the image 600 as input, and the deep learning neural network 402 can produce the unsafe driving condition localization 404 based at least in part on the image 600. In various aspects, the unsafe driving condition localization 404 can be a version of the image 600 over which various bounding boxes (not shown) are superimposed. For example, the deep learning neural network 402 can recognize which pixels in the image 600 make-up, belong to, or otherwise correspond to the lane 102 and can circumscribe such pixels with a first bounding box (not shown). Similarly, the deep learning neural network 402 can recognize which pixels in the image 600 make-up, belong to, or otherwise correspond to the lane 104 and can circumscribe such pixels with a second bounding box (not shown). Likewise, the deep learning neural network 402 can recognize which pixels in the image 600 make-up, belong to, or otherwise correspond to the shoulder 106 and can circumscribe such pixels with a third bounding box (not shown). Moreover, the deep learning neural network 402 can recognize which pixels in the image 600 make-up, belong to, or otherwise correspond to the shoulder 108 and can circumscribe such pixels with a fourth bounding box (not shown). Furthermore, the deep learning neural network 402 can recognize which pixels in the image 600 make-up, belong to, or otherwise correspond to the object 606 and can circumscribe such pixels with a fifth bounding box (not shown). In various instances, the deep learning neural network 402 can determine which lanes or shoulders are affected by the object 606, based on how such bounding boxes intersect or overlap. In this non-limiting example, the fifth bounding box would be within (e.g., would be circumscribed by) the second bounding box and would not be within (e.g., would not be circumscribed by) the first, third, or fourth bounding boxes. Accordingly, the deep learning neural network 402 can interpret this to mean that the object 606 is located within (e.g., is obstructing) the lane 104 and not the lane 102, the shoulder 106, or the shoulder 108.

In other cases, the unsafe driving condition localization 404 can indicate that the object 606 is located in the lane 104 via one or more pixel-wise segmentation masks. Again, as mentioned above, the image 600 can be within the set of roadside images 312. Accordingly, the deep learning neural network 402 can receive the image 600 as input, and the deep learning neural network 402 can produce the unsafe driving condition localization 404 based at least in part on the image 600. In various aspects, the unsafe driving condition localization 404 can be a segmentation mask of the image 600, where such segmentation mask can indicate which specific pixels make-up or otherwise belong to which classes of the image 600. For example, the deep learning neural network 402 can recognize which pixels in the image 600 make-up, belong to, or otherwise correspond to the lane 102 and can mark such pixels as belonging to a first pixel class (not shown). Similarly, the deep learning neural network 402 can recognize which pixels in the image 600 make-up, belong to, or otherwise correspond to the lane 104 and can mark such pixels as belonging to a second pixel class (not shown). Likewise, the deep learning neural network 402 can recognize which pixels in the image 600 make-up, belong to, or otherwise correspond to the shoulder 106 and can mark such pixels as belonging to a third pixel class (not shown). Moreover, the deep learning neural network 402 can recognize which pixels in the image 600 make-up, belong to, or otherwise correspond to the shoulder 108 and can mark such pixels as belonging to a fourth pixel class (not shown). Furthermore, the deep learning neural network 402 can recognize which pixels in the image 600 make-up, belong to, or otherwise correspond to the object 606 and can mark such pixels as belonging to a fifth pixel class (not shown). In various instances, the deep learning neural network 402 can determine which lanes or shoulders are affected by the object 606, based on how such pixel classes neighbor each other. In this non-limiting example, any pixel within the fifth pixel class would have as an immediate neighbor another pixel from the fifth pixel class or a pixel from the second pixel class, and such pixel would not have as an immediate neighbor any pixels from the first, third, or fourth pixel classes. Accordingly, the deep learning neural network 402 can interpret this to mean that the object 606 is located within (e.g., is obstructing) the lane 104 and not the lane 102, the shoulder 106, or the shoulder 108.

In still other cases, the deep learning neural network 402 can determine (e.g., via bounding boxes or segmentation masks, as described above) that the object 606 is located in the lane 104 and not in the lane 102, the shoulder 106, or the shoulder 108, and the unsafe driving condition localization 404 can be a classification label indicating such.

Next, consider FIG. 7, which illustrates an image 700. In various cases, the image 700 can be any of the set of roadside images 312. As shown in the non-limiting example of FIG. 7, the image 700 can depict the lane 102, the lane 104, the shoulder 106, the shoulder 108, the non-road region 602, and the non-road region 604, from a forward-facing perspective of the vehicle 112.

In various aspects, as shown, the image 700 can depict an object 702 in the shoulder 106 and in the non-road region 602. As mentioned above, such object can, as some non-limiting examples, be a pothole, a fallen tree branch, a fallen rock, a piece of discarded or lost furniture, a fallen power line, a damaged tire, a stationary or stranded vehicle, a damaged or toppled vehicle, a speeding or wrong-way vehicle, an animal, an ice patch, a flood patch, a fog patch, or a pedestrian. In any case, the deep learning neural network 402 can detect or localize the object 702, and the unsafe driving condition localization 404 can indicate or otherwise convey that the object 702 is obstructing the shoulder 106.

In some cases, the unsafe driving condition localization 404 can indicate that the object 702 is obstructing the shoulder 106 via one or more bounding boxes. Indeed, as mentioned above, the image 700 can be within the set of roadside images 312. Accordingly, the deep learning neural network 402 can receive the image 700 as input, and the deep learning neural network 402 can produce the unsafe driving condition localization 404 based at least in part on the image 700. In various aspects, the unsafe driving condition localization 404 can be a version of the image 700 over which various bounding boxes (not shown) are superimposed. For example, the deep learning neural network 402 can recognize which pixels in the image 700 make-up, belong to, or otherwise correspond to the lane 102 and can circumscribe such pixels with a first bounding box (not shown). Similarly, the deep learning neural network 402 can recognize which pixels in the image 700 make-up, belong to, or otherwise correspond to the lane 104 and can circumscribe such pixels with a second bounding box (not shown). Likewise, the deep learning neural network 402 can recognize which pixels in the image 700 make-up, belong to, or otherwise correspond to the shoulder 106 and can circumscribe such pixels with a third bounding box (not shown). Moreover, the deep learning neural network 402 can recognize which pixels in the image 700 make-up, belong to, or otherwise correspond to the shoulder 108 and can circumscribe such pixels with a fourth bounding box (not shown). Furthermore, the deep learning neural network 402 can recognize which pixels in the image 700 make-up, belong to, or otherwise correspond to the object 702 and can circumscribe such pixels with a fifth bounding box (not shown). In various instances, the deep learning neural network 402 can determine which lanes or shoulders are affected by the object 702, based on how such bounding boxes intersect or overlap. In this non-limiting example, the fifth bounding box would intersect the third bounding box and would not intersect the first, second, or fourth bounding boxes. Accordingly, the deep learning neural network 402 can interpret this to mean that the object 702 is obstructing the shoulder 106 and not the lane 102, the lane 104, or the shoulder 108.

In other cases, the unsafe driving condition localization 404 can indicate that the object 702 is obstructing the shoulder 106 via one or more pixel-wise segmentation masks. Again, as mentioned above, the image 700 can be within the set of roadside images 312. Accordingly, the deep learning neural network 402 can receive the image 700 as input, and the deep learning neural network 402 can produce the unsafe driving condition localization 404 based at least in part on the image 700. In various aspects, the unsafe driving condition localization 404 can be a segmentation mask of the image 700, where such segmentation mask can indicate which specific pixels make-up or otherwise belong to which classes of the image 700. For example, the deep learning neural network 402 can recognize which pixels in the image 700 make-up, belong to, or otherwise correspond to the lane 102 and can mark such pixels as belonging to a first pixel class (not shown). Similarly, the deep learning neural network 402 can recognize which pixels in the image 700 make-up, belong to, or otherwise correspond to the lane 104 and can mark such pixels as belonging to a second pixel class (not shown). Likewise, the deep learning neural network 402 can recognize which pixels in the image 700 make-up, belong to, or otherwise correspond to the shoulder 106 and can mark such pixels as belonging to a third pixel class (not shown). Moreover, the deep learning neural network 402 can recognize which pixels in the image 700 make-up, belong to, or otherwise correspond to the shoulder 108 and can mark such pixels as belonging to a fourth pixel class (not shown). Furthermore, the deep learning neural network 402 can recognize which pixels in the image 700 make-up, belong to, or otherwise correspond to the object 702 and can mark such pixels as belonging to a fifth pixel class (not shown). In various instances, the deep learning neural network 402 can determine which lanes or shoulders are affected by the object 702, based on how such pixel classes neighbor each other. In this non-limiting example, any pixel within the fifth pixel class would have as an immediate neighbor another pixel from the fifth pixel class or a pixel from the third pixel class, and such pixel would not have as an immediate neighbor any pixels from the first, second, or fourth pixel classes. Accordingly, the deep learning neural network 402 can interpret this to mean that the object 702 is obstructing the shoulder 106 and not the lane 102, the lane 104, or the shoulder 108.

In still other cases, the deep learning neural network 402 can determine (e.g., via bounding boxes or segmentation masks, as described above) that the object 702 is obstructing the shoulder 106 and not the lane 102, the lane 104, or the shoulder 108, and the unsafe driving condition localization 404 can be a classification label indicating such.

Now, consider FIG. 8, which illustrates an image 800. In various cases, the image 800 can be any of the set of roadside images 312. As shown in the non-limiting example of FIG. 8, the image 800 can depict the lane 102, the lane 104, the shoulder 106, the shoulder 108, the non-road region 602, and the non-road region 604, from a forward-facing perspective of the vehicle 112.

In various aspects, as shown, the image 800 can depict an object 802 in the lane 102, in the lane 104, and in the shoulder 106. As mentioned above, such object can, as some non-limiting examples, be a pothole, a fallen tree branch, a fallen rock, a piece of discarded or lost furniture, a fallen power line, a damaged tire, a stationary or stranded vehicle, a damaged or toppled vehicle, a speeding or wrong-way vehicle, an animal, an ice patch, a flood patch, a fog patch, or a pedestrian. In any case, the deep learning neural network 402 can detect or localize the object 802, and the unsafe driving condition localization 404 can indicate or otherwise convey that the object 802 is obstructing the lane 102, the lane 104, and the shoulder 106.

In some cases, the unsafe driving condition localization 404 can indicate that the object 802 is obstructing the lane 102, the lane 104, and the shoulder 106 via one or more bounding boxes. Indeed, as mentioned above, the image 800 can be within the set of roadside images 312. Accordingly, the deep learning neural network 402 can receive the image 800 as input, and the deep learning neural network 402 can produce the unsafe driving condition localization 404 based at least in part on the image 800. In various aspects, the unsafe driving condition localization 404 can be a version of the image 800 over which various bounding boxes (not shown) are superimposed. For example, the deep learning neural network 402 can recognize which pixels in the image 800 make-up, belong to, or otherwise correspond to the lane 102 and can circumscribe such pixels with a first bounding box (not shown). Similarly, the deep learning neural network 402 can recognize which pixels in the image 800 make-up, belong to, or otherwise correspond to the lane 104 and can circumscribe such pixels with a second bounding box (not shown). Likewise, the deep learning neural network 402 can recognize which pixels in the image 800 make-up, belong to, or otherwise correspond to the shoulder 106 and can circumscribe such pixels with a third bounding box (not shown). Moreover, the deep learning neural network 402 can recognize which pixels in the image 800 make-up, belong to, or otherwise correspond to the shoulder 108 and can circumscribe such pixels with a fourth bounding box (not shown). Furthermore, the deep learning neural network 402 can recognize which pixels in the image 800 make-up, belong to, or otherwise correspond to the object 802 and can circumscribe such pixels with a fifth bounding box (not shown). In various instances, the deep learning neural network 402 can determine which lanes or shoulders are affected by the object 802, based on how such bounding boxes intersect or overlap. In this non-limiting example, the fifth bounding box would intersect the first, second, and third bounding boxes and would not intersect the fourth bounding box. Accordingly, the deep learning neural network 402 can interpret this to mean that the object 802 is obstructing the lane 102, the lane 104, and the shoulder 106 but not the shoulder 108.

In other cases, the unsafe driving condition localization 404 can indicate that the object 802 is obstructing the lane 102, the lane 104, and the shoulder 106 via one or more pixel-wise segmentation masks. Again, as mentioned above, the image 800 can be within the set of roadside images 312. Accordingly, the deep learning neural network 402 can receive the image 800 as input, and the deep learning neural network 402 can produce the unsafe driving condition localization 404 based at least in part on the image 800. In various aspects, the unsafe driving condition localization 404 can be a segmentation mask of the image 800, where such segmentation mask can indicate which specific pixels make-up or otherwise belong to which classes of the image 800. For example, the deep learning neural network 402 can recognize which pixels in the image 800 make-up, belong to, or otherwise correspond to the lane 102 and can mark such pixels as belonging to a first pixel class (not shown). Similarly, the deep learning neural network 402 can recognize which pixels in the image 800 make-up, belong to, or otherwise correspond to the lane 104 and can mark such pixels as belonging to a second pixel class (not shown). Likewise, the deep learning neural network 402 can recognize which pixels in the image 800 make-up, belong to, or otherwise correspond to the shoulder 106 and can mark such pixels as belonging to a third pixel class (not shown). Moreover, the deep learning neural network 402 can recognize which pixels in the image 800 make-up, belong to, or otherwise correspond to the shoulder 108 and can mark such pixels as belonging to a fourth pixel class (not shown). Furthermore, the deep learning neural network 402 can recognize which pixels in the image 800 make-up, belong to, or otherwise correspond to the object 802 and can mark such pixels as belonging to a fifth pixel class (not shown). In various instances, the deep learning neural network 402 can determine which lanes or shoulders are affected by the object 802, based on how such pixel classes neighbor each other. In this non-limiting example, any pixel within the fifth pixel class would have as an immediate neighbor another pixel from the fifth pixel class or a pixel from the first, second, or third pixel classes, and such pixel would not have as an immediate neighbor any pixel from the fourth pixel class. Accordingly, the deep learning neural network 402 can interpret this to mean that the object 802 is obstructing the lane 102, the lane 104, and the shoulder 106 but not the shoulder 108.

In still other cases, the deep learning neural network 402 can determine (e.g., via bounding boxes or segmentation masks, as described above) that the object 802 is obstructing the lane 102, the lane 104, and the shoulder 106 but not the shoulder 108, and the unsafe driving condition localization 404 can be a classification label indicating such.

In any case, the inference component 210 can execute the deep learning neural network 402 on the roadside data 208, thereby yielding the unsafe driving condition localization 404. In various cases, the unsafe driving condition localization 404 can indicate that the unsafe driving condition has been located or otherwise detected in specific lanes or shoulders of the road 100. However, this is a mere non-limiting example. In some cases, the unsafe driving condition localization 404 can indicate that no unsafe driving condition has been located or detected in specific lanes or shoulders of the road 100 (e.g., the deep learning neural network 402 can have been unable to identify any object obstructing the lane 102, obstructing the lane 104, obstructing the shoulder 106, or obstructing the shoulder 108).

Figure 9:
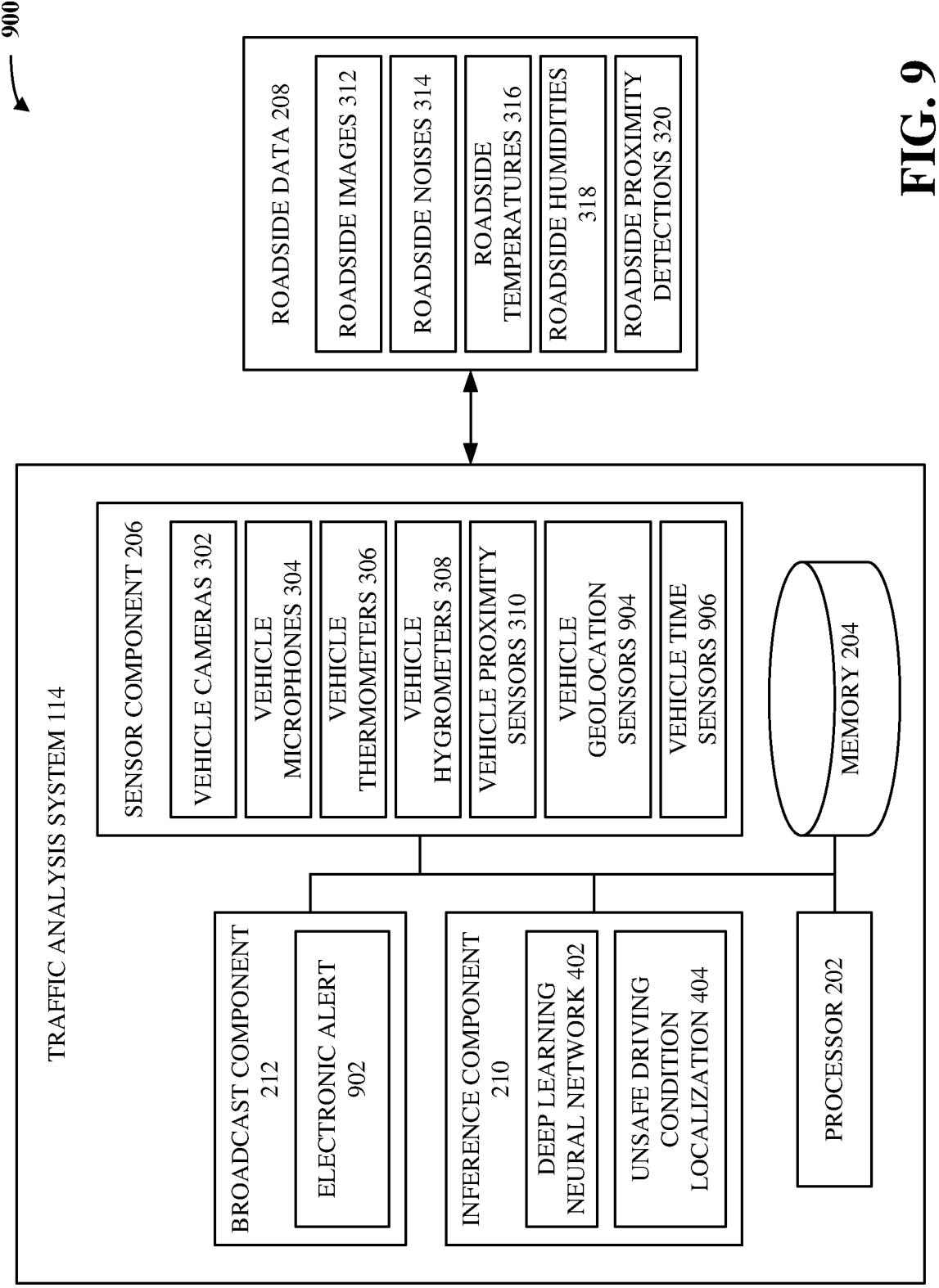
FIG. 9 illustrates a block diagram of an example, non-limiting system including an electronic alert that facilitates a broadcast-side of peer-to-peer vehicular provision of artificially intelligent traffic analysis in accordance with one or more embodiments described herein.

FIG. 9 illustrates a block diagram of an example, non-limiting system 900 including an electronic alert that can facilitate a broadcast-side of peer-to-peer vehicular provision of artificially intelligent traffic analysis in accordance with one or more embodiments described herein. As shown, the system 900 can, in some cases, comprise the same components as the system 400, and can further comprise an electronic alert 902, a set of vehicle geolocation sensors 904, or a set of vehicle time sensors 906.

In various embodiments, the broadcast component 212 can electronically generate an electronic alert 902, based on the unsafe driving condition localization 404. In various cases, the broadcast component 212 can electronically transmit, via the P2P communication link 120, the electronic alert 902 to the traffic analysis system 118. In this way, the vehicle 112 can be considered as informing or notifying the vehicle 116 of the unsafe driving condition localized by the deep learning neural network 402. Various non-limiting details are described with respect to FIG. 10.

Figure 10:
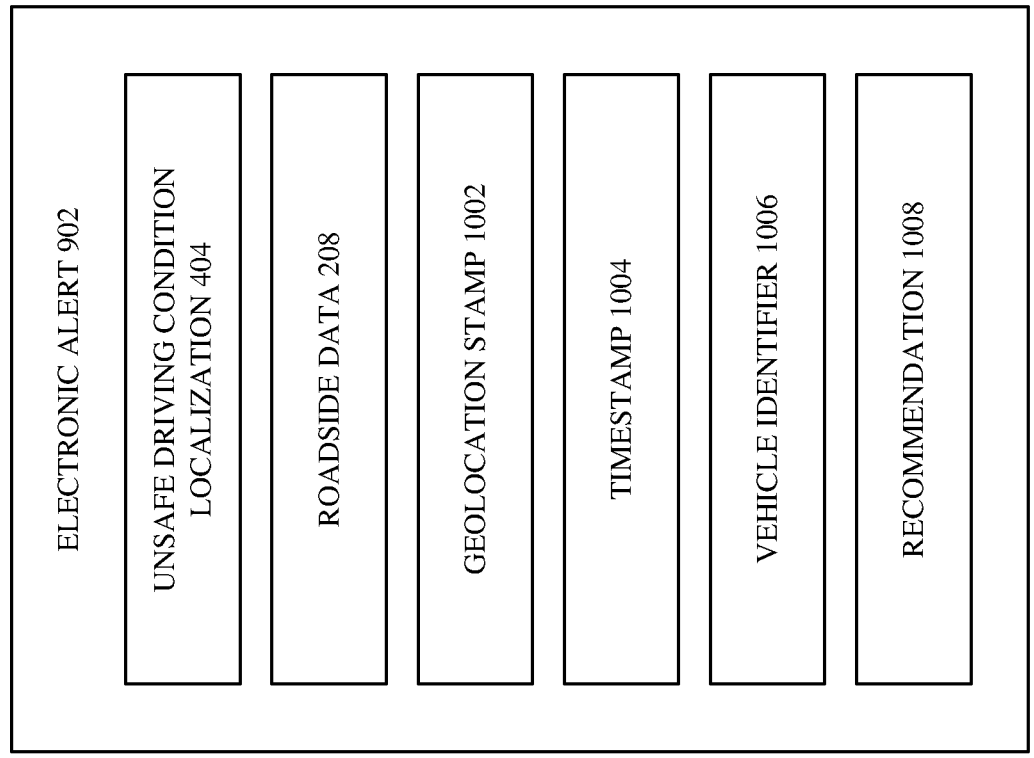
FIG. 10 illustrates an example, non-limiting block diagram of an electronic alert in accordance with one or more embodiments described herein.

FIG. 10 illustrates an example, non-limiting block diagram 1000 of the electronic alert 902 in accordance with one or more embodiments described herein. In various aspects, the electronic alert 902 can be or otherwise contain any suitable electronic data pertaining to the unsafe driving condition localization 404.

As a non-limiting example, the electronic alert 902 can comprise the unsafe driving condition localization 404 itself. That is, the electronic alert 902 can contain whatever data is outputted by the deep learning neural network 402.

As another non-limiting example, the electronic alert 902 can comprise the roadside data 208 (or any suitable portion thereof). That is, the electronic alert 902 can contain whatever raw data was recorded, measured, or otherwise captured by the sensor component 206 (e.g., can contain the set of roadside images 312, the set of roadside noises 314, the set of roadside temperatures 316, the set of roadside humidities 318, or the set of roadside proximity detections 320).

As yet another non-limiting example, the electronic alert 902 can comprise a geolocation stamp 1002. In various aspects, as shown in FIG. 9, the sensor component 206 can comprise the set of vehicle geolocation sensors 904. In various instances, the set of vehicle geolocation sensors 904 can include any suitable number of geolocation sensors that can be integrated into or onto the vehicle 112. In various cases, a geolocation sensor can be any suitable sensor that can measure or determine a geographical position of the vehicle 112 at any given instant in time. As a non-limiting example, a geolocation sensor can be a global positioning sensor (GPS). As another non-limiting example, a geolocation sensor can be a Wi-Fi positioning sensor (WFS). In any case, the set of vehicle geolocation sensors 904 can electronically determine or otherwise generate the geolocation stamp 1002.

In various aspects, the geolocation stamp 1002 can be any suitable electronic data (e.g., can be one or more scalars, one or more vectors, one or more matrices, one or more tensors, one or more character strings, or any suitable combination thereof) that can indicate a roadside position along the road 100 at which the roadside data 208 was captured, measured, or otherwise recorded. In various instances, the geolocation stamp 1002 can recite such roadside position at any suitable level of granularity (e.g., can specify continent, country, state, province, city, address, latitude, longitude, or elevation at which the roadside data 208 was captured). For example, the geolocation stamp 1002 can specify a name or identifier of the road 100, and the geolocation stamp 1002 can specify a mile-marker along the road 100, at which mile-marker the roadside data 208 was captured by the sensor component 206. In any case, because the geolocation stamp 1002 can indicate the roadside position along the road 100 at which the roadside data 208 was captured, and because the unsafe driving condition can be detected or localized based on the roadside data 208, the geolocation stamp 1002 can be considered as indicating the roadside position (e.g., the mile-marker) along the road 100 at which the unsafe driving condition was detected (e.g., at which the unsafe driving condition is present or is inferred to be present).

As even another non-limiting example, the electronic alert 902 can comprise a timestamp 1004. In various aspects, as shown in FIG. 9, the sensor component 206 can comprise the set of vehicle time sensors 906. In various instances, the set of vehicle time sensors 906 can include any suitable number of time sensors that can be integrated into or onto the vehicle 112. In various cases, a time sensor can be any suitable sensor that can measure or determine a time at which the vehicle 112 performs any given action. As a non-limiting example, a time sensor can be a digital clock. In any case, the set of vehicle time sensors 906 can electronically determine or otherwise generate the timestamp 1004.

In various aspects, the timestamp 1004 can be any suitable electronic data (e.g., can be one or more scalars, one or more vectors, one or more matrices, one or more tensors, one or more character strings, or any suitable combination thereof) that can indicate a time or date at which the roadside data 208 was captured, measured, or otherwise recorded. In various instances, the timestamp 1004 can recite such time or date at any suitable level of granularity (e.g., can specify year, season, month, week, day, hour, minute, second, or fraction of a second at which the roadside data 208 was captured). In any case, because the timestamp 1004 can indicate when the roadside data 208 was captured, and because the unsafe driving condition can be detected or localized based on the roadside data 208, the timestamp 1004 can be considered as indicating when the unsafe driving condition was detected (e.g., indicating a time at which the unsafe driving condition is present or is inferred to be present).

As still another non-limiting example, the electronic alert 902 can comprise a vehicle identifier 1006. In various aspects, the vehicle identifier 1006 can be any suitable electronic data (e.g., can be one or more scalars, one or more vectors, one or more matrices, one or more tensors, one or more character strings, or any suitable combination thereof) that can uniquely represent or otherwise uniquely correspond to the vehicle 112. For example, the vehicle identifier 1006 can comprise a VIN of the vehicle 112. As another example, the vehicle identifier 1006 can comprise a license plate number of the vehicle 112. As yet another example, the vehicle identifier 1006 can comprise make or model of the vehicle 112. As even another example, the vehicle identifier 1006 can comprise any suitable identification information of an owner of the vehicle 112, such as name, age, gender, or residential address. In various cases, any of such information can be hard-coded into the traffic analysis system 114.

In some aspects, the vehicle identifier 1006 can comprise any suitable identification information pertaining to a driver of the vehicle 112. In some cases, the driver of the vehicle 112 can be the owner of the vehicle 112. However, in other cases, the driver of the vehicle 112 can be different from the owner of the vehicle 112. In various aspects, although not explicitly shown in the figures, the sensor component 206 can comprise any suitable biometric sensors that can be integrated into or onto the vehicle 112. In various instances, such biometric sensors can be implemented to identify the current driver of the vehicle 112. For example, such biometric sensors can include: a facial recognition sensor (e.g., an interior camera of the vehicle 112 can capture an image of a face of whomever is driving the vehicle 112); a fingerprint sensor (e.g., a steering wheel of the vehicle 112 can be embedded with fingerprint sensors that can scan fingerprints of whomever is driving the vehicle 112); a voice recognition sensor (e.g., an interior microphone of the vehicle 112 can capture an audio clip of a voice of whomever is driving the vehicle 112); or a weight sensor (e.g., a weight scale can be embedded into a driver seat of the vehicle 112, so as to capture a body weight of whomever is driving the vehicle 112). In other instances, although not explicitly shown in the figures, the sensor component 206 can comprise any suitable beacon-detector that can detect when a defined electronic beacon has entered a cabin of the vehicle. In such case, the beacon-detector can detect an electronic beacon emitted by any suitable electronic device of whomever is driving the vehicle 112 (e.g., emitted by a smart phone of the driver, emitted by a smart watch of the driver), where such electronic beacon can uniquely correspond to an identity of the current driver.

As yet another non-limiting example, the electronic alert 902 can comprise a recommendation 1008. In various aspects, the recommendation 1008 can be any suitable electronic data (e.g., can be one or more scalars, one or more vectors, one or more matrices, one or more tensors, one or more character strings, or any suitable combination thereof) that can indicate, represent, or otherwise convey a recommended course of action to be taken in response to the unsafe driving condition. In some cases, the recommendation 1008 can be suggest that obstructed lanes be avoided or that extra caution be used when passing obstructed shoulders.

For example, suppose that the unsafe driving condition localization 404 indicates that the unsafe driving condition obstructs the lane 102 at the roadside position indicated by the geolocation stamp 1002. In such case, the recommendation 1008 can suggest that the lane 102 be avoided at the roadside position indicated by the geolocation stamp 1002.

As another example, suppose that the unsafe driving condition localization 404 indicates that the unsafe driving condition obstructs the shoulder 108 but not the lane 102 or the lane 104, at the roadside position indicated by the geolocation stamp 1002. In such case, the recommendation 1008 can suggest that speed be reduced or that hazard lights be activated when passing the roadside position indicated by the geolocation stamp 1002.

In some cases, the recommendation 1008 can depend upon a granularity of the unsafe driving condition localization 404 (e.g., the more specific the unsafe driving condition localization is, the more specific the recommendation 1008 can be). For example, suppose that the unsafe driving condition localization 404 indicates that the shoulder 106 is obstructed not just by a stranded vehicle, but by a stranded gas vehicle (e.g., as opposed to a stranded electric vehicle). In such case, the recommendation 1008 can indicate a request for spare gasoline. In contrast, if the unsafe driving condition localization 404 instead indicates that the shoulder 106 is obstructed by a stranded electric vehicle, the recommendation 1008 can indicate a request for charging assistance. As another example, suppose that the unsafe driving condition localization 404 indicates that the lane 104 is obstructed not just by a pedestrian, but by an injured pedestrian. In such case, the recommendation 1008 can indicate a request for medical assistance. In contrast, if the unsafe driving condition localization 404 instead indicates that the lane 104 is obstructed by an uninjured pedestrian, the recommendation 1008 can indicate that the lane 104 be avoided and that extra caution be exercised.

Although not explicitly shown in the figures, the electronic alert 902 can be written or otherwise organized according to any suitable protocol or syntax (e.g., can have any suitable header, can have any suitable body).

In any case, the broadcast component 212 can generate the electronic alert 902 based on the unsafe driving condition localized by the deep learning neural network 402, and the broadcast component 212 can transmit the electronic alert 902 to the traffic analysis system 118, via the P2P communication link 120.

To help ensure that the unsafe driving condition localization 404 is accurate, the deep learning neural network 402 can first undergo training. Various non-limiting aspects of such training are described with respect to FIGS. 11-13.

Figure 11:
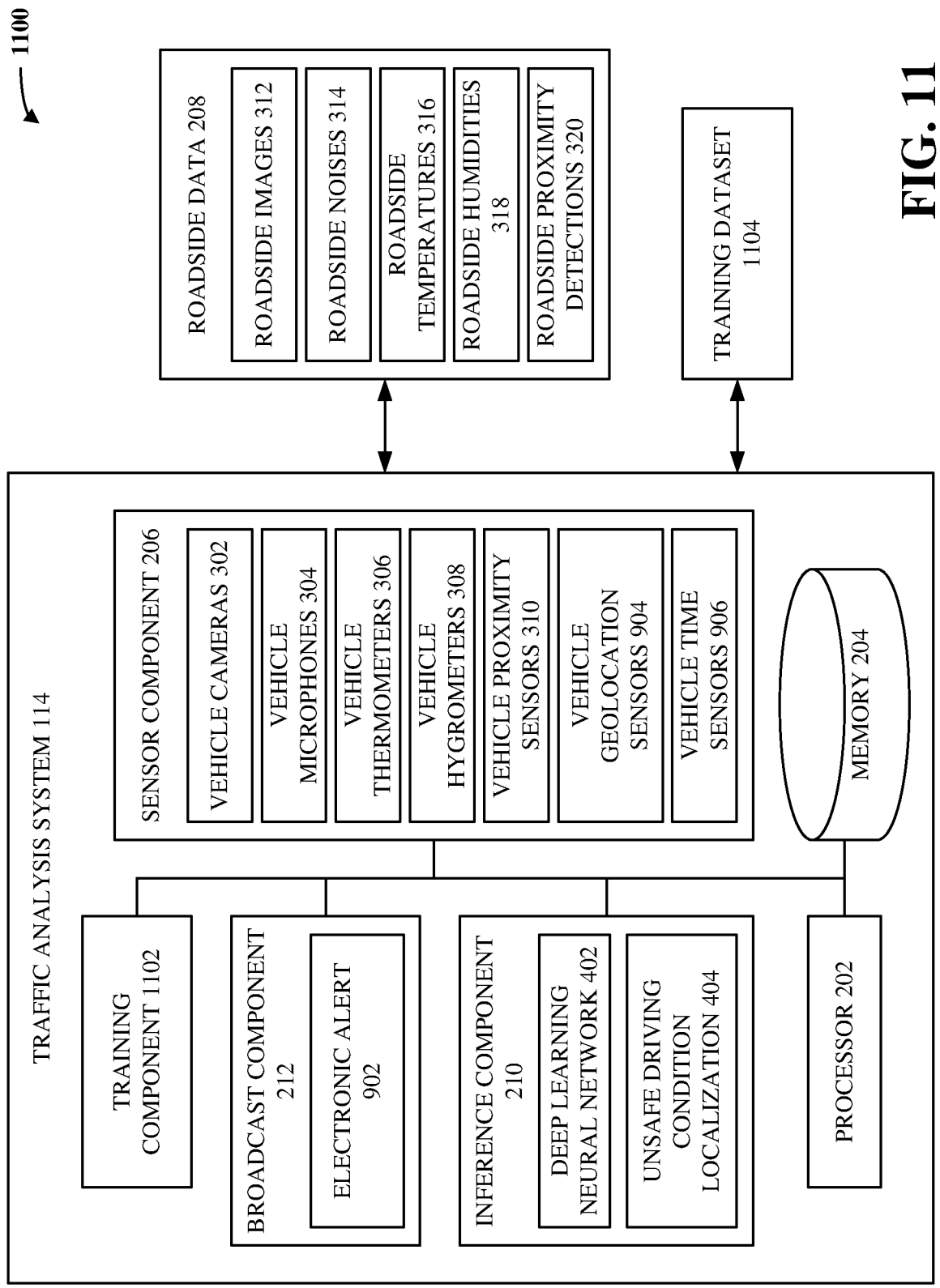
FIG. 11 illustrates a block diagram of an example, non-limiting system including a training component and a training dataset that facilitates a broadcast-side of peer-to-peer vehicular provision of artificially intelligent traffic analysis in accordance with one or more embodiments described herein.

FIG. 11 illustrates a block diagram of an example, non-limiting system 1100 including a training component and a training dataset that can facilitate a broadcast-side of peer-to-peer vehicular provision of artificially intelligent traffic analysis in accordance with one or more embodiments described herein. As shown, the system 1100 can, in some cases, comprise the same components as the system 900, and can further comprise a training component 1102 or a training dataset 1104.

In various aspects, the training component 1102 can electronically receive, retrieve, obtain, or otherwise access, from any suitable source, the training dataset 1104. In various aspects, the training component 1102 can train the deep learning neural network 402 based on the training dataset 1104. Various non-limiting aspects are described with respect to FIGS. 12-13.

Figure 12:
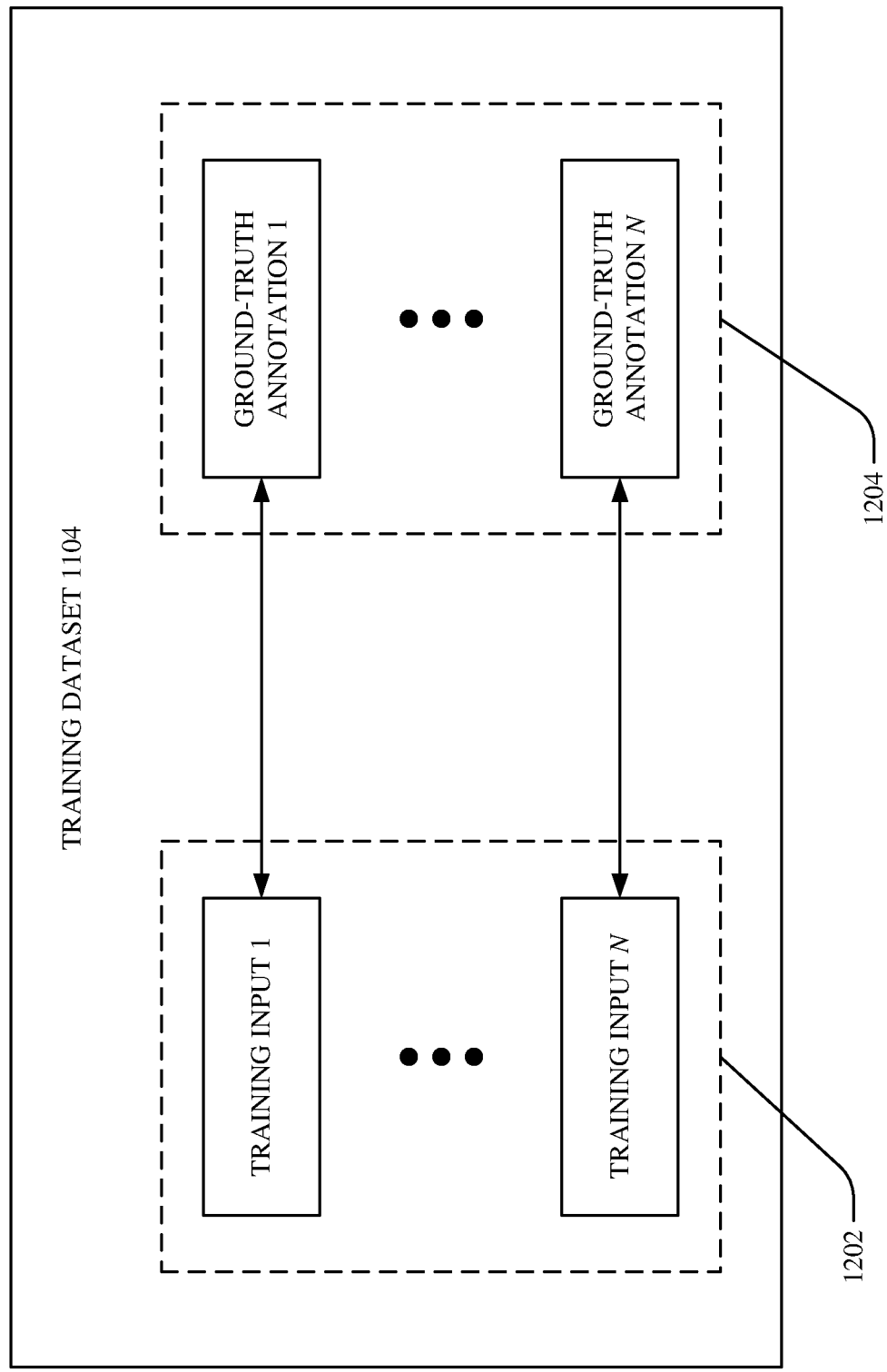
FIG. 12 illustrates an example, non-limiting block diagram of a training dataset in accordance with one or more embodiments described herein.

FIG. 12 illustrates an example, non-limiting block diagram 1200 of the training dataset 1104 in accordance with one or more embodiments described herein. As shown, the training dataset 1104 can, in various aspects, comprise a set of training inputs 1202 and a set of ground-truth annotations 1204.

In various aspects, the set of training inputs 1202 can include n inputs for any suitable positive integer n: a training input 1 to a training input n. In various instances, a training input can be any suitable electronic data having the same format, size, or dimensionality as the roadside data 208. In other words, each training input can be raw data captured by sensors of a vehicle that were monitoring a respective road. For example, the training input 1 can include a first set of training roadside images depicting portions of a first road, a first set of training roadside noises that occurred on those portions of the first road, a first set of training roadside temperatures associated with those portions of the first road, a first set of training roadside humidities associated with those portions of the first road, or a first set of training roadside proximity detections associated with those portions of the first road. Likewise, as another example, the training input n can include an n-th set of training roadside images depicting portions of an n-th road, an n-th set of training roadside noises that occurred on those portions of the n-th road, an n-th set of training roadside temperatures associated with those portions of the n-th road, an n-th set of training roadside humidities associated with those portions of the n-th road, or an n-th set of training roadside proximity detections associated with those portions of the n-th road.

In various aspects, the set of ground-truth annotations 1204 can respectively correspond (e.g., in one-to-one fashion) to the set of training inputs 1202. Thus, since the set of training inputs 1202 can have n inputs, the set of ground-truth annotations 1204 can have n annotations: a ground-truth annotation 1 to a ground-truth annotation n. In various instances, each of the set of ground-truth annotations 1204 can have the same format, size, or dimensionality as the unsafe driving condition localization 404. That is, each ground-truth annotation can be any suitable electronic data that indicates or represents (e.g., via bounding boxes, segmentation masks, or classification labels) an unsafe driving condition that is known or deemed to be manifested in a respect training input. For example, the ground-truth annotation 1 can correspond to the training input 1. Accordingly, the ground-truth annotation 1 can be considered as the correct or accurate bounding boxes, as the correct or accurate segmentation mask, or as the correct or accurate classification label that localizes whatever unsafe driving condition is known or deemed to be manifested in the training input 1. As another example, the ground-truth annotation n can correspond to the training input n. Accordingly, the ground-truth annotation n can be considered as the correct or accurate bounding boxes, as the correct or accurate segmentation mask, or as the correct or accurate classification label that localizes whatever unsafe driving condition is known or deemed to be manifested in the training input n.

Figure 13:
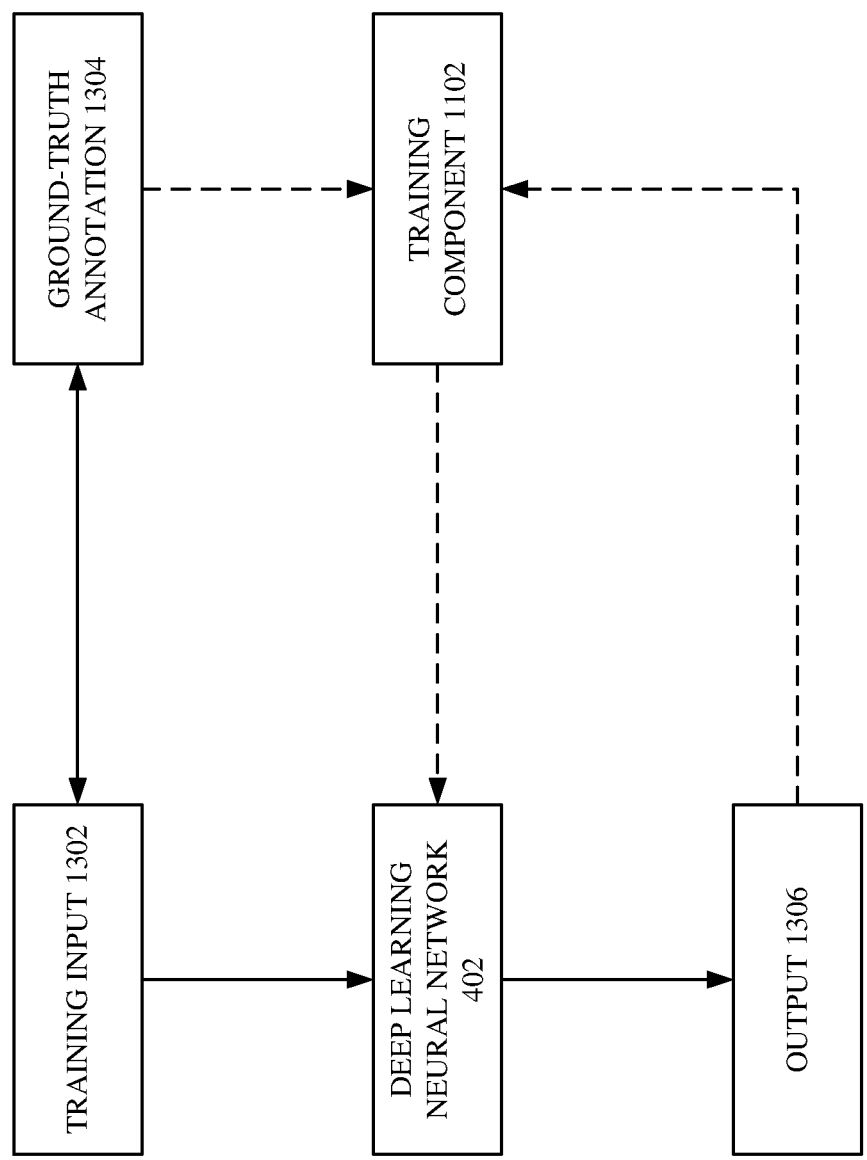
FIG. 13 illustrates an example, non-limiting block diagram showing how a deep learning neural network can be trained in accordance with one or more embodiments described herein.

Now, consider FIG. 13. FIG. 13 illustrates an example, non-limiting block diagram 1300 showing how the deep learning neural network 402 can be trained in accordance with one or more embodiments described herein.

In various aspects, the training component 1102 can, prior to beginning training, initialize in any suitable fashion (e.g., random initialization) the trainable internal parameters (e.g., convolutional kernels, weight matrices, bias values) of the deep learning neural network 402.

In various aspects, the training component 1102 can select, from the training dataset 1104, a training input 1302 and a ground-truth annotation 1304 corresponding to the training input 1302. In various instances, the training component 1102 can execute the deep learning neural network 402 on the training input 1302, thereby causing the deep learning neural network 402 to produce an output 1306. More specifically, in some cases, an input layer of the deep learning neural network 402 can receive the training input 1302, the training input 1302 can complete a forward pass through one or more hidden layers of the deep learning neural network 402, and an output layer of the deep learning neural network 402 can compute the output 1306 based on activation maps or intermediate features provided by the one or more hidden layers.

In various aspects, the output 1306 can be considered as the predicted or inferred unsafe driving condition localization (e.g., as the predicted/inferred bounding boxes, the predicted/inferred segmentation mask, or the predicted/inferred classification label) that the deep learning neural network 402 believes should correspond to the training input 1302. In contrast, the ground-truth annotation 1304 can be considered as the correct/accurate unsafe driving condition localization (e.g., the correct/accurate bonding boxes, the correct/accurate segmentation mask, the correct/accurate classification labels) that is known or deemed to correspond to the training input 1302. Note that, if the deep learning neural network 402 has so far undergone no or little training, then the output 1306 can be highly inaccurate. In other words the output 1306 can be very different from the ground-truth annotation 1304 (e.g., the predicted/inferred bounding boxes can be very different from the correct/accurate bounding boxes; the predicted/inferred segmentation mask can be very different from the correct/accurate segmentation mask; the predicted/inferred classification label can be very different from the correct/accurate classification label).

In various aspects, the training component 1102 can compute one or more errors or losses (e.g., MAE, MSE, cross-entropy) between the output 1306 and the ground-truth annotation 1304. In various instances, the training component 1102 can incrementally update, via backpropagation, the trainable internal parameters of the deep learning neural network 402, based on such one or more errors or losses.

In various cases, the training component 1102 can repeat such execution-and-update procedure for each training input in the training dataset 1104. This can ultimately cause the trainable internal parameters of the deep learning neural network 402 to become iteratively optimized for accurately localizing unsafe driving conditions in inputted roadside data. In various aspects, the training component 1102 can implement any suitable training batch sizes, any suitable error/loss functions, or any suitable training termination criteria.

Figure 14:
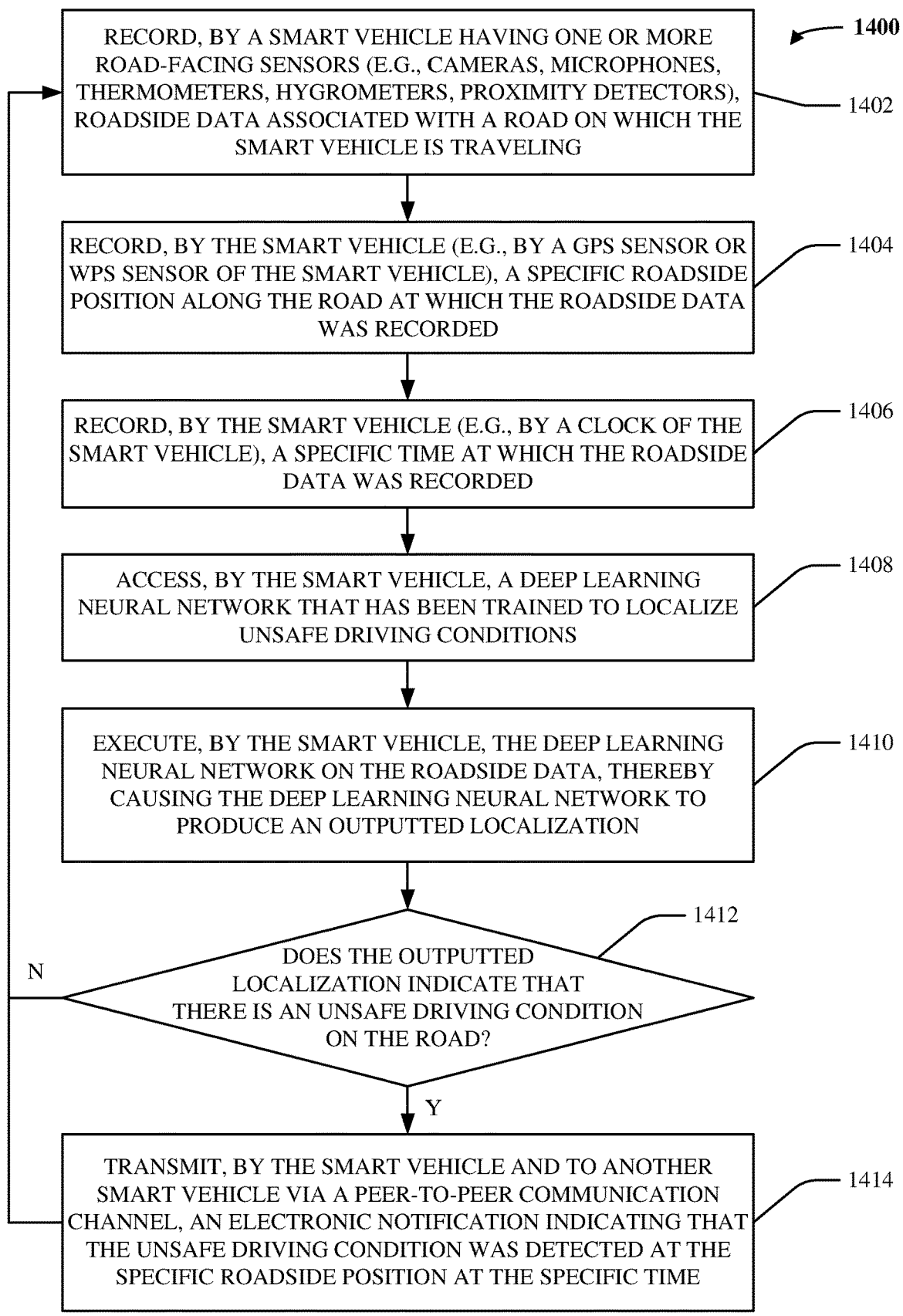
FIGS. 14-15 illustrate flow diagrams of example, non-limiting computer-implemented methods that facilitate a broadcast-side of peer-to-peer vehicular provision of artificially intelligent traffic analysis in accordance with one or more embodiments described herein.
Figure 15:
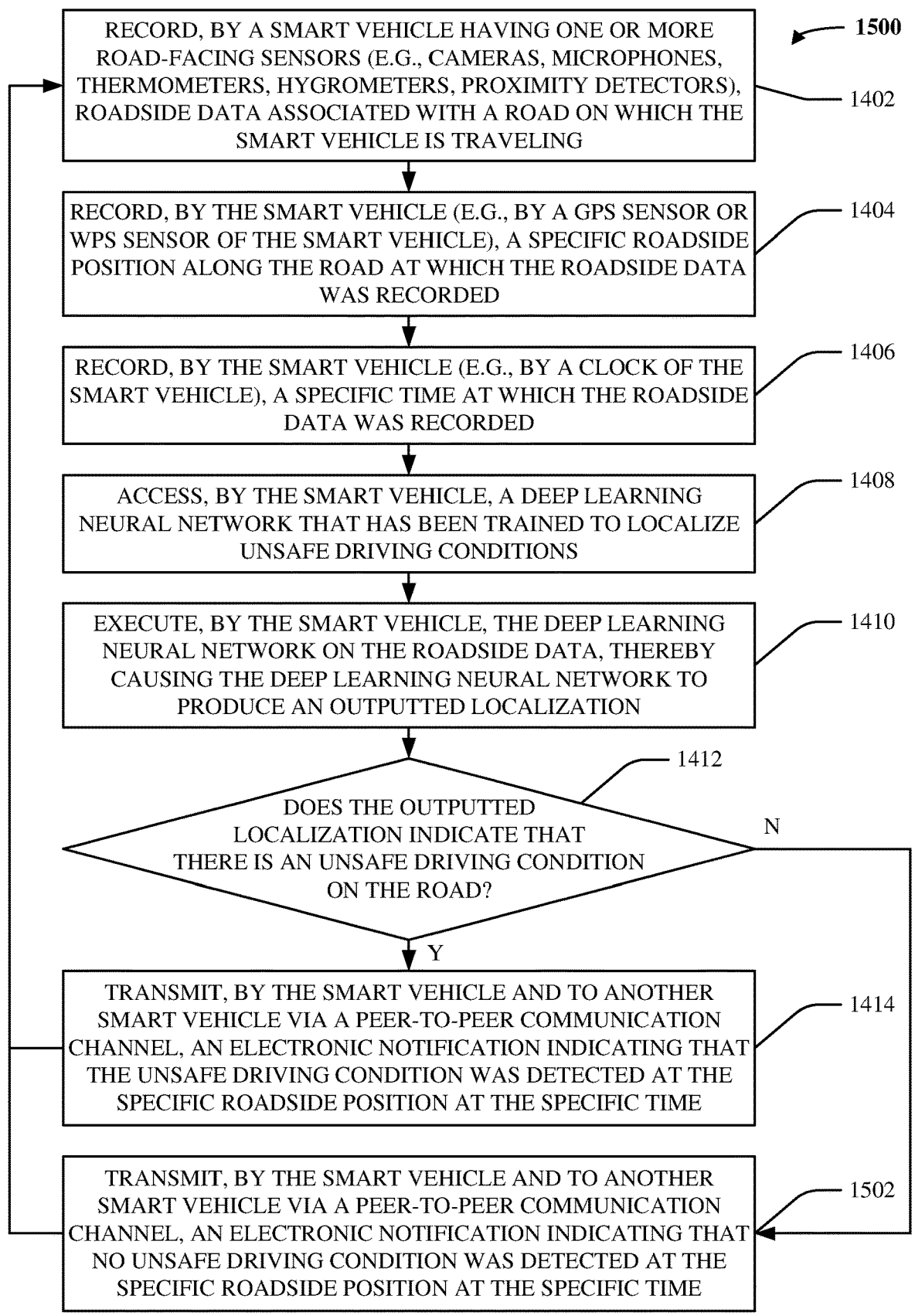

FIGS. 14-15 illustrate flow diagrams of example, non-limiting computer-implemented methods 1400 and 1500 that can facilitate a broadcast-side of peer-to-peer vehicular provision of artificially intelligent traffic analysis in accordance with one or more embodiments described herein. In various cases, the traffic analysis system 114 can facilitate the computer-implemented methods 1400 or 1500.

First, consider FIG. 14. In various embodiments, act 1402 can include recording, by a smart vehicle (e.g., 112) having one or more road-facing sensors (e.g., 206) roadside data (e.g., 208) associated with a road (e.g., 100) on which the smart vehicle is traveling. In some cases, the one or more road-facing sensors can include cameras (e.g., 302), microphones (e.g., 304), thermometers (e.g., 306), hygrometers (e.g., 308), or proximity detectors (e.g., 310).

In various aspects, act 1404 can include recording, by the smart vehicle, a specific roadside position (e.g., 1002) along the road at which the roadside data was recorded. In various cases, such recording can be facilitated by a GPS sensor or a WPS sensor (e.g., 904) of the smart vehicle.

In various instances, act 1406 can include recording, by the smart vehicle, a specific time (e.g., 1004) at which the roadside data was recorded. In various cases, such recording can be facilitated by a clock (e.g., 906) of the smart vehicle.

In various aspects, act 1408 can include accessing, by the smart vehicle (e.g., via 210), a deep learning neural network (e.g., 402) that has been trained to localized unsafe driving conditions.

In various instances, act 1410 can include executing, by the smart vehicle (e.g., via 210), the deep learning neural network on the roadside data. This can cause the deep learning neural network to produce an outputted localization (e.g., 404).

In various cases, act 1412 can include determining, by the smart vehicle (e.g., via 210), whether the outputted localization indicates that there is an unsafe driving condition on the road. If not (e.g., if the outputted localization indicates that there is no unsafe driving condition), the computer-implemented method 1400 can proceed back to act 1402. If so (e.g., if the outputted localization instead indicates that there is an unsafe driving condition), the computer-implemented method 1400 can proceed to act 1414.

In various aspects, act 1414 can include transmitting, by the smart vehicle (e.g., via 212) and to another smart vehicle (e.g., 116) via a peer-to-peer communication channel (e.g., 120), an electronic notification (e.g., 902). In various cases, the electronic notification can indicate that the unsafe driving condition was detected at the specific roadside position at the specific time (e.g., can indicate that the unsafe driving condition is inferred to have been present at the specific roadside position at the specific time).

Now, consider FIG. 15. In various embodiments, the computer-implemented method 1500 can comprise the acts 1402, 1404, 1406, 1408, 1410, 1412, and 1414, as described above. However, rather than proceeding from act 1412 back to act 1402 if the outputted localization indicates that there is no unsafe driving condition, the computer-implemented method 1500 can instead proceed to act 1502. In various aspects, act 1502 can include transmitting, by the smart vehicle (e.g., via 212) and to another smart vehicle (e.g., 116) via a peer-to-peer communication channel (e.g., 120), an electronic notification (e.g., 902). In various cases, the electronic notification can indicate that no unsafe driving condition was detected at the specific roadside position at the specific time (e.g., can indicate that no unsafe driving condition is inferred to have been present at the specific roadside position at the specific time).

Figure 16:
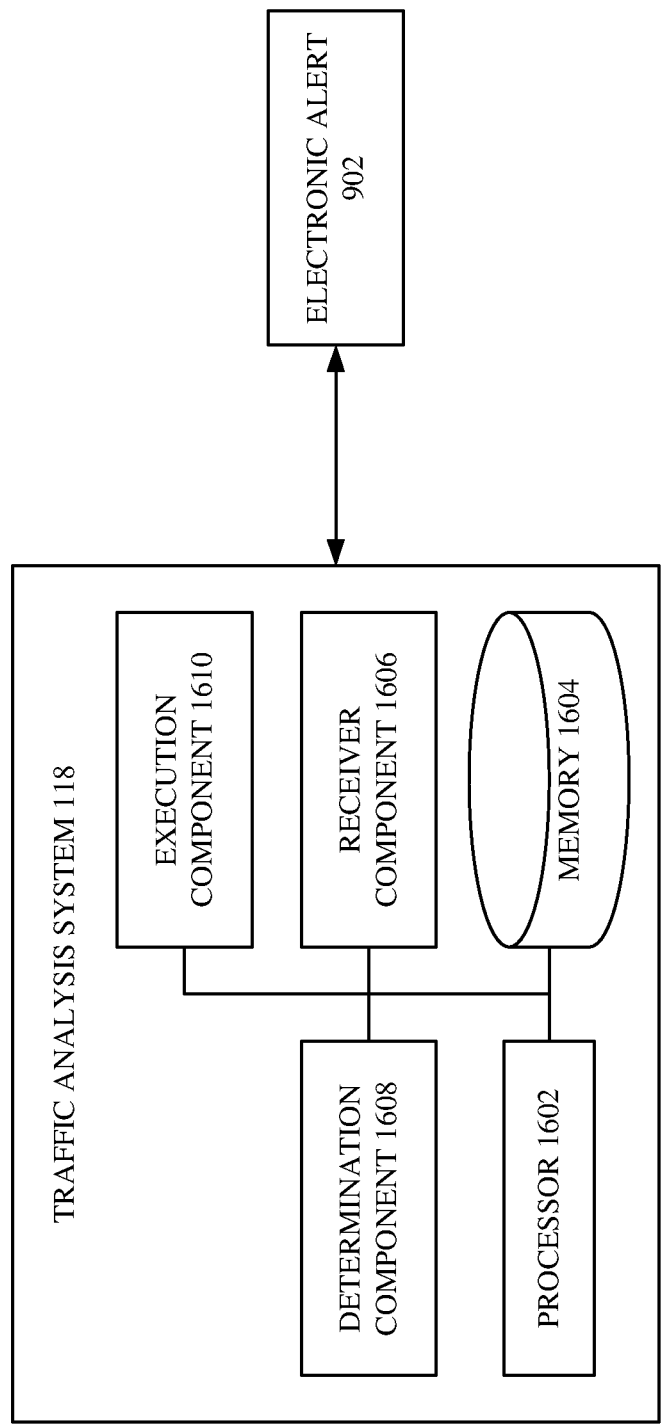
FIG. 16 illustrates a block diagram of an example, non-limiting system that facilitates a receipt-side of peer-to-peer vehicular provision of artificially intelligent traffic analysis in accordance with one or more embodiments described herein.

FIG. 16 illustrates a block diagram of an example, non-limiting system 1600 that can facilitate a receipt-side of peer-to-peer vehicular provision of artificially intelligent traffic analysis in accordance with one or more embodiments described herein. In other words, FIG. 16 depicts a non-limiting example embodiment of the traffic analysis system 118.

In various embodiments, the traffic analysis system 118 can comprise a processor 1602 (e.g., computer processing unit, microprocessor) and a non-transitory computer-readable memory 1604 that is operably or operatively or communicatively connected or coupled to the processor 1602. The non-transitory computer-readable memory 1604 can store computer-executable instructions which, upon execution by the processor 1602, can cause the processor 1602 or other components of the traffic analysis system 118 (e.g., receiver component 1606, determination component 1608, execution component 1610) to perform one or more acts. In various embodiments, the non-transitory computer-readable memory 1604 can store computer-executable components (e.g., receiver component 1606, determination component 1608, execution component 1610), and the processor 1602 can execute the computer-executable components.

In various embodiments, the traffic analysis system 118 can comprise a receiver component 1606. In various aspects, the receiver component 1606 can electronically receive, electronically retrieve, electronically obtain, or otherwise electronically access the electronic alert 902. In particular, the receiver component 1606 can be operatively or operably coupled or connected to the broadcast component 212 via the P2P communication link 120 (e.g., when the vehicle 112 and the vehicle 116 are separated by a distance no greater than the operable range of the P2P communication link 120). Accordingly, the receiver component 1606 can receive the electronic alert 902 from the broadcast component 212. Accordingly, other components of the traffic analysis system 118 can electronically interact with (e.g., read, write, edit, copy, manipulate) the electronic alert 902.

In various embodiments, the traffic analysis system 118 can comprise a determination component 1608. In various aspects, the determination component 1608 can, as described herein, determine whether or not the electronic alert 902 indicates that an unsafe driving condition is on the road 100.

In various embodiments, the traffic analysis system 118 can comprise an execution component 1610. In various instances, the execution component 1610 can, as described herein, initiate or otherwise perform any suitable electronic actions, in response to the determination component 1608 determining that the electronic alert 902 indicates that an unsafe driving condition is located on the road 100.

Figure 17:
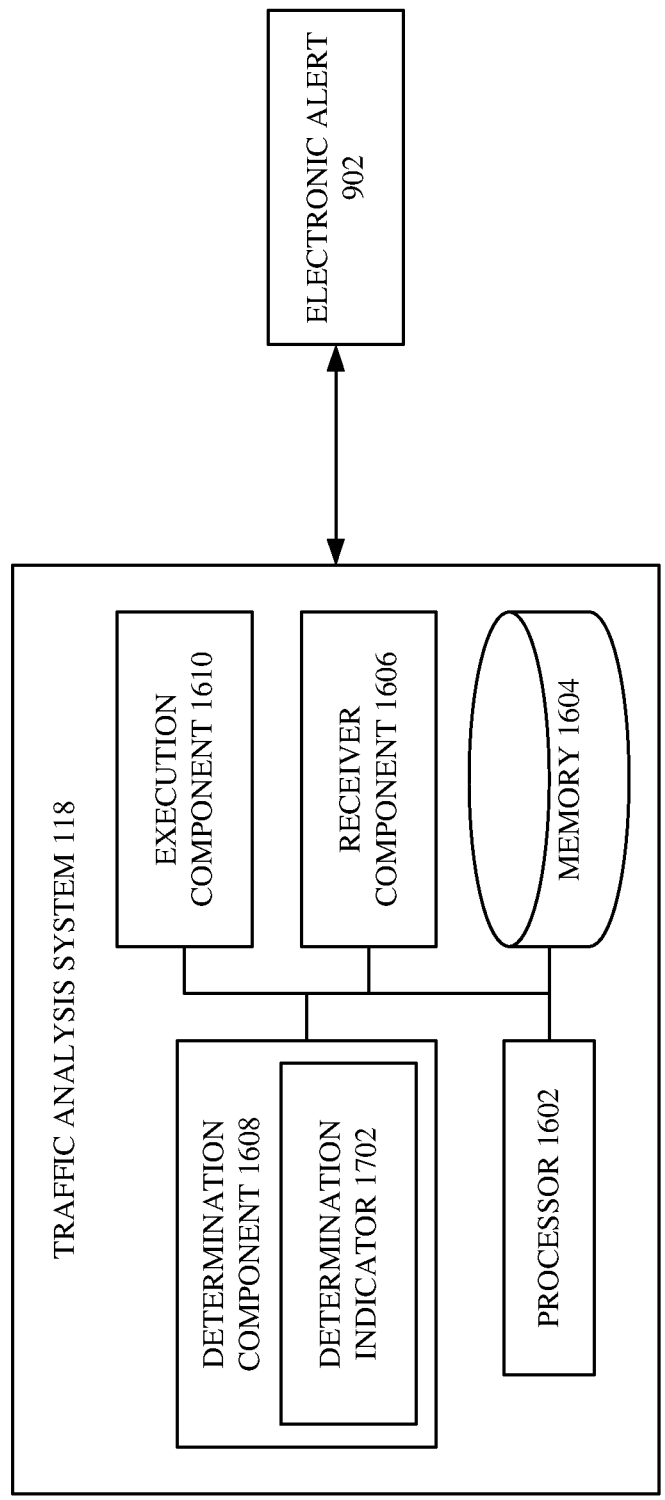
FIG. 17 illustrates a block diagram of an example, non-limiting system including a determination indicator that facilitates a receipt-side of peer-to-peer vehicular provision of artificially intelligent traffic analysis in accordance with one or more embodiments described herein.

FIG. 17 illustrates a block diagram of an example, non-limiting system 1700 including a determination indicator that can facilitate a receipt-side of peer-to-peer vehicular provision of artificially intelligent traffic analysis in accordance with one or more embodiments described herein. As shown, the system 1700 can, in some cases, comprise the same components as the system 1600, and can further comprise a determination indicator 1702.

In various embodiments, the determination component 1608 can electronically generate the determination indicator 1702, based on the electronic alert 902. More specifically, the determination component 1608 can, in various aspects, electronically read, via any suitable parsing techniques, the contents of the electronic alert 902. Accordingly, the determination component 1608 can identify, via such parsing techniques, the unsafe driving condition localization 404, the roadside data 208, the geolocation stamp 1002, the timestamp 1004, the vehicle identifier 1006, or the recommendation 1008.

In various cases, the determination component 1608 can generate the determination indicator 1702, based on the unsafe driving condition localization 404. In particular, the determination indicator 1702 can be any suitable binary variable (e.g., can be any suitable variable that can take on one of two distinct states). In various aspects, if the unsafe driving condition localization 404 indicates that an unsafe driving condition has been detected on the road 100, then the determination indicator 1702 can be set or otherwise configured to an active state. On the other hand, if the unsafe driving condition localization 404 instead indicates that no unsafe driving condition has been detected (yet) on the road 100, then the determination indicator 1702 can be set or otherwise configured to an inactive state.

In various embodiments, the execution component 1610 can conduct, initiate, facilitate, or otherwise perform any suitable electronic actions, in response to the determination indicator 1702 being in the active state (e.g., in response to a determination that the electronic alert 902 indicates that an unsafe driving condition has been detected on the road 100). In contrast, the execution component 1610 can, in various instances, refrain from conducting, initiating, facilitating, or otherwise performing such electronic actions, in response to the determination indicator 1702 being in the inactive state (e.g., in response to a determination that the electronic alert 902 indicates that no unsafe driving condition has been detected yet on the road 100). Various non-limiting examples of such electronic actions are described with respect to FIGS. 18-33.

Figure 18:
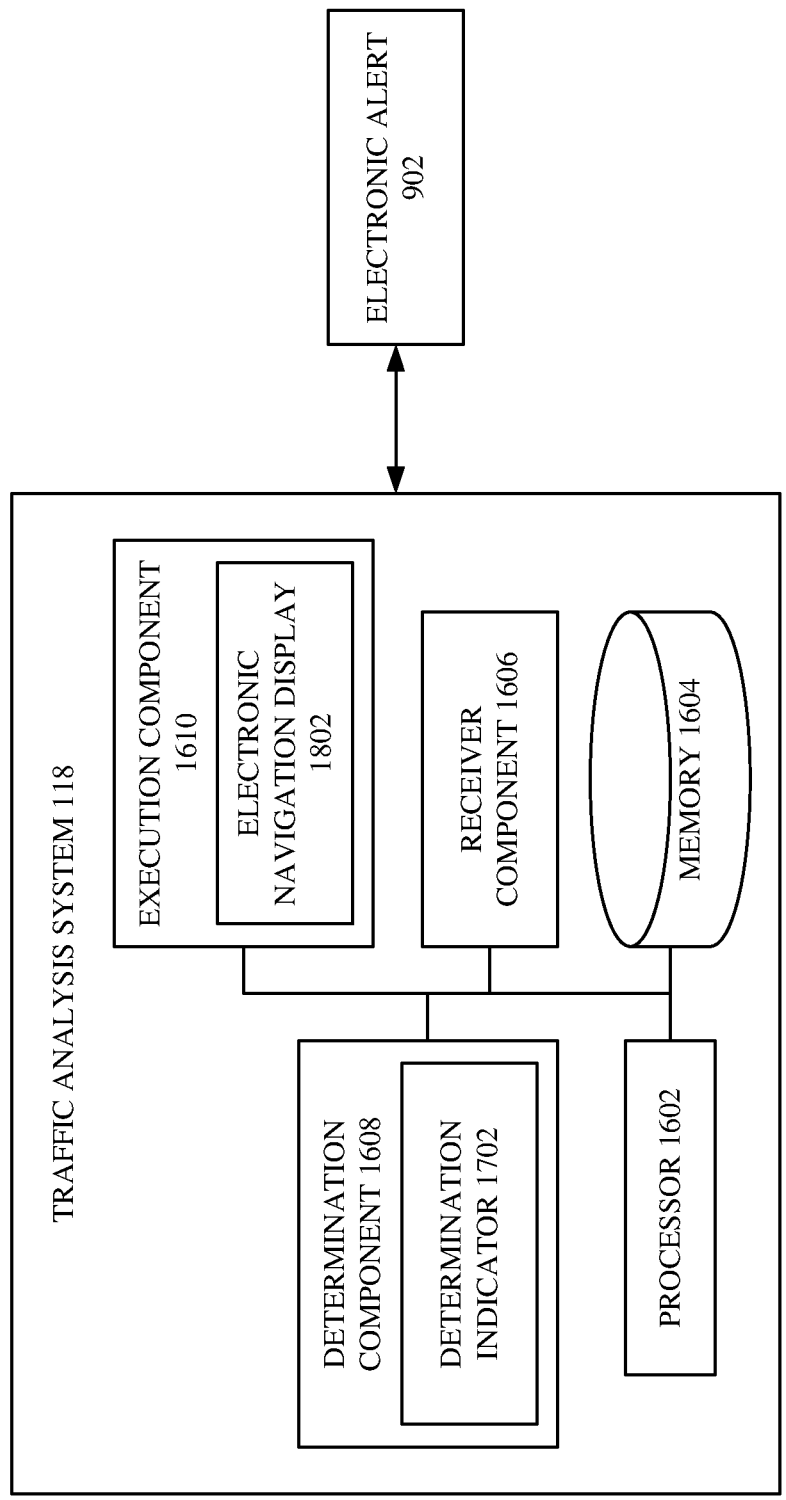
FIG. 18 illustrates a block diagram of an example, non-limiting system including an electronic navigation display that facilitates a receipt-side of peer-to-peer vehicular provision of artificially intelligent traffic analysis in accordance with one or more embodiments described herein.

FIG. 18 illustrates a block diagram of an example, non-limiting system 1800 including an electronic navigation display that can facilitate a receipt-side of peer-to-peer vehicular provision of artificially intelligent traffic analysis in accordance with one or more embodiments described herein. As shown, the system 1800 can, in some cases, comprise the same components as the system 1700, and can further comprise an electronic navigation display 1802.

In various embodiments, the vehicle 116 can be outfitted with the electronic navigation display 1802. In various aspects, the electronic navigation display 1802 can be any suitable computer monitor, computer screen, or visual projection that can visually render or otherwise illustrate navigation information (e.g., route data, traffic data) to a driver of the vehicle 116. In some cases, the electronic navigation display 1802 can be built into a dashboard of the vehicle 116. In other cases, the electronic navigation display 1802 can be built into a center console of the vehicle 116. In still other cases, the electronic navigation display 1802 can be a heads-up display that is projected onto a portion of a front windshield of the vehicle 116. In any case, in response to the determination indicator 1702 being in the active state (e.g., in response to the electronic alert 902 indicating that an unsafe driving condition has been detected on the road 100), the execution component 1610 can electronically render any suitable graphical representations of the unsafe driving condition on the electronic navigation display 1802. Such graphical representations can be visible to a driver of the vehicle 116, so that the driver of the vehicle 116 can be notified of the unsafe driving condition. Various non-limiting details are described with respect to FIGS. 19-20.

Figure 19:
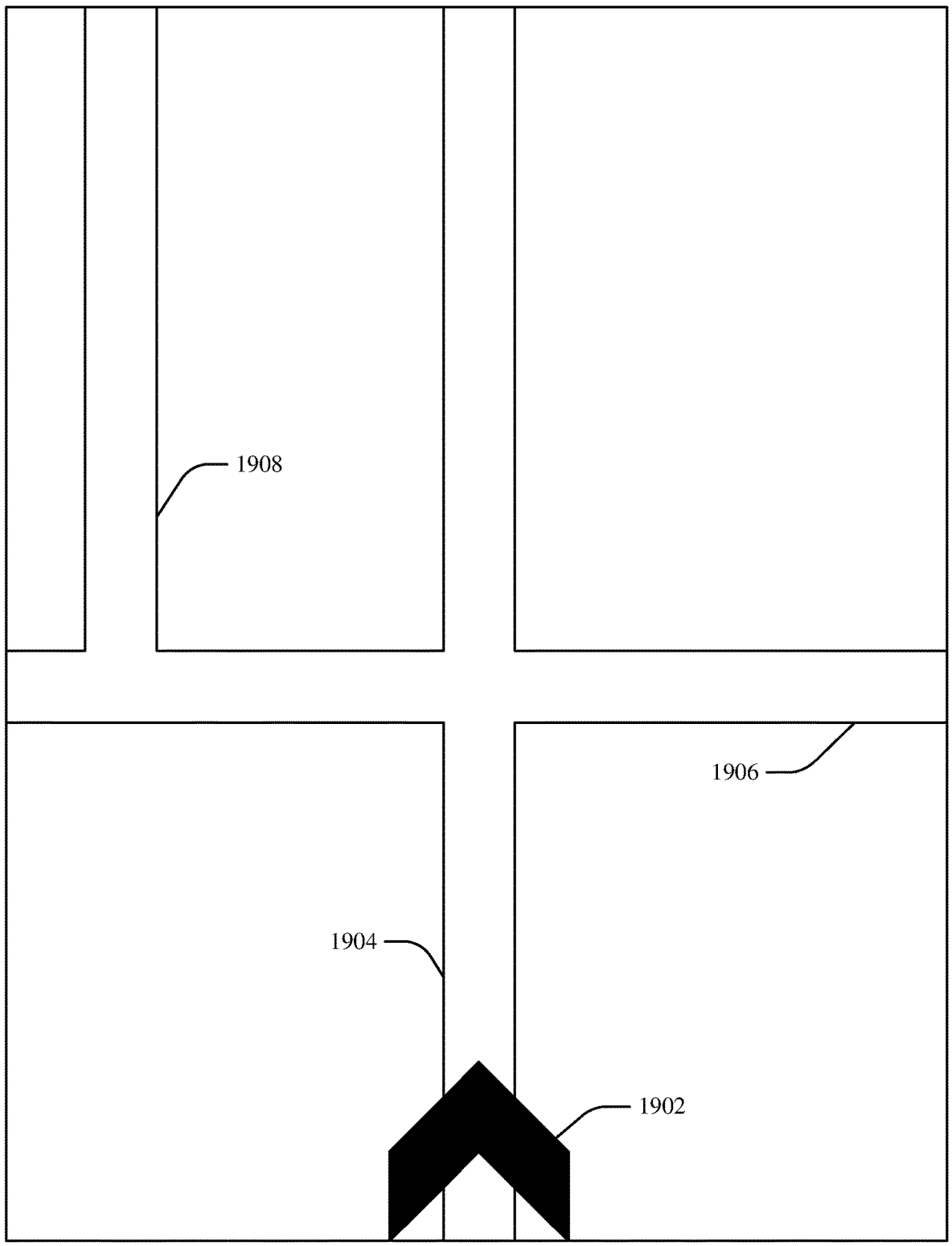
FIGS. 19-20 illustrate example, non-limiting block diagrams showing how an electronic navigation display can be adjusted in accordance with one or more embodiments described herein.
Figure 20:
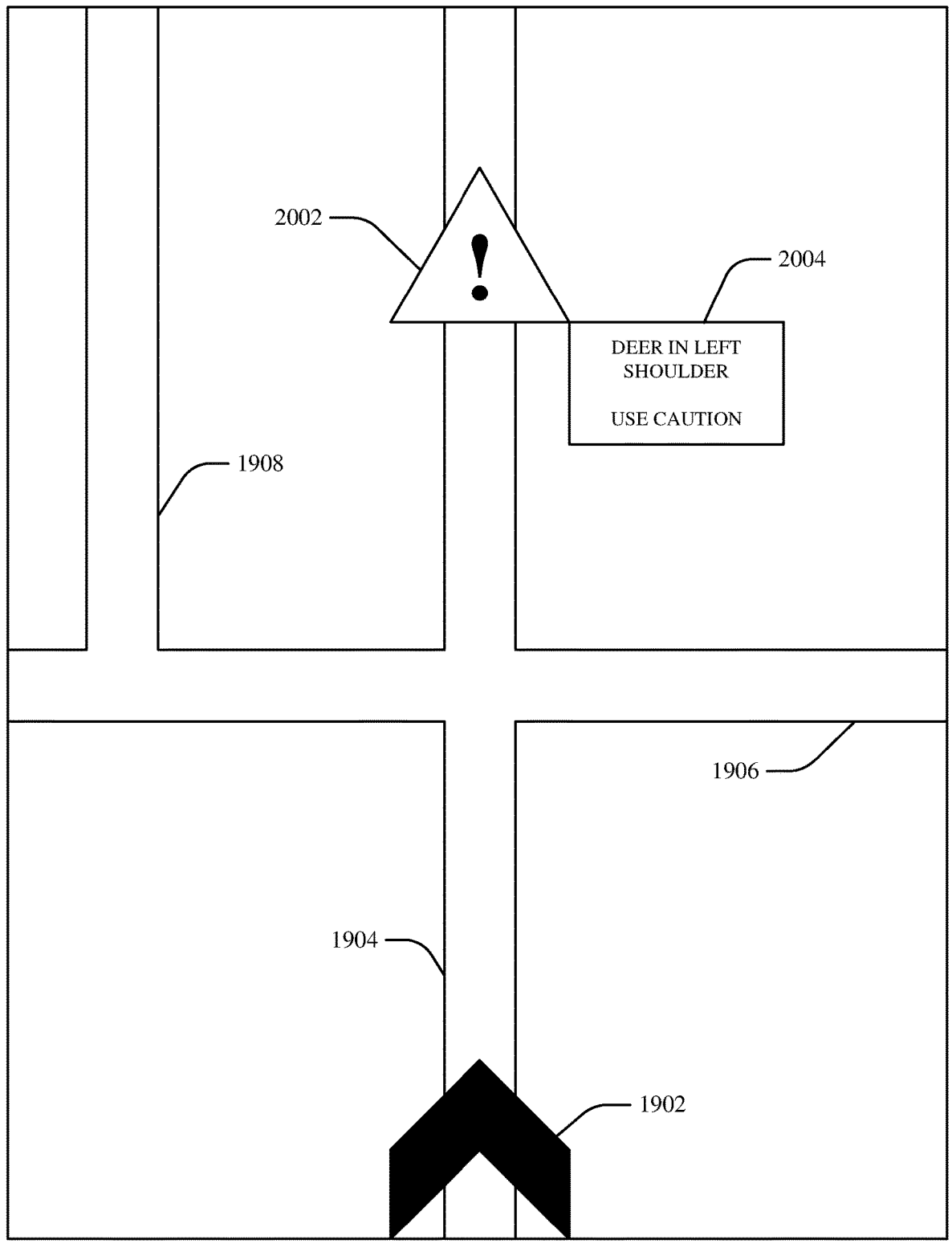

FIGS. 19-20 illustrate example, non-limiting block diagrams 1900 and 2000 showing how an electronic navigation display can be adjusted in accordance with one or more embodiments described herein.

First, consider FIG. 19. In various aspects, FIG. 19 depicts an example, non-limiting view that can be rendered on the electronic navigation display 1802 prior to receipt or parsing of the electronic alert 902 (e.g., prior to determining that the electronic alert 902 indicates that the unsafe driving condition has been detected on the road 100).

As mentioned above, the vehicle 116 can be traveling on the road 100. Accordingly, as shown in FIG. 19, the electronic navigation display 1802 can depict a graphical representation 1902 of the vehicle 116 and a graphical representation 1904 of the road 100. As shown, the graphical representation 1902 can be superimposed on top of the graphical representation 1904, so as to indicate that the vehicle 116 is traveling on the road 100. Although FIG. 19 depicts the graphical representation 1902 as being a chevron shape (e.g., so as to indicate a direction of travel of the vehicle 116), this is a mere non-limiting example. Indeed, the graphical representation 1902 or the graphical representation 1904 can be rendered via any suitable colors, shapes, symbols, or artistic styles.

Although not shown in the figures, suppose that a second road perpendicularly intersects with the road 100, some distance ahead of the vehicle 116. In various aspects, as shown, the electronic navigation display 1802 can depict a graphical representation 1906 corresponding to that second road. Likewise, although not shown in the figures, suppose that a third road branches off perpendicularly from that second road, some distance to the left of the road 100. In various instances, as shown, the electronic navigation display 1802 can depict a graphical representation 1908 of such third road.

Now, suppose that the electronic alert 902 indicates that the unsafe driving condition has been detected on the road 100. Accordingly, the determination indicator 1702 can be set to the active state. In response to the determination indicator 1702 being set to the active state, the execution component 1610 can render on the electronic navigation display 1802 a graphical representation of the unsafe driving condition. In various aspects, such graphical representation can be rendered at an intra-screen location on the electronic navigation display 1802 that corresponds to whatever roadside position is indicated in the geolocation stamp 1002. A non-limiting example of this is shown in FIG. 20.

Suppose that the geolocation stamp 1002 indicates that the unsafe driving condition was detected (e.g., by the deep learning neural network 402 of the vehicle 112) at a roadside position (e.g., at a mile-marker) of the road 100 that is past the second road (e.g., the road that perpendicularly intersects the road 100). In such case, the execution component 1610 can render, as shown in FIG. 20, a graphical representation 2002 of the unsafe driving condition, such that the graphical representation 2002 is superimposed on top of the graphical representation 1904 (e.g., to indicate that the unsafe driving condition afflicts the road 100) and past the graphical representation 1906 (e.g., to represent the roadside position indicated by the geolocation stamp 1002). Although FIG. 20 depicts the graphical representation 2002 as being a triangular shape with an exclamation mark to indicate emphasis or importance, this is a mere non-limiting example. In various aspects, the graphical representation 2002 can be visually rendered via any suitable colors, shapes, symbols, or artistic styles.

In some cases, the graphical representation 2002 can exhibit unique visual properties (e.g., unique colors, unique shapes, unique sizes, unique symbols) based on the unsafe driving condition. For example, if the unsafe driving condition is a first type of object (e.g., a fallen power line), then the graphical representation 2002 can have visual properties correlated with such first type of object (e.g., the graphical representation 2002 can be a lightning bolt symbol to represent the fallen power line). As another example, if the unsafe driving condition is a second type of object (e.g., a flood patch), then the graphical representation 2002 can have visual properties correlated with such second type of object (e.g., the graphical representation 2002 can be a water droplet symbol to represent the flood patch). As yet another example, if the unsafe driving condition is a third type of object (e.g., an injured pedestrian), then the graphical representation 2002 can have visual properties correlated with such third type of object (e.g., the graphical representation 2002 can be a red cross medical symbol to represent the injured pedestrian).

In various aspects, as shown, the execution component 1610 can also render on the electronic navigation display a textual description 2004 corresponding to the unsafe driving condition. In the non-limiting example shown in FIG. 20, the unsafe driving condition localization 404 can indicate that a deer has been detected in the shoulder 108 at the roadside position indicated by the geolocation stamp 1002. Accordingly, the textual description 2004 can specify or otherwise convey such information (e.g., "deer in left shoulder"). In various instances, the textual description 2004 can include or otherwise be based on the recommendation 1008. Returning to the non-limiting example of FIG. 20, the recommendation 1008 can indicate that extra caution should be exercised when passing the roadside position indicated by the geolocation stamp 1002, due to the detected deer in the shoulder 108. Accordingly, the textual description 2004 can, in various cases, specify or otherwise convey such information (e.g., "use caution").

In any case, in response to the determination indicator 1702 being set to the active state, the execution component 1610 can visually render the graphical representation 2002, can visually render the textual description 2004, or can otherwise adjust the electronic navigation display 1802, so as to notify a driver of the vehicle 116 that the unsafe driving condition has been detected on the road 100.

Figure 21:
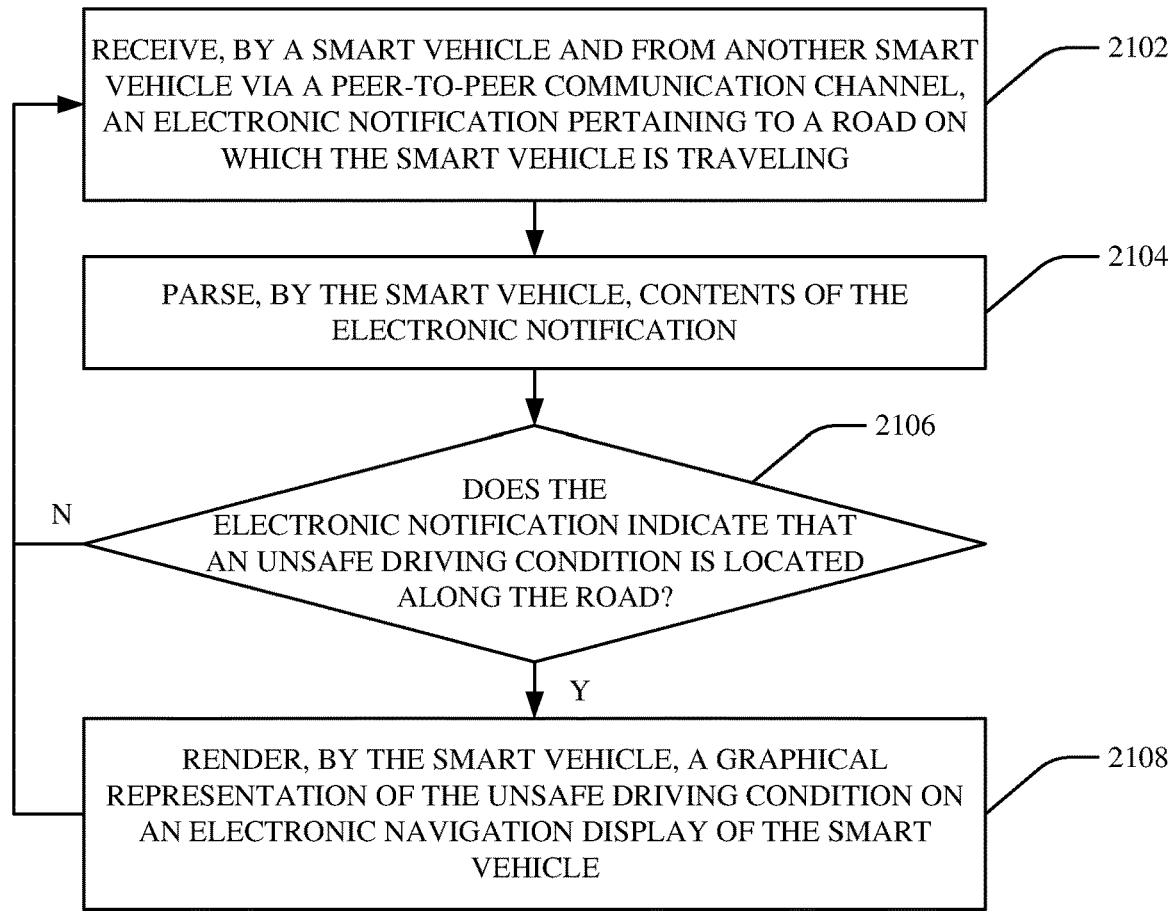
FIG. 21 illustrates a flow diagram of an example, non-limiting computer-implemented method that facilitates adjusting an electronic navigation display in accordance with one or more embodiments described herein.

FIG. 21 illustrates a flow diagram of an example, non-limiting computer-implemented method 2100 that can facilitate adjusting an electronic navigation display in accordance with one or more embodiments described herein. In various cases, the traffic analysis system 118 can facilitate the computer-implemented method 2100.

In various embodiments, act 2102 can include receiving (e.g., via 1606), by a smart vehicle (e.g., 116) and from another smart vehicle (e.g., 112) via a peer-to-peer communication channel (e.g., 120), an electronic notification (e.g., 902) pertaining to a road (e.g., 100) on which the smart vehicle is traveling.

In various aspects, act 2104 can include parsing, by the smart vehicle (e.g., via 1608), contents of the electronic notification.

In various instances, act 2106 can include determining, by the smart vehicle (e.g., via 1608), whether the electronic notification indicates that an unsafe driving condition is located along the road. If not (e.g., if the electronic notification indicates that no unsafe driving condition has yet been detected on the road), then the computer-implemented method 2100 can proceed back to act 2102. If so (e.g., if the electronic notification indicates that an unsafe driving condition has been detected on the road), then the computer-implemented method 2100 can proceed to act 2108.

In various cases, act 2108 can include rendering, by the smart vehicle (e.g., via 1610), a graphical representation (e.g., 2002 or 2004) of the unsafe driving condition on an electronic navigation display (e.g., 1802) of the smart vehicle. As shown, the computer-implemented method 2100 can proceed back to act 2102.

In various embodiments, in response to the determination indicator 1702 being in the active state, the execution component 1610 can adjust an electronic navigation route of the vehicle 116. Various non-limiting examples are described with respect to FIGS. 22-23.

Figure 22:
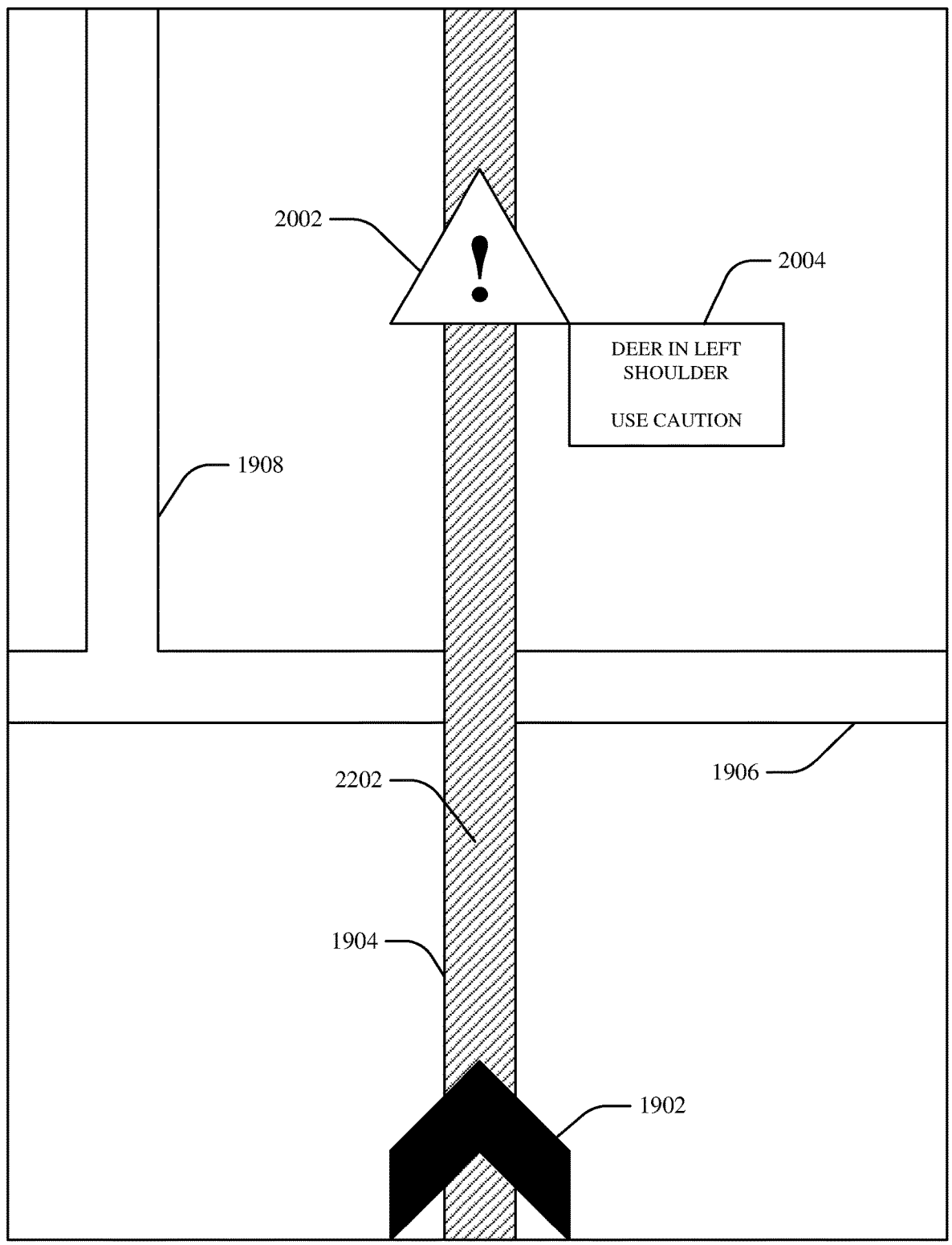
FIGS. 22-23 illustrate example, non-limiting block diagrams showing how an electronic navigation route can be updated in accordance with one or more embodiments described herein.
Figure 23:
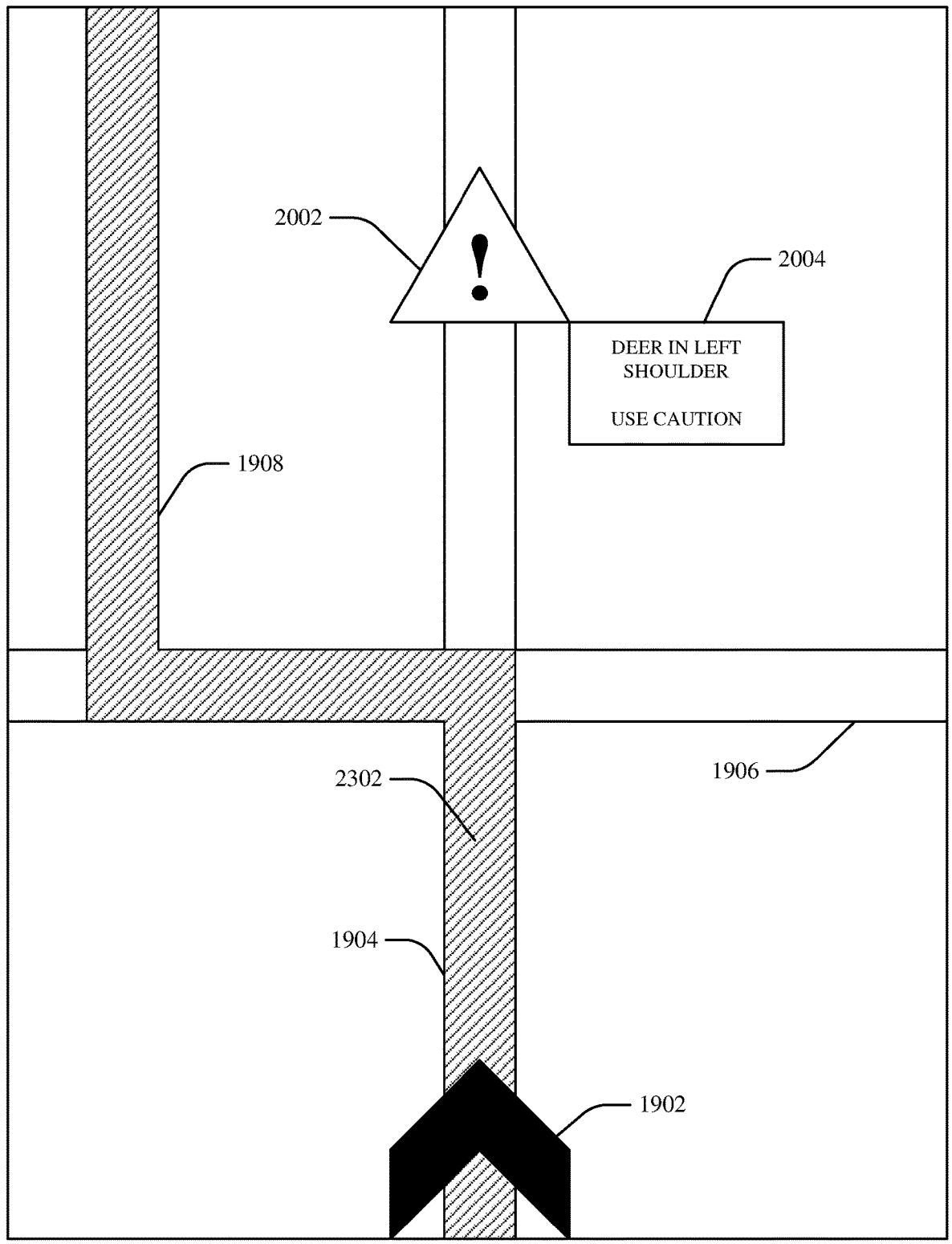

FIGS. 22-23 illustrate example, non-limiting block diagrams 2200 and 2300 showing how an electronic navigation route can be updated in accordance with one or more embodiments described herein.

First, consider FIG. 22. As shown, FIG. 22 illustrates an example, non-limiting view of the electronic navigation display 1802. As described above, the electronic navigation display 1802 can depict the graphical representation 1902 of the vehicle 116, the graphical representation 1904 of the road 100, the graphical representation 1906 of a second road that perpendicularly intersects the road 100, the graphical representation 1908 of a third road that perpendicularly branches off from the second road to the left of the road 100, the graphical representation 2002 of the unsafe driving condition, or the textual description 2004 of the unsafe driving condition.

As also shown, the electronic navigation display 1802 can depict a graphical representation 2202 of an electronic navigation route of the vehicle 116. In various aspects, the electronic navigation route can be any suitable set of traffic directions which can be leading the vehicle 116 from its current location to any suitable destination. In various instances, the graphical representation 2202 of the electronic navigation route can be considered as visually showing the driver of the vehicle 116 where to drive or where to turn to get to the destination. In the non-limiting example of FIG. 22, the electronic navigation route can pass through the unsafe driving condition. In other words, the unsafe driving condition can interfere with or otherwise be on (e.g., be in the way of) the electronic navigation route. Accordingly, the graphical representation 2002 can be superimposed over the graphical representation 2202, to indicate that the unsafe driving condition is on the electronic navigation route.

Now, consider FIG. 23. In various aspects, when the unsafe driving condition is on or otherwise interferes with the electronic navigation route, the execution component 1610 can recalculate or recompute (e.g., via any suitable route computation techniques) the electronic navigation route, so as to avoid the unsafe driving condition. That is, the recalculated or recomputed electronic navigation route can lead the vehicle 116 to the same destination, but such recalculated or recomputed electronic navigation route can avoid or otherwise circumvent the unsafe driving condition. Accordingly, the execution component 1610 can erase or remove the graphical representation 2202 and can render a graphical representation 2302 of such recalculated or recomputed electronic navigation route on the electronic navigation display 1802. As can be seen, the graphical representation 2302 can be considered as indicating that the recalculated or recomputed electronic navigation route does not pass through the unsafe driving condition.

Figure 24:
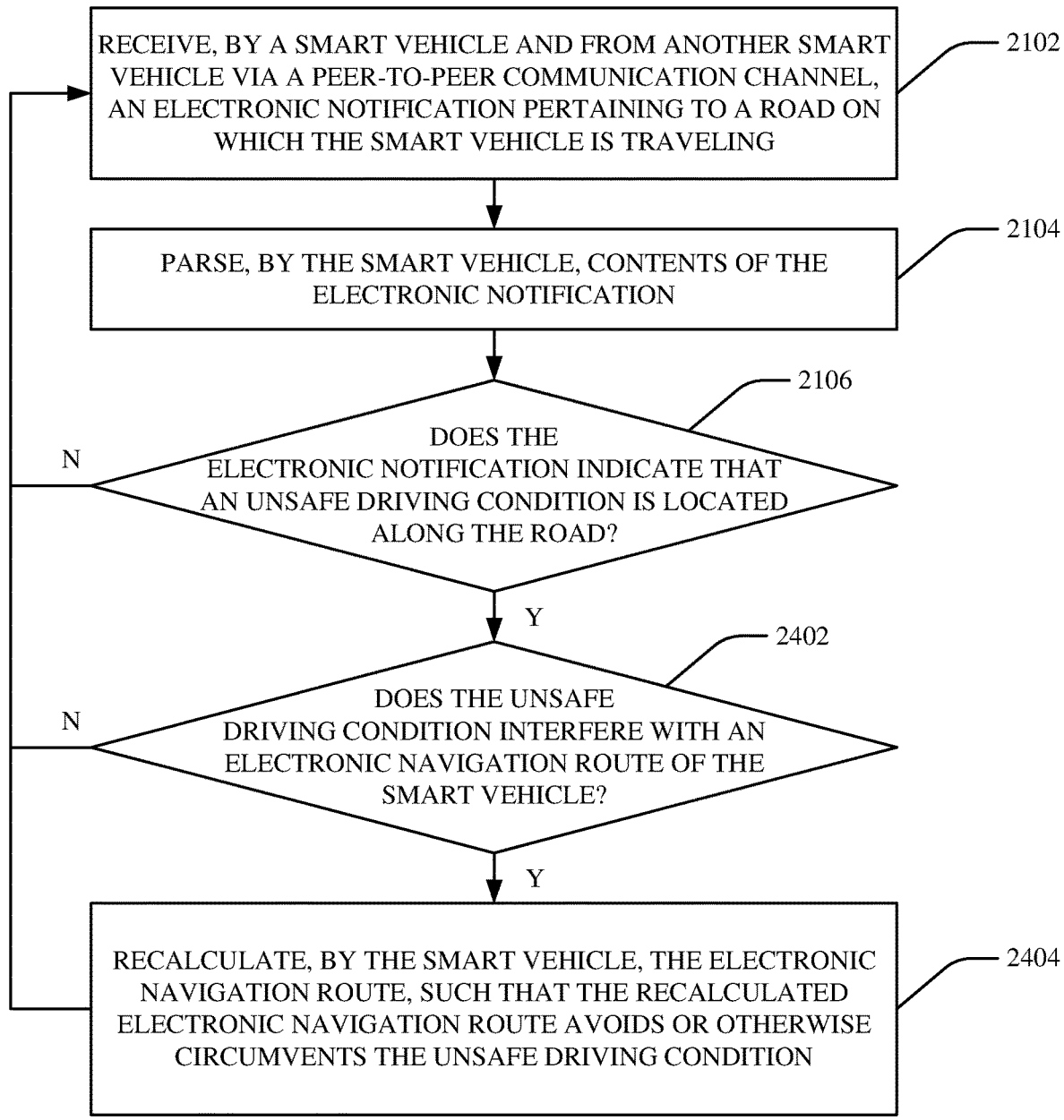
FIG. 24 illustrates a flow diagram of an example, non-limiting computer-implemented method that facilitates updating an electronic navigation route in accordance with one or more embodiments described herein.

FIG. 24 illustrates a flow diagram of an example, non-limiting computer-implemented method 2400 that can facilitate updating an electronic navigation route in accordance with one or more embodiments described herein. In various cases, the traffic analysis system 118 can facilitate the computer-implemented method 2400.

In various embodiments, the computer-implemented method 2400 can include acts 2102, 2104, and 2106, as described above. In various aspects, if it is determined at act 2106 that the electronic notification indicates that an unsafe driving condition is located along the road, then the computer-implemented method 2400 can proceed to act 2402.

In various instances, act 2402 can include determining, by the smart vehicle (e.g., via 1610), whether the unsafe driving condition interferes with (e.g., is located on or in the way of) an electronic navigation route of the smart vehicle. If not (e.g., if the unsafe driving condition does not interfere with the electronic navigation route), the computer-implemented method 2400 can proceed back to act 2102. If so, (e.g., if the unsafe driving condition does interfere with the electronic navigation route), the computer-implemented method 2400 can proceed to act 2404.

In various cases, act 2404 can include recalculating, by the smart vehicle (e.g., via 1610), the electronic navigation route, such that the recalculated electronic navigation route avoids or otherwise circumvents the unsafe driving condition. In various aspects, the computer-implemented method 2400 can proceed back to act 2102.

Figure 25:
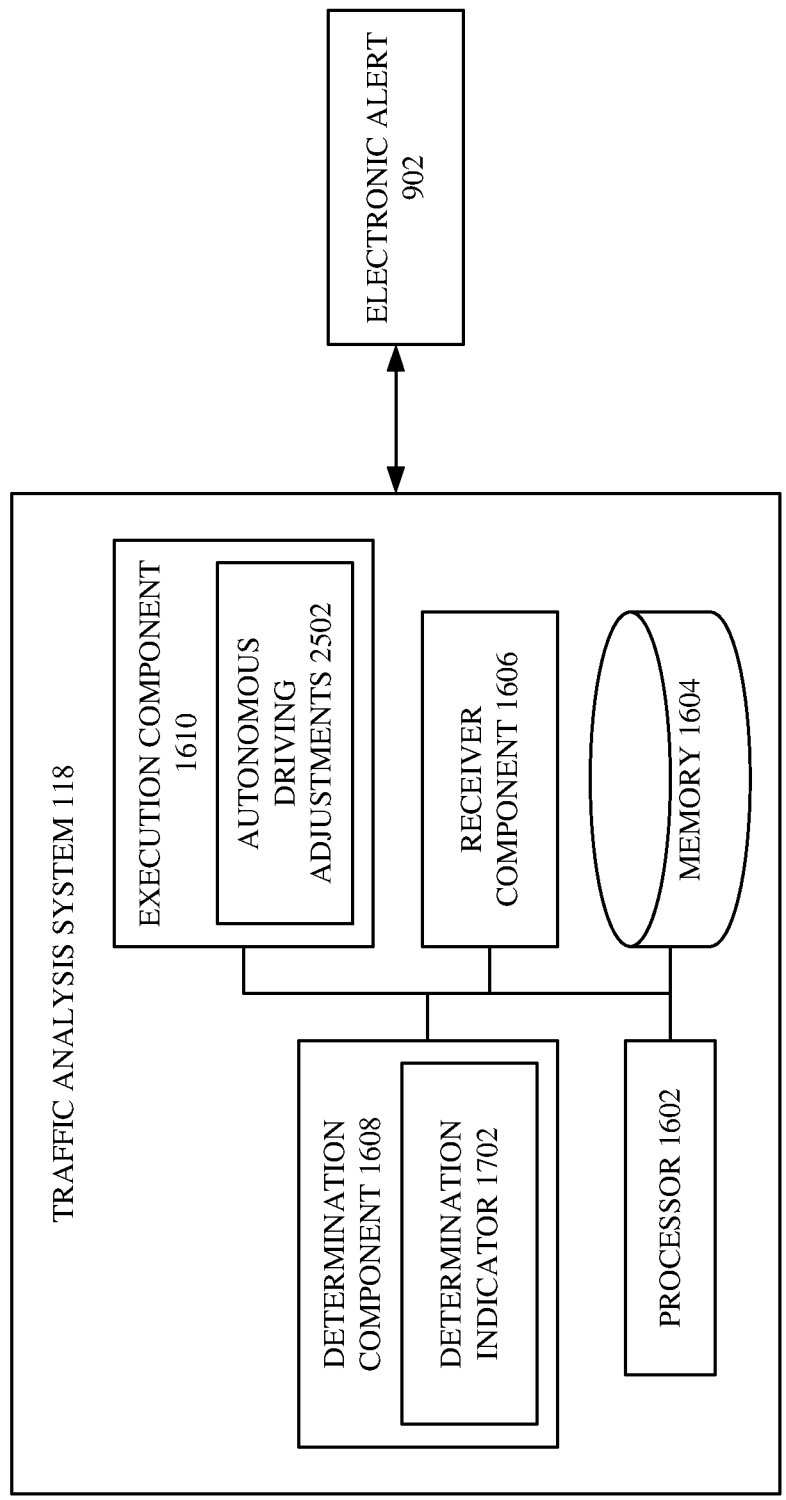
FIG. 25 illustrates a block diagram of an example, non-limiting system including a set of autonomous driving adjustments that facilitates a receipt-side of peer-to-peer vehicular provision of artificially intelligent traffic analysis in accordance with one or more embodiments described herein.

FIG. 25 illustrates a block diagram of an example, non-limiting system 2500 including a set of autonomous driving adjustments that can facilitate a receipt-side of peer-to-peer vehicular provision of artificially intelligent traffic analysis in accordance with one or more embodiments described herein. As shown, the system 2500 can, in some cases, comprise the same components as the system 1700, and can further comprise a set of autonomous driving adjustments 2502.

In various embodiments, the vehicle 116 can be outfitted with any suitable level of autonomous driving capability. Accordingly, in response to the determination indicator 1702 being in the active state, the execution component 1610 can initiate, conduct, perform, or otherwise cause the set of autonomous driving adjustments 2502. In various aspects, the set of autonomous driving adjustments 2502 can include any suitable number of autonomous driving adjustments. In various instances, an autonomous driving adjustment can be any suitable change to any suitable autonomous driving parameter of the vehicle 116. As a non-limiting example, speed (e.g., throttle input, brake input) can be considered as an autonomous driving parameter of the vehicle 116. Thus, an autonomous driving adjustment can, in some cases, include a reduction to the speed of the vehicle 116 (e.g., the execution component 1610 can cause a decrease in throttle input of the vehicle 116 or can cause an increase in brake input of the vehicle 116). As another non-limiting example, steering can be considered as autonomous driving parameter of the vehicle 116. So, an autonomous driving adjustment can, in various instances, include a lane-shift enacted by increasing a left-steering input or a right-steering input of the vehicle 116. As another non-limiting example, lighting (e.g., high-beams, hazard lights) can be considered as an autonomous driving parameter of the vehicle 116. Accordingly, an autonomous driving adjustment can, in various aspects, include increasing a lighting (e.g., activating high-beams, activating hazard lights) of the vehicle 116.

In various instances, the execution component 1610 can initiate or otherwise perform the set of autonomous driving adjustments 2502, when the vehicle 116 is passing (or is about to pass) the unsafe driving condition. In other words, the execution component 1610 can initiate or otherwise perform the set of autonomous driving adjustments 2502, when the vehicle 116 is within any suitable threshold distance (e.g., any suitable threshold proximity) of the unsafe driving condition. In particular, as mentioned above, the electronic alert 902 can include the geolocation stamp 1002, which can indicate where (e.g., at which mile-marker) the unsafe driving condition is located along the road 100. Moreover, just as the vehicle 112 can have the set of vehicle geolocation sensors 904, the vehicle 116 can have its own set of geolocation sensors (not shown). Accordingly, the execution component 1610 can leverage such geolocation sensors so as to know the geolocation of the vehicle 116 at any given instant in time (e.g., so as to know where, at any given instant in time, the vehicle 116 is located along the road 100). Thus, by leveraging the geolocation stamp 1002 and the geolocation sensors of the vehicle 116, the execution component 1610 can determine whether or not the vehicle 116 is within any suitable threshold distance of the unsafe driving condition. When the vehicle 116 is within that threshold distance of the unsafe driving condition, the execution component 1610 can initiate the set of autonomous driving adjustments 2502.

Figure 26:
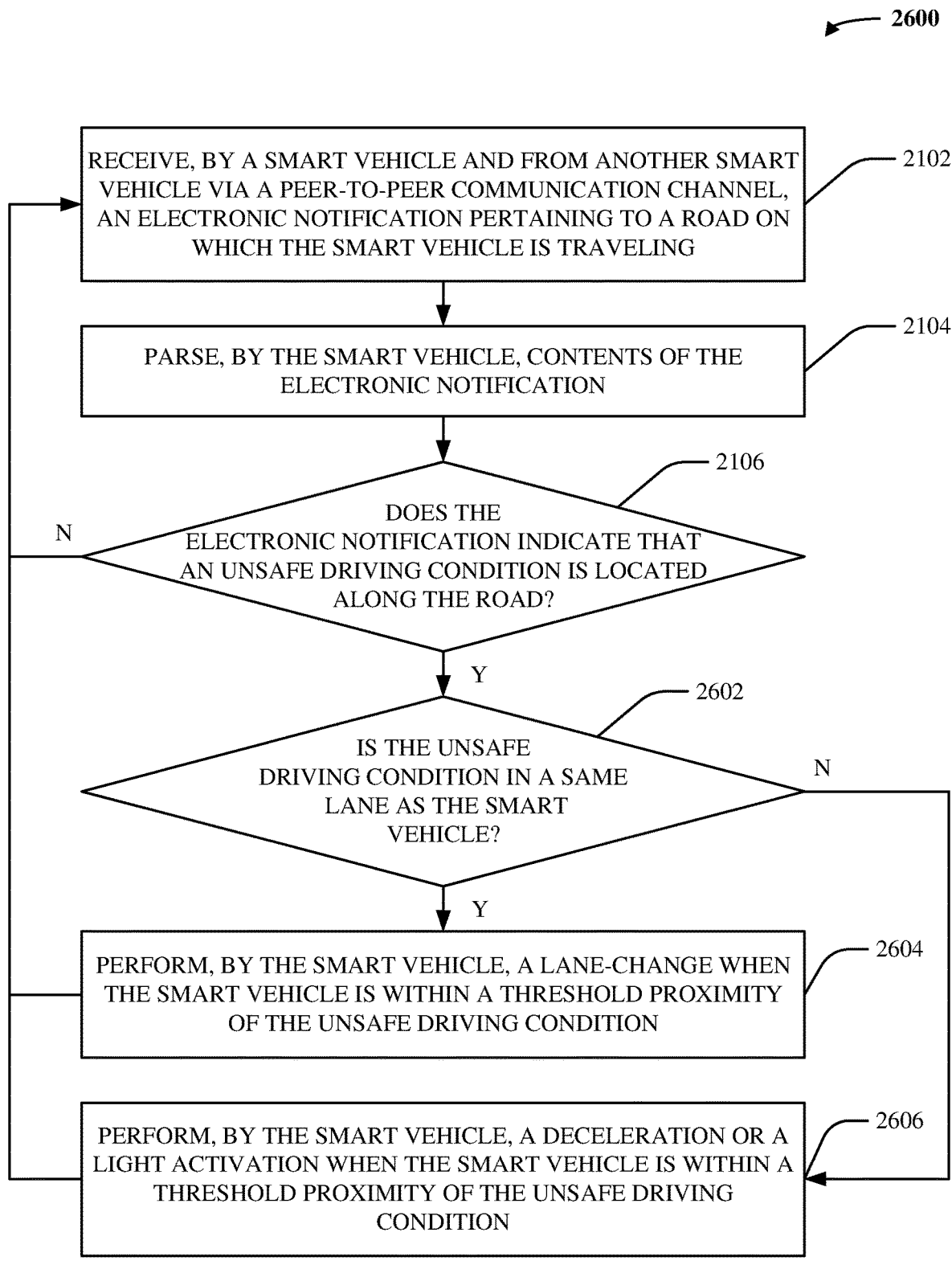
FIG. 26 illustrates a flow diagram of an example, non-limiting computer-implemented method that facilitates autonomous driving adjustments in accordance with one or more embodiments described herein.

FIG. 26 illustrates a flow diagram of an example, non-limiting computer-implemented method 2600 that can facilitate autonomous driving adjustments in accordance with one or more embodiments described herein. In various cases, the traffic analysis system 118 can facilitate the computer-implemented method 2600.

In various embodiments, the computer-implemented method 2600 can include acts 2102, 2104, and 2106, as described above. In various aspects, if it is determined at act 2106 that the electronic notification indicates that an unsafe driving condition is located along the road, then the computer-implemented method 2600 can proceed to act 2602.

In various instances, act 2602 can include determining, by the smart vehicle (e.g., via 1610), whether the unsafe driving condition is in a same lane as the smart vehicle. If so (e.g., if the unsafe driving condition is obstructing the lane that the smart vehicle is traveling in), the computer-implemented method 2600 can proceed to act 2604. If not (e.g., if the unsafe driving condition is not obstructing the lane that the smart vehicle is traveling in), the computer-implemented method 2600 can proceed to act 2606.

In various cases, act 2604 can include performing, by the smart vehicle (e.g., 1610), a lane-change (e.g., one of 2502) when the smart vehicle is within a threshold proximity of the unsafe driving condition. As shown, the computer-implemented method 2600 can proceed back to act 2102.

In various aspects, act 2606 can include performing, by the smart vehicle (e.g., 1610), a deceleration or a light activation (e.g., some of 2502) when the smart vehicle is within a threshold proximity of the unsafe driving condition. As shown, the computer-implemented method 2600 can proceed back to act 2102.

Figure 27:
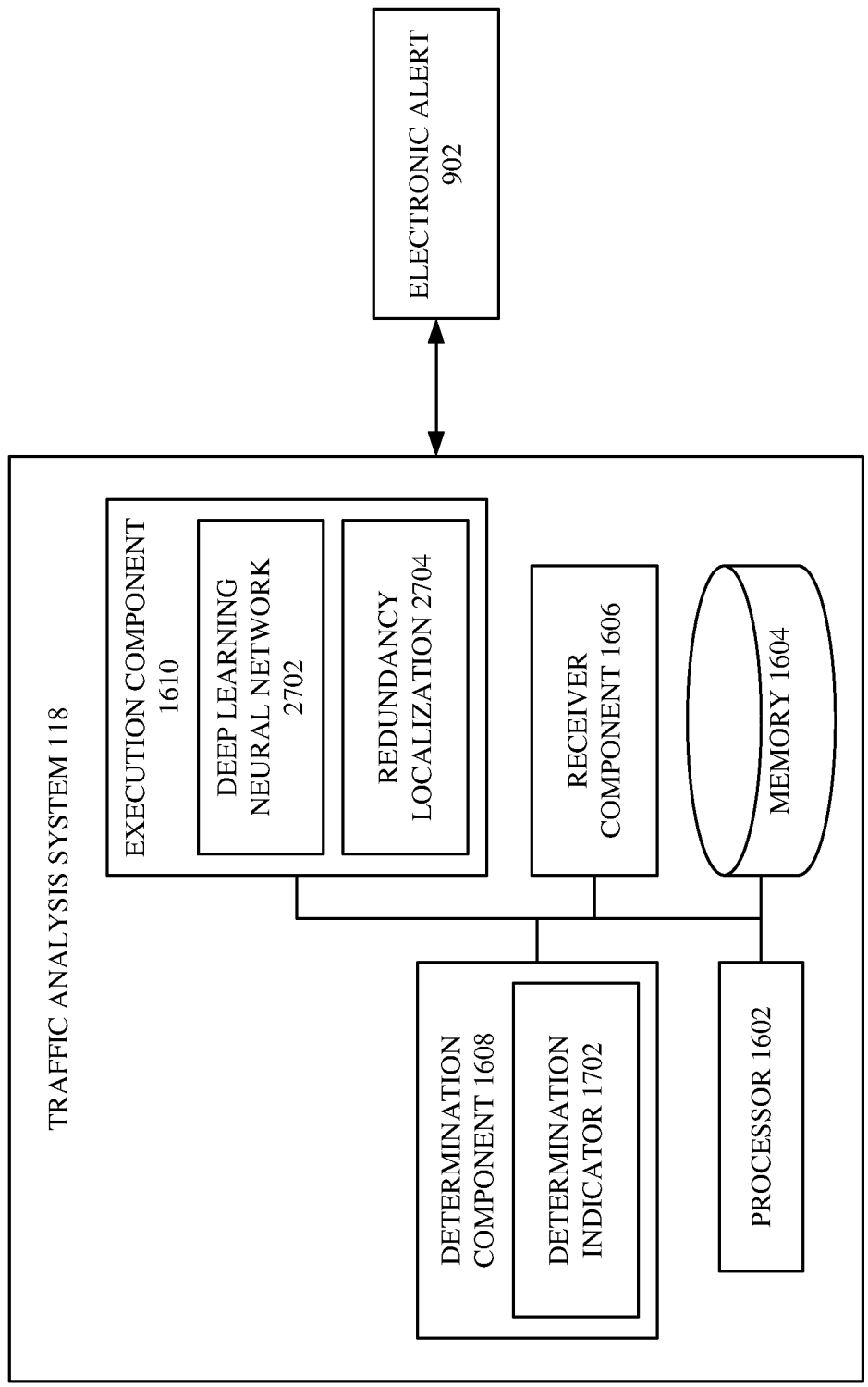
FIG. 27 illustrates a block diagram of an example, non-limiting system including a deep learning neural network and a redundancy localization that facilitates a receipt-side of peer-to-peer vehicular provision of artificially intelligent traffic analysis in accordance with one or more embodiments described herein.

FIG. 27 illustrates a block diagram of an example, non-limiting system 2700 including a deep learning neural network and a redundancy localization that can facilitate a receipt-side of peer-to-peer vehicular provision of artificially intelligent traffic analysis in accordance with one or more embodiments described herein. As shown, the system 2700 can, in some cases, comprise the same components as the system 1700, and can further comprise a deep learning neural network 2702 and a redundancy localization 2704.

In various embodiments, the execution component 1610 can electronically store, electronically maintain, electronically control, or otherwise electronically access the deep learning neural network 2702. In various aspects, the deep learning neural network 2702 can have or otherwise exhibit any suitable internal architecture. For instance, the deep learning neural network 2702 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable trainable or non-trainable internal parameters. For example, any of such input layer, one or more hidden layers, or output layer can be convolutional layers, dense layers, batch normalization layers, non-linearity layers, padding layers, pooling layers, or concatenation layers. In various cases, the deep learning neural network 2702 can have the same or different internal architecture as the deep learning neural network 402.

In any case, the deep learning neural network 2702 can be configured to localize or otherwise detect unsafe driving conditions based on inputted roadside data, just like the deep learning neural network 402. Accordingly, the deep learning neural network 2702 can undergo any suitable type of training, just like the deep learning neural network 402 (e.g., as described with respect to FIGS. 11-13). In some cases, the deep learning neural network 2702 can be trained on the same or different training dataset as the deep learning neural network 402.

In various aspects, the execution component 1610 can use the deep learning neural network 2702 to double-check the analysis outputted by the deep learning neural network 402. In particular, as mentioned above, the electronic alert 902 can include the roadside data 208. As also mentioned above, the deep learning neural network 402 can have detected the unsafe driving condition based on the roadside data 208. Accordingly, in various aspects, the execution component 1610 can double-check this detection of the deep learning neural network 402, by executing the deep learning neural network 2702 on the roadside data 208, thereby yielding the redundancy localization 2704. Various non-limiting aspects are explained with respect to FIG. 28.

Figure 28:
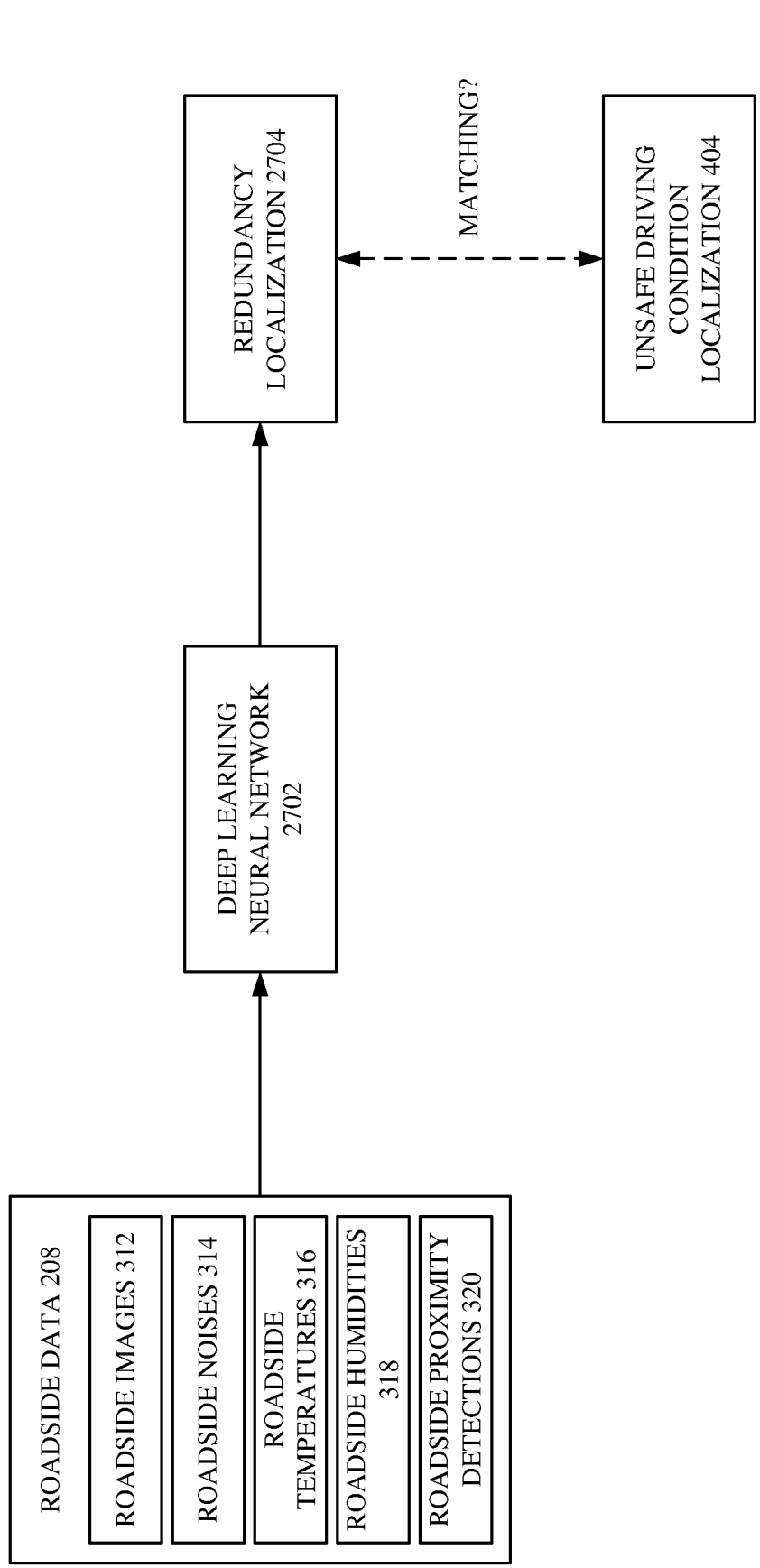
FIG. 28 illustrates an example, non-limiting block diagram showing how a deep learning neural network can generate a redundancy localization in accordance with one or more embodiments described herein.

FIG. 28 illustrates an example, non-limiting block diagram 2800 showing how the deep learning neural network 2702 can generate the redundancy localization 2704 in accordance with one or more embodiments described herein.

As shown, in response to the determination indicator 1702 being set to the active state, the execution component 1610 can, in various aspects, execute the deep learning neural network 2702 on the roadside data 208, and such execution can cause the deep learning neural network 2702 to produce the redundancy localization 2704. More specifically, the execution component 1610 can feed the roadside data 208 (e.g., the set of roadside images 312, the set of roadside noises 314, the set of roadside temperatures 316, the set of roadside humidities 318, or the set of roadside proximity detections 320) to an input layer of the deep learning neural network 2702. In various instances, the roadside data 208 (e.g., the set of roadside images 312, the set of roadside noises 314, the set of roadside temperatures 316, the set of roadside humidities 318, or the set of roadside proximity detections 320) can complete a forward pass through one or more hidden layers of the deep learning neural network 2702. In various instances, an output layer of the deep learning neural network 2702 can compute the redundancy localization 2704, based on activation maps or intermediate features produced by the one or more hidden layers.

In various aspects, the redundancy localization 2704 can have the same format, size, or dimensionality as the unsafe driving condition localization 404. That is, the unsafe driving condition localization 404 can indicate, specify, convey, or otherwise represent which (if any) lanes or shoulders of the road 100 the deep learning neural network 402 believes are obstructed by the unsafe driving condition, whereas the redundancy localization 2704 can indicate, specify, convey, or otherwise represent which (if any) lanes or shoulders of the road 100 the deep learning neural network 2702 believes are obstructed by the unsafe driving condition.

In various aspects, the execution component 1610 can compare the redundancy localization 2704 with the unsafe driving condition localization 404. If the redundancy localization 2704 matches (e.g., differs by not more than any suitable threshold margin from) the unsafe driving condition localization 404, then the execution component 1610 can conclude that the deep learning neural network 402 correctly analyzed the roadside data 208. In such case, the execution component 1610 can transmit, via the P2P communication link 120 and to the traffic analysis system 114, an electronic reply (not shown) indicating that the analysis results pro-duced by the deep learning neural network 402 based on the roadside data 208 have been successfully double-checked and are thus likely accurate. In contrast, if the redundancy localization 2704 does not match (e.g., differs by more than any suitable threshold margin from) the unsafe driving condition localization 404, then the execution component 1610 can conclude that the deep learning neural network 402 incorrectly analyzed the roadside data 208. In such case, the execution component 1610 can transmit, via the P2P communication link 120 and to the traffic analysis system 114, an electronic reply (not shown) indicating that the analysis results produced by the deep learning neural network 402 based on the roadside data 208 have not been successfully double-checked and are thus likely inaccurate.

In some cases, the redundancy localization 2704 and the unsafe driving condition localization 404 can be considered as not matching if one indicates the unsafe driving condition and the other indicates no unsafe driving condition. In various cases, the redundancy localization 2704 and the unsafe driving condition localization 404 can be considered as not matching if they indicate different types of unsafe driving conditions (e.g., one indicates an injured pedestrian, and the other indicates an ice patch).

Figure 29:
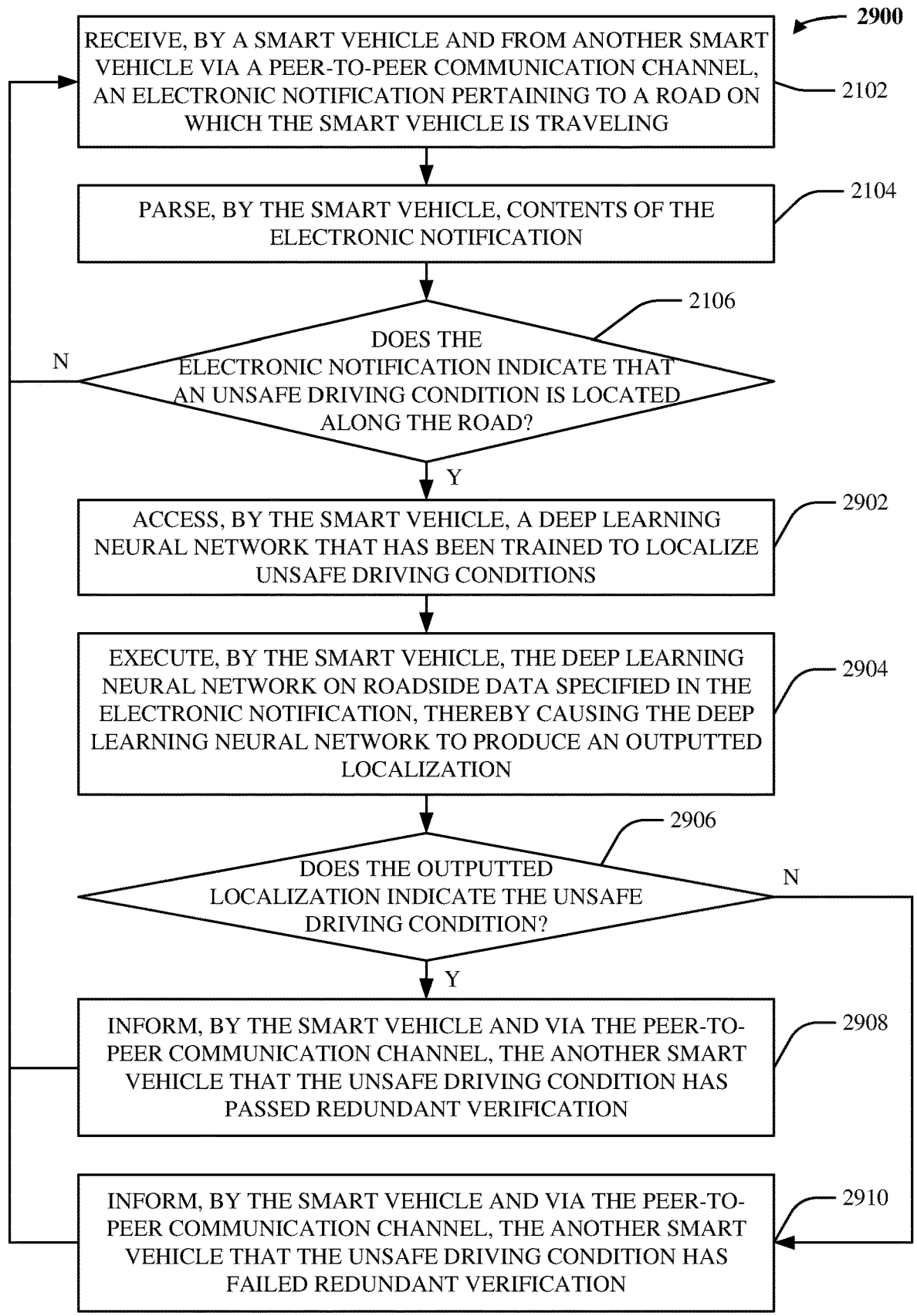
FIG. 29 illustrates a flow diagram of an example, non-limiting computer-implemented method that facilitates generation of a redundancy localization in accordance with one or more embodiments described herein.

FIG. 29 illustrates a flow diagram of an example, non-limiting computer-implemented method 2900 that can facilitate generation of a redundancy localization in accordance with one or more embodiments described herein. In various cases, the traffic analysis system 118 can facilitate the computer-implemented method 2900.

In various embodiments, the computer-implemented method 2900 can include acts 2102, 2104, and 2106, as described above. In various aspects, if it is determined at act 2106 that the electronic notification indicates that an unsafe driving condition is located along the road, then the computer-implemented method 2900 can proceed to act 2902.

In various instances, act 2902 can include accessing, by the smart vehicle (e.g., via 1610), a deep learning neural network (e.g., 2702) that has been trained to localize unsafe driving conditions.

In various cases, act 2904 can include executing, by the smart vehicle (e.g., via 1610), the deep learning neural network on roadside data (e.g., 208) specified in the electronic notification (e.g., 902). In various aspects, this can cause the deep learning neural network to produce an outputted localization (e.g., 2704).

In various instances, act 2906 can include determining, by the smart vehicle (e.g., via 1610), whether the outputted localization indicates the unsafe driving condition (e.g., whether the outputted localization agrees with the electronic notification). If so (e.g., if the outputted localization agrees with the electronic notification), then the computer-implemented method 2900 can proceed to act 2908. If not (e.g., if the outputted localization conflicts with the electronic notification), the computer-implemented method 2900 can proceed to act 2910.

In various cases, act 2908 can include informing, by the smart vehicle (e.g., via 1610) and via the peer-to-peer communication channel (e.g., 120), the another vehicle (e.g., 112) that the unsafe driving condition has passed redundant verification (e.g., that the another vehicle's assessment has been successfully double-checked). As shown, the computer-implemented method 2900 can proceed back to act 2102.

In various aspects, act 2910 can include informing, by the smart vehicle (e.g., via 1610) and via the peer-to-peer communication channel (e.g., 120), the another vehicle (e.g., 112) that the unsafe driving condition has failed redundant verification (e.g., that the another vehicle's assessment has been double-checked and is believed to be incorrect). As shown, the computer-implemented method 2900 can proceed back to act 2102.

As described above, the deep learning neural network 402 can determine that the unsafe driving condition is present on the road 100, at a roadside position specified by the geolocation stamp 1002 and at a time specified by the timestamp 1004. In various cases, the execution component 1610 can perform a follow-up analysis at a later time, to determine whether or not the unsafe driving condition is still located at the roadside position specified by the geolocation stamp 1002. Various non-limiting aspects are discussed with respect to FIGS. 30-33.

Figure 30:
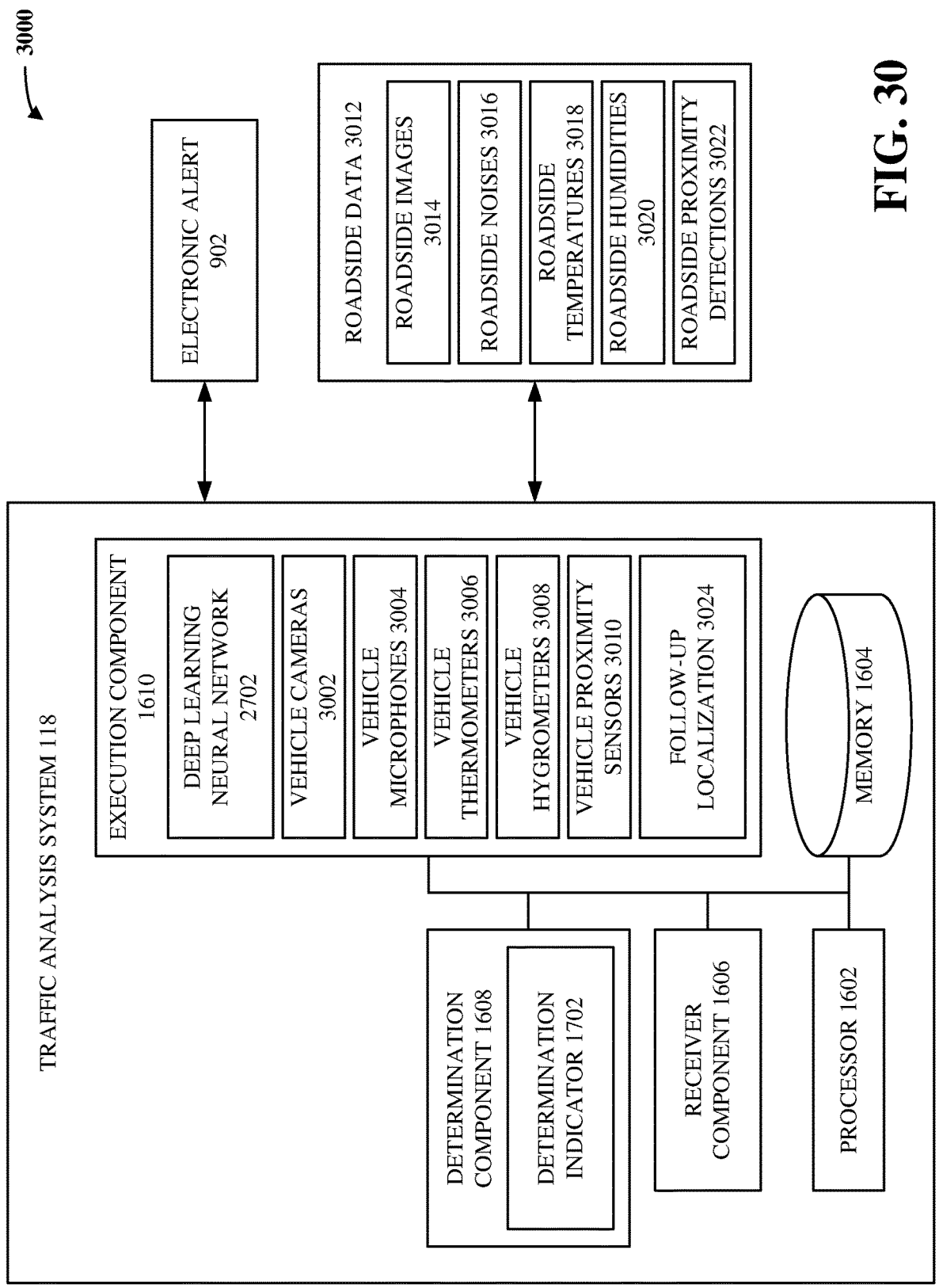
FIG. 30 illustrates a block diagram of an example, non-limiting system including a deep learning neural network, various external sensors, and a follow-up localization that facilitates a receipt-side of peer-to-peer vehicular provision of artificially intelligent traffic analysis in accordance with one or more embodiments described herein.

FIG. 30 illustrates a block diagram of an example, non-limiting system 3000 including a deep learning neural network, various external sensors, and a follow-up localization that can facilitate a receipt-side of peer-to-peer vehicular provision of artificially intelligent traffic analysis in accordance with one or more embodiments described herein.

In various embodiments, as shown, the execution component 1610 can comprise the deep learning neural network 2702, discussed above.

In various aspects, the execution component 1610 can electronically control, electronically execute, electronically activate, or otherwise electronically access any suitable sensors of the vehicle 116. In various aspects, such sensors can be road-facing. In other words, such sensors can be oriented or otherwise configured to monitor the road 100 as the vehicle 116 travels on the road 100.

As a non-limiting example, such sensors can include a set of vehicle cameras 3002. In various aspects, the set of vehicle cameras 3002 can be similar to the set of vehicle cameras 302. That is, the set of vehicle cameras 3002 can include any suitable number of any suitable types of image-capture devices that can be integrated into or onto the vehicle 116 so as to monitor the road 100 as the vehicle 116 travels on the road 100.

As another non-limiting example, such sensors can include a set of vehicle microphones 3004. In various aspects, the set of vehicle microphones 3004 can be similar to the set of vehicle microphones 304. That is, the set of vehicle microphones 3004 can include any suitable number of any suitable types of sound-capture devices that can be integrated into or onto the vehicle 116 so as to monitor the road 100 as the vehicle 116 travels on the road 100.

As yet another non-limiting example, such sensors can include a set of vehicle thermometers 3006. In various aspects, the set of vehicle thermometers 3006 can be similar to the set of vehicle thermometers 306. That is, the set of vehicle thermometers 3006 can include any suitable number of any suitable types of temperature-measuring devices that can be integrated into or onto the vehicle 116 so as to monitor the road 100 as the vehicle 116 travels on the road 100.

As still another non-limiting example, such sensors can include a set of vehicle hygrometers 3008. In various aspects, the set of vehicle hygrometers 3008 can be similar to the set of vehicle hygrometers 308. That is, the set of vehicle hygrometers 3008 can include any suitable number of any suitable types of moisture-measuring devices that can be integrated into or onto the vehicle 116 so as to monitor the road 100 as the vehicle 116 travels on the road 100.

As even another non-limiting example, such sensors can include a set of vehicle proximity sensors 3010. In various aspects, the set of vehicle proximity sensors 3010 can be similar to the set of vehicle proximity sensors 310. That is, the set of vehicle proximity sensors 3010 can include any suitable number of any suitable types of proximity detectors (e.g., radar, sonar, lidar) that can be integrated into or onto the vehicle 116 so as to monitor the road 100 as the vehicle 116 travels on the road 100.

In various aspects, as mentioned above, the vehicle 116 can be outfitted with its own geolocation sensors (not explicitly shown), and the execution component 1610 can leverage such geolocation sensors to determine a geolocation of the vehicle 116 at any given instant in time. Accordingly, in various instances, the execution component 1610 can determine whether the vehicle 116 is within any suitable threshold distance of the roadside position specified by the geolocation stamp 1002. When the vehicle 116 is within such threshold distance of the unsafe driving condition (e.g., when the vehicle 116 is passing or about to pass the roadside position specified by the geolocation stamp 1002), the execution component 1610 can utilize the various sensors of the vehicle 116 to capture, record, or otherwise measure roadside data 3012.

For example, the set of vehicle cameras 3002 can capture a set of roadside images 3014 while the vehicle 116 is within the threshold distance of the roadside position specified by the geolocation stamp 1002 (e.g., when the vehicle 116 is passing or about to pass the roadside position where the unsafe driving condition was last detected). In various aspects, the set of roadside images 3014 can include any suitable number of images or video frames (e.g., any suitable number of two-dimensional pixel arrays) that can depict portions of the road 100 (e.g., portions of the road 100 that lie in front of, behind, or beside the vehicle 116 when the vehicle is passing or about to pass the roadside position specified by the geolocation stamp 1002).

As another example, the set of vehicle microphones 3004 can capture a set of roadside noises 3016 while the vehicle 116 is within the threshold distance of the roadside position specified by the geolocation stamp 1002 (e.g., when the vehicle 116 is passing or about to pass the roadside position where the unsafe driving condition was last detected). In various instances, the set of roadside noises 3016 can include any suitable number of audio clips that can represent noises occurring on portions of the road 100 (e.g., portions of the road 100 that lie in front of, behind, or beside the vehicle 116 when the vehicle is passing or about to pass the roadside position specified by the geolocation stamp 1002).

As yet another example, the set of vehicle thermometers 3006 can capture a set of roadside temperatures 3018 while the vehicle 116 is within the threshold distance of the roadside position specified by the geolocation stamp 1002 (e.g., when the vehicle 116 is passing or about to pass the roadside position where the unsafe driving condition was last detected). In various aspects, the set of roadside temperatures 3018 can include any suitable number of temperature measurements that can represent air temperatures or road surface temperatures associated with portions of the road 100 (e.g., portions of the road 100 that lie in front of, behind, or beside the vehicle 116 when the vehicle is passing or about to pass the roadside position specified by the geolocation stamp 1002).

As still another example, the set of vehicle hygrometers 3008 can capture a set of roadside humidities 3020 while the vehicle 116 is within the threshold distance of the roadside position specified by the geolocation stamp 1002 (e.g., when the vehicle 116 is passing or about to pass the roadside position where the unsafe driving condition was last detected). In various aspects, the set of roadside humidities 3020 can include any suitable number of humidity measurements or moisture measurements that can represent air humidity levels or road surface moisture levels associated with portions of the road 100 (e.g., portions of the road 100 that lie in front of, behind, or beside the vehicle 116 when the vehicle is passing or about to pass the roadside position specified by the geolocation stamp 1002).

As even another example, the set of vehicle proximity sensors 3010 can capture a set of roadside proximity detections 3022 while the vehicle 116 is within the threshold distance of the roadside position specified by the geolocation stamp 1002 (e.g., when the vehicle 116 is passing or about to pass the roadside position where the unsafe driving condition was last detected). In various aspects, the set of roadside proximity detections 3022 can include any suitable number of proximity detections (e.g., of radar, sonar, or lidar detections) that can represent distances between the vehicle 116 and nearby objects on portions of the road 100 (e.g., portions of the road 100 that lie in front of, behind, or beside the vehicle 116 when the vehicle is passing or about to pass the roadside position specified by the geolocation stamp 1002).

In various cases, the set of roadside images 3014, the set of roadside noises 3016, the set of roadside temperatures 3018, the set of roadside humidities 3020, and the set of roadside proximity detections 3022 can collectively be considered as the roadside data 3012.

In various aspects, the roadside data 3012 can thus be considered as sensor data pertaining to the road 100 captured at a same roadside position as the roadside data 208 (e.g., captured at the roadside position specified by the geolocation stamp 1002), but captured at a later time than the roadside data 208 (e.g., the roadside data 208 can be captured by the vehicle 112; the roadside data 3012 can be captured by the vehicle 116; since the vehicle 112 can be ahead of the vehicle 116, the vehicle 112 can pass this particular roadside position earlier than the vehicle 116).

In any case, the execution component 1610 can perform a follow-up regarding the unsafe driving condition, by executing the deep learning neural network 2702 on the roadside data 3012 (as opposed to the roadside data 208), thereby yielding the follow-up localization 3024. Various non-limiting aspects are explained with respect to FIG. 31.

Figure 31:
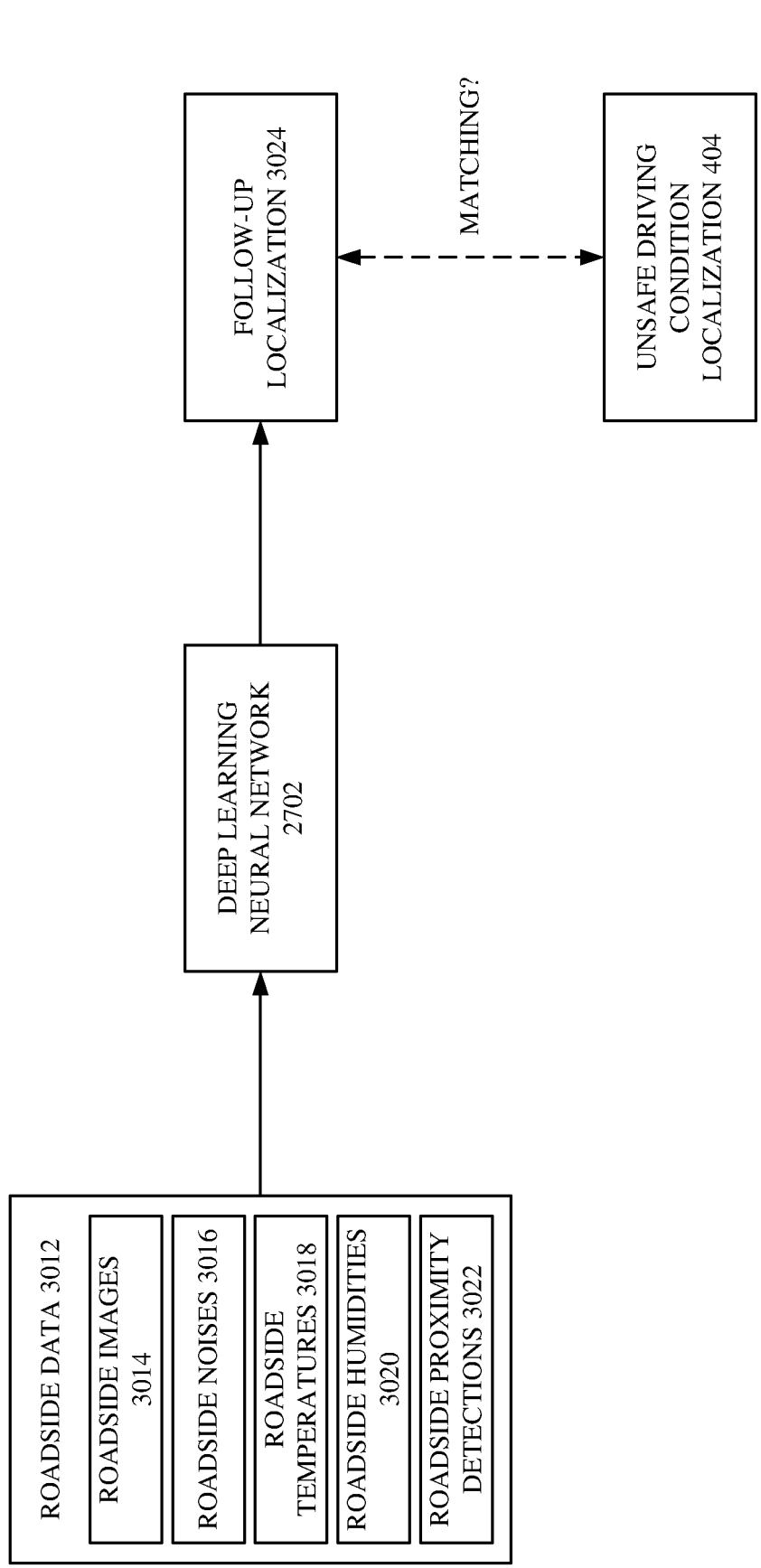
FIG. 31 illustrates an example, non-limiting block diagram showing how a deep learning neural network can generate a follow-up localization in accordance with one or more embodiments described herein.

FIG. 31 illustrates an example, non-limiting block diagram 3100 showing how the deep learning neural network 2702 can generate the follow-up localization 3024 in accordance with one or more embodiments described herein.

As shown, the execution component 1610 can, in various aspects, execute the deep learning neural network 2702 on the roadside data 3012, and such execution can cause the deep learning neural network 2702 to produce the follow-up localization 3024. More specifically, the execution component 1610 can feed the roadside data 3012 (e.g., the set of roadside images 3014, the set of roadside noises 3016, the set of roadside temperatures 3018, the set of roadside humidities 3020, or the set of roadside proximity detections 3022) to an input layer of the deep learning neural network 2702. In various instances, the roadside data 3012 (e.g., the set of roadside images 3014, the set of roadside noises 3016, the set of roadside temperatures 3018, the set of roadside humidities 3020, or the set of roadside proximity detections 3022) can complete a forward pass through one or more hidden layers of the deep learning neural network 2702. In various cases, an output layer of the deep learning neural network 2702 can compute the follow-up localization 3024, based on activation maps or intermediate features produced by the one or more hidden layers.

In various aspects, the follow-up localization 3024 can have the same format, size, or dimensionality as the unsafe driving condition localization 404. That is, the unsafe driving condition localization 404 can indicate, specify, convey, or otherwise represent which (if any) lanes or shoulders of the road 100 the deep learning neural network 402 believed were obstructed by the unsafe driving condition at whatever time the vehicle 112 collected the roadside data 208, whereas the follow-up localization 3024 can indicate, specify, convey, or otherwise represent which (if any) lanes or shoulders of the road 100 the deep learning neural network 2702 believes are obstructed by the unsafe driving condition at whatever time the vehicle 116 collected the roadside data 3012.

In various aspects, the execution component 1610 can compare the follow-up localization 3024 with the unsafe driving condition localization 404. If the follow-up localization 3024 matches (e.g., differs by not more than any suitable threshold margin from) the unsafe driving condition localization 404, then the execution component 1610 can conclude that the unsafe driving condition is still present on the road 100 at the roadside position specified by the geolocation stamp 1002. In such case, the execution component 1610 can transmit, via the P2P communication link 120 and to the traffic analysis system 114, an electronic reply (not shown) indicating that the unsafe driving condition is confirmed to still be present at the roadside position specified by the geolocation stamp 1002. In contrast, if the follow-up localization 3024 does not match (e.g., differs by more than any suitable threshold margin from) the unsafe driving condition localization 404, then the execution component 1610 can conclude that the unsafe driving condition is no longer present on the road 100 at the roadside position specified by the geolocation stamp 1002. In such case, the execution component 1610 can transmit, via the P2P communication link 120 and to the traffic analysis system 114, an electronic reply (not shown) indicating that the unsafe driving condition is confirmed to no longer be present at the roadside position specified by the geolocation stamp 1002.

In some cases, the follow-up localization 3024 and the unsafe driving condition localization 404 can be considered as not matching if one indicates the unsafe driving condition and the other indicates no unsafe driving condition. In various cases, the follow-up localization 3024 and the unsafe driving condition localization 404 can be considered as not matching if they indicate different types of unsafe driving conditions (e.g., one indicates an animal carcass, and the other indicates a pothole).

Figure 32:
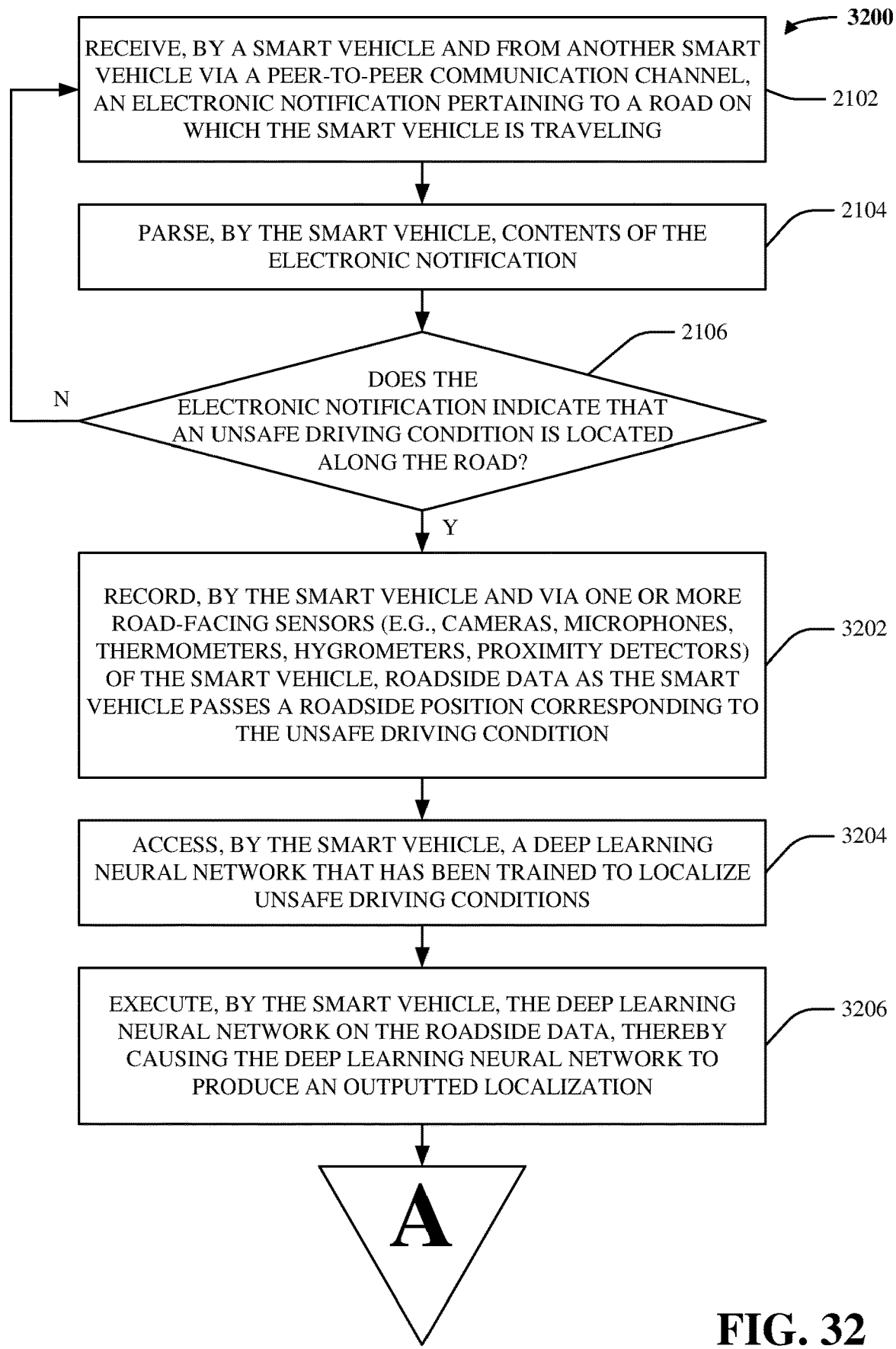
FIGS. 32-33 illustrate flow diagrams of example, non-limiting computer-implemented methods that facilitate generation of a follow-up localization in accordance with one or more embodiments described herein.
Figure 33:
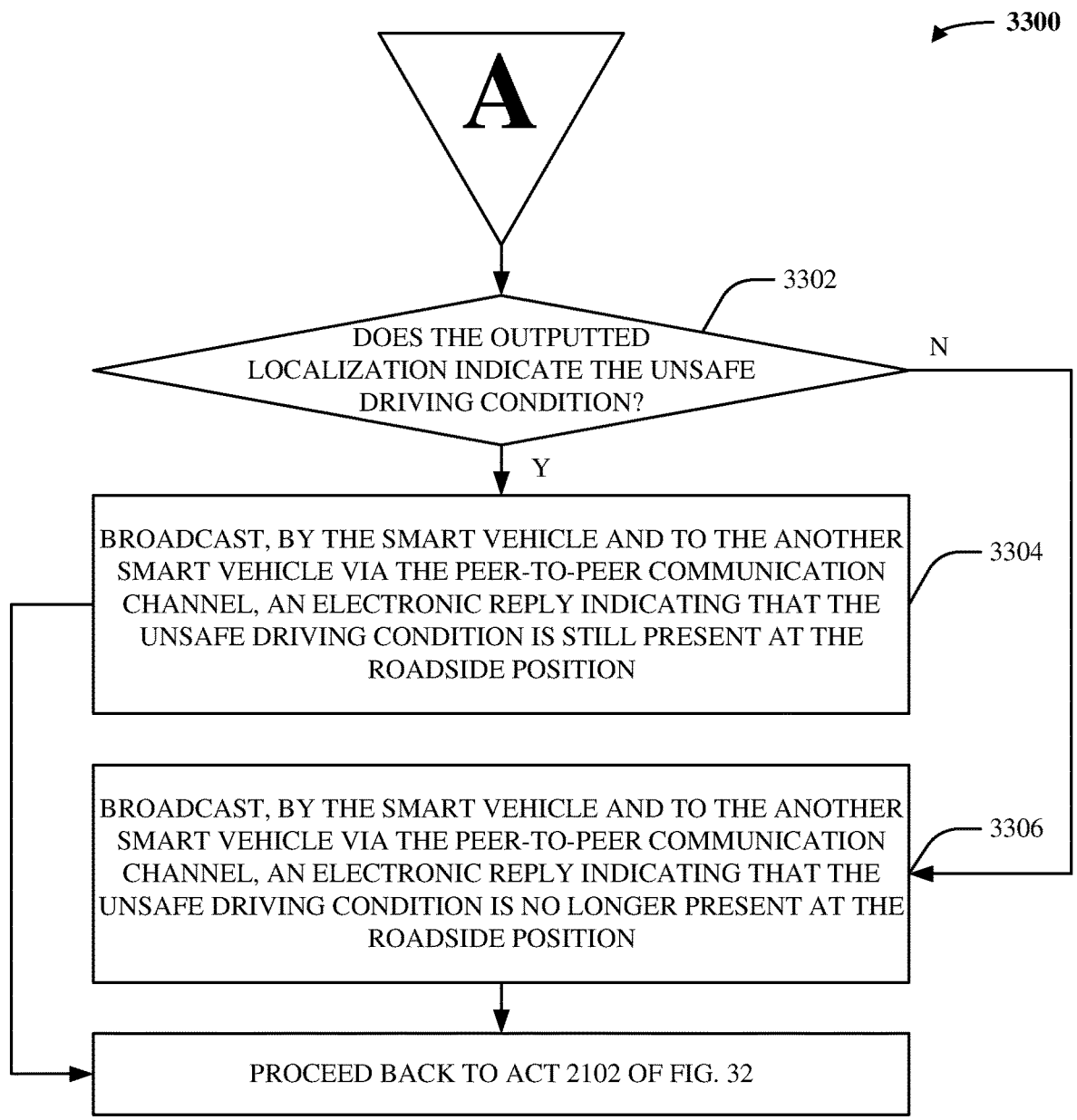

FIGS. 32-33 illustrate flow diagrams of example, non-limiting computer-implemented methods 3200 and 3300 that can facilitate generation of a follow-up localization in accordance with one or more embodiments described herein. In various cases, the traffic analysis system 118 can facilitate the computer-implemented methods 3200 and 3300.

First, consider FIG. 32. In various embodiments, the computer-implemented method 3200 can include acts 2102, 2104, and 2106, as described above. In various aspects, if it is determined at act 2106 that the electronic notification indicates that an unsafe driving condition is located along the road, then the computer-implemented method 3200 can proceed to act 3202.

In various instances, act 3202 can include recording, by the smart vehicle (e.g., via 1610) and via one or more road-facing sensors of the smart vehicle, roadside data (e.g., 3012, not 208) as the smart vehicle passes a roadside position (e.g., specified by 1002) corresponding to the unsafe driving condition. In some cases, such sensors can include cameras (e.g., 3014), microphones (e.g., 3016), thermometers (e.g., 3018), hygrometers (e.g., 3020), or proximity detectors (e.g., 3022).

In various aspects, act 3204 can include accessing, by the smart vehicle (e.g., via 1610), a deep learning neural network (e.g., 2702) that has been trained to localized unsafe driving conditions.

In various instances, act 3206 can include executing, by the smart vehicle (e.g., via 1610), the deep learning neural network on the roadside data. This can cause the deep learning neural network to produce an outputted localization (e.g., 3024). As shown, the computer-implemented method 3200 can proceed to act 3302 of the computer-implemented method 3300.

In various embodiments, act 3302 can include determining, by the smart vehicle (e.g., via 1610), whether the outputted localization indicates the unsafe driving condition. If so (e.g., if the outputted localization agrees that the unsafe driving condition is present), the computer-implemented method 3300 can proceed to act 3304. If not (e.g., if the outputted location disagrees that the unsafe driving condition is present), the computer-implemented method 3300 can proceed to act 3306.

In various aspects, act 3304 can include broadcasting, by the smart vehicle (e.g., via 1610) and to the another smart vehicle (e.g., 112) via the peer-to-peer communication channel (e.g., 120), an electronic reply indicating that the unsafe driving condition is still present at the roadside position. The computer-implemented method 3300 can proceed back to act 2102 of the computer-implemented method 3200.

In various instances, act 3306 can include broadcasting, by the smart vehicle (e.g., via 1610) and to the another smart vehicle (e.g., 112) via the peer-to-peer communication channel (e.g., 120), an electronic reply indicating that the unsafe driving condition is no longer present at the roadside position. The computer-implemented method 3300 can proceed back to act 2102 of the computer-implemented method 3200.

Although not explicitly shown in the figures, the execution component 1610 can, in response to the determination indicator 1702 being set to the active state, transmit (e.g., via any suitable P2P communication link) the electronic alert 902 to another vehicle (not shown) that is behind the vehicle 116. In this way, the electronic alert 902 can be daisy-chained among any suitable number of vehicles traveling on the road 100.

Although not explicitly shown in the figures, the receiver component 1606 can receive, retrieve, obtain, or otherwise access, from any suitable source, an electronic instruction instead of the electronic alert 902. In various aspects, the electronic instruction can specify a particular unsafe driving condition with an unknown location along the road 100. Accordingly, the traffic analysis system 118 can utilize the deep learning neural network 2702, the set of vehicle cameras 3002, the set of vehicle microphones 3004, the set of vehicle thermometers 3006, the set of vehicle hygrometers 3008, or the set of vehicle proximity sensors 3010 to continuously, continually, or periodically scan the road 100 in search of such particular unsafe driving condition. Upon locating such particular unsafe driving condition, the execution component 1610 can mark its roadside position (e.g., using the geolocation sensors of the vehicle 116), and the execution component 1610 can transmit, via any suitable P2P communication link to any suitable neighboring vehicle, the marked roadside position. As a non-limiting example, the particular unsafe driving condition can be a speeding or wrong-way vehicle having a particular license plate number that is known to be on the road 100 but whose specific roadside position is not known (e.g., such speeding or wrong-way vehicle may be evading law enforcement, and execution component 1610 can help to locate such speeding or wrong-way vehicle).

Figure 34:
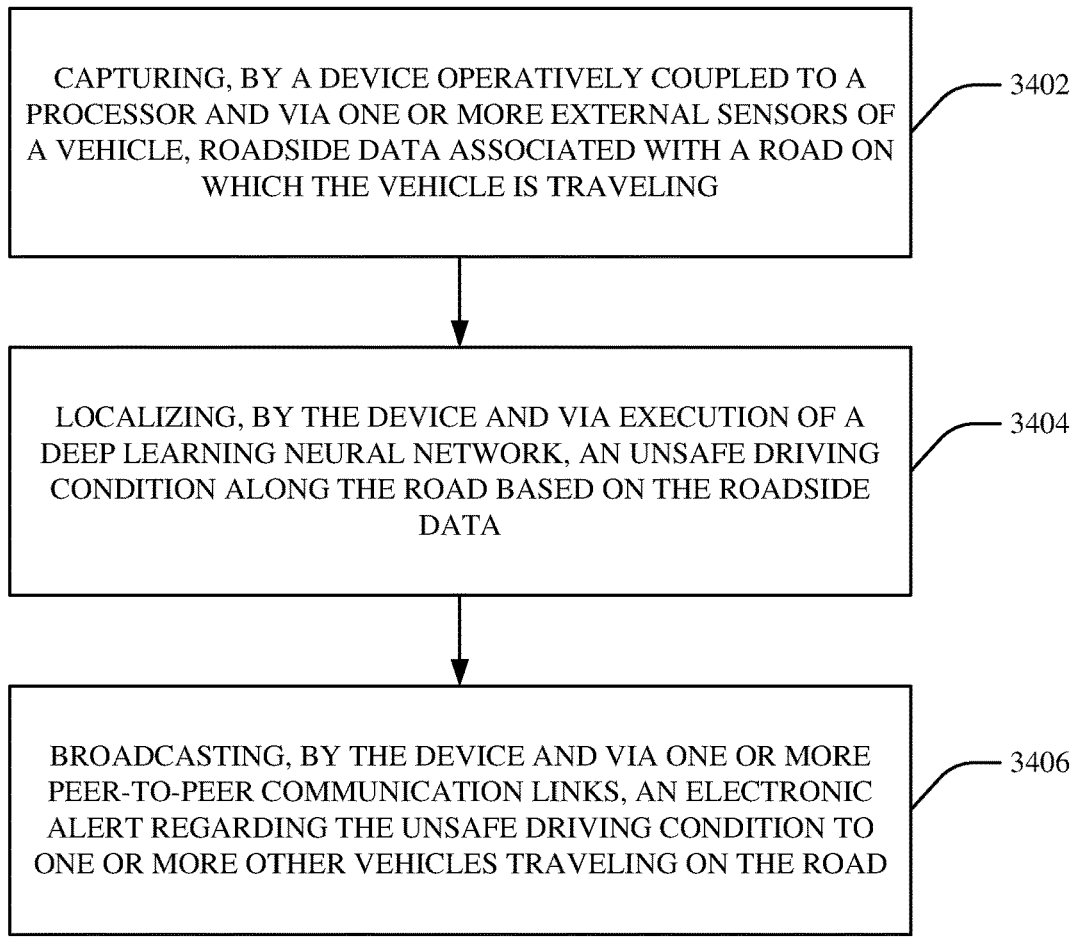
FIGS. 34-36 illustrate flow diagrams of example, non-limiting computer-implemented methods that facilitate peer-to-peer vehicular provision of artificially intelligence traffic analysis in accordance with one or more embodiments described herein.
Figure 35:
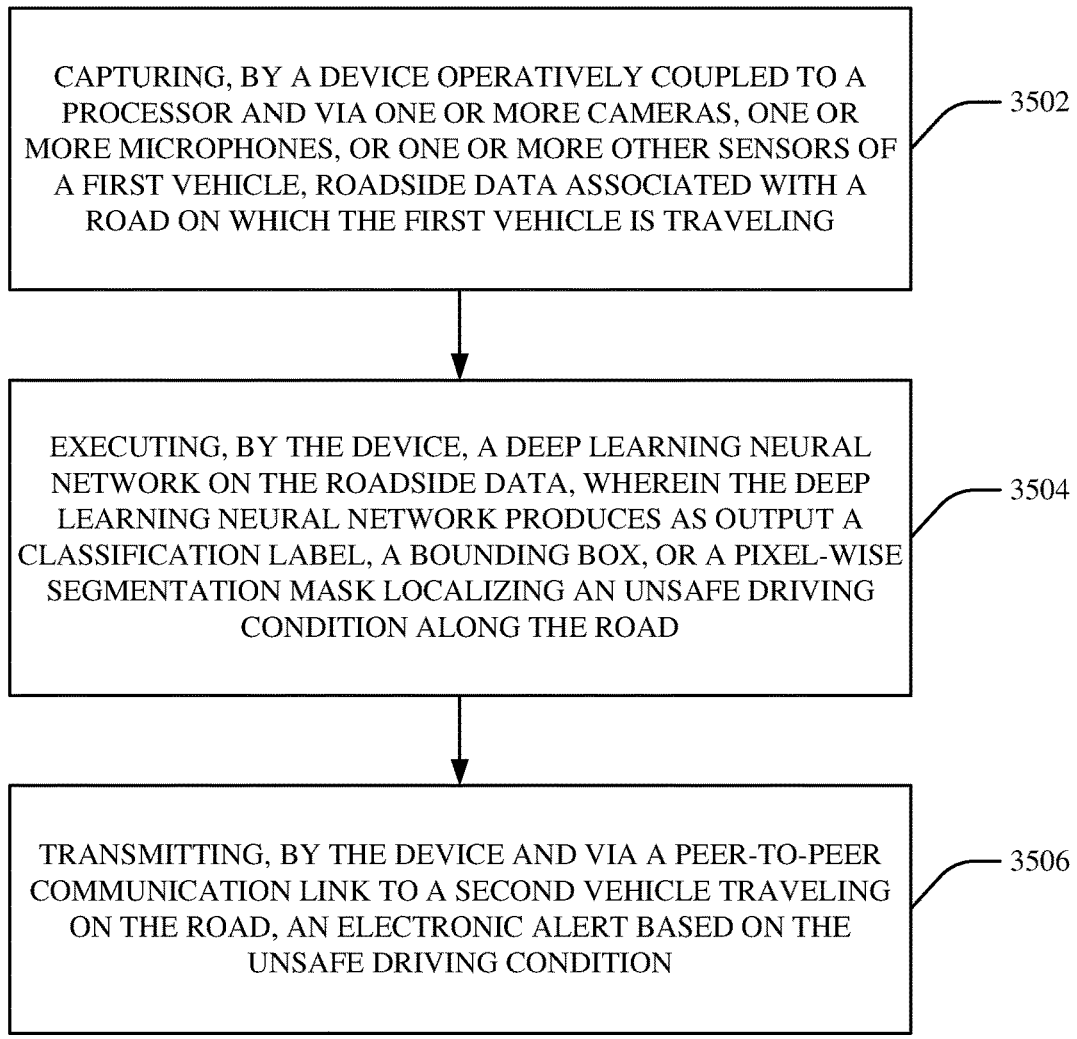
Figure 36:
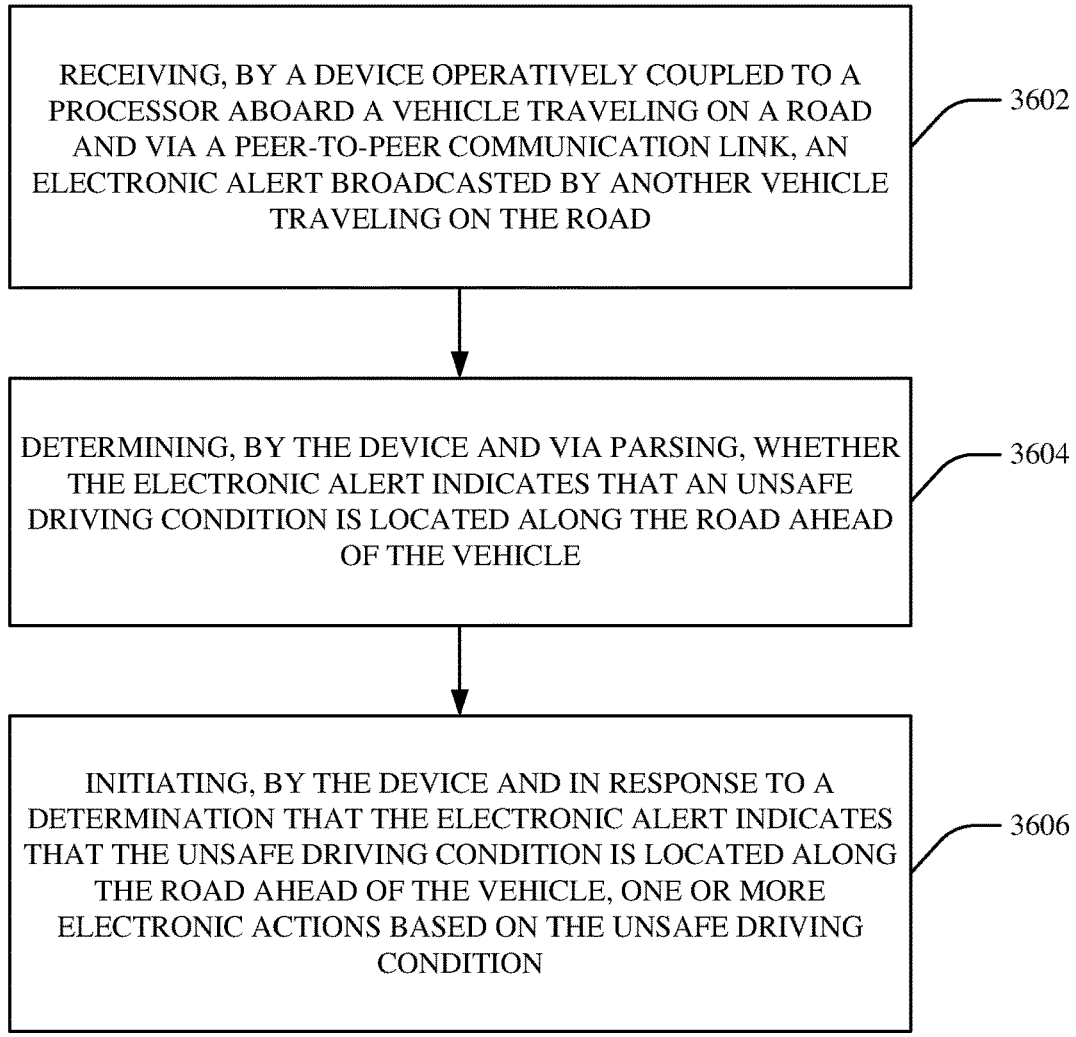

FIGS. 34-36 illustrate flow diagrams of example, non-limiting computer-implemented methods 3400, 3500, and 3600 that can facilitate peer-to-peer vehicular provision of artificially intelligence traffic analysis in accordance with one or more embodiments described herein. In various cases, the traffic analysis system 114 or the traffic analysis system 118 can facilitate the computer-implemented methods 3400, 3500, or 3600.

First, consider FIG. 34. In various embodiments, act 3402 can include capturing, by a device (e.g., via 206) operatively coupled to a processor (e.g., 202) and via one or more external sensors (e.g., 302, 304, 306, 308, 310) of a vehicle (e.g., 112), roadside data (e.g., 208) associated with a road (e.g., 100) on which the vehicle is traveling.

In various aspects, act 3404 can include localizing, by the device (e.g., via 210) and via execution of a deep learning neural network (e.g., via 402), an unsafe driving condition along the road based on the roadside data.

In various instances, act 3406 can include broadcasting, by the device (e.g., via 212) and via one or more peer-to-peer communication links (e.g., 120), an electronic alert (e.g., 902) regarding the unsafe driving condition to one or more other vehicles (e.g., 116) traveling on the road.

Although not explicitly shown in FIG. 34, the one or more external sensors can comprise one or more cameras (e.g., 302) of the vehicle that can capture one or more roadside images (e.g., 312), one or more microphones (e.g., 304) of the vehicle that can capture one or more roadside noises (e.g., 314), one or more thermometers (e.g., 306) of the vehicle that can capture one or more roadside temperatures (e.g., 316), one or more hygrometers (e.g., 308) of the vehicle that can capture one or more roadside humidities (e.g., 318), or one or more radar, sonar, or lidar sensors (e.g., 310) of the vehicle that can capture one or more roadside proximity detections (e.g., 320).

Although not explicitly shown in FIG. 34, the one or more external sensors can comprise one or more cameras (e.g., 302) of a drone launched by the vehicle that can capture one or more roadside images (e.g., 312), one or more microphones (e.g., 304) of the drone that can capture one or more roadside noises (e.g., 314), one or more thermometers (e.g., 306) of the drone that can capture one or more roadside temperatures (e.g., 316), one or more hygrometers (e.g., 308) of the drone that can capture one or more roadside humidities (e.g., 318), or one or more radar, sonar, or lidar sensors (e.g., 310) of the drone that can capture one or more roadside proximity detections (e.g., 320).

Although not explicitly shown in FIG. 34, the unsafe driving condition can comprise an object (e.g., 606) obstructing one or more lanes (e.g., 104) of the road, the deep learning neural network can receive the roadside data as input, and the deep learning neural network can produce as output a classification label, a bounding box, or a pixel-wise segmentation mask (e.g., 404) indicating the object.

Although not explicitly shown in FIG. 34, the unsafe driving condition can comprise an object (e.g., 702) located on or outside a shoulder (e.g., 106) of the road, the deep learning neural network can receive the roadside data as input, and the deep learning neural network can produce as output a classification label, a bounding box, or a pixel-wise segmentation mask (e.g., 404) indicating the object.

Now, consider FIG. 35. In various embodiments, act 3502 can include capturing, by a device (e.g., via 206) operatively coupled to a processor (e.g., 202) and via one or more cameras (e.g., 302), one or more microphones (e.g., 304), or one or more other sensors (e.g., 306, 308, 310) of a first vehicle (e.g., 112), roadside data (e.g., 208) associated with a road (e.g., 100) on which the first vehicle is traveling.

In various aspects, act 3504 can include executing, by the device (e.g., via 210), a deep learning neural network (e.g., 402) on the roadside data, wherein the deep learning neural network can produce as output a classification label, a bounding box, or a pixel-wise segmentation mask (e.g., 404) localizing an unsafe driving condition along the road.

In various instances, act 3506 can include transmitting, by the device (e.g., via 212) and via a peer-to-peer communication link (e.g., 120) to a second vehicle (e.g., 116) traveling on the road, an electronic alert (e.g., 902) based on the unsafe driving condition.

Although not explicitly shown in FIG. 35, the electronic alert can comprise the classification label, the bounding box, or the pixel-wise segmentation mask.

Although not explicitly shown in FIG. 35, the electronic alert can comprise a geolocation stamp (e.g., 1002) recorded by a global positioning sensor or a wi-fi positioning sensor (e.g., 904) of the first vehicle, and the geolocation stamp can indicate a roadside position along the road at which the unsafe driving condition is located.

Although not explicitly shown in FIG. 35, the classification label, the bounding box, or the pixel-wise segmentation mask can indicate that the unsafe driving condition is in one or more lanes of the road at the roadside position indicated by the geolocation stamp, and the electronic alert can recommend (e.g., via 1008) that the one or more lanes be avoided when passing the roadside position.

Although not explicitly shown in FIG. 35, the classification label, the bounding box, or the pixel-wise segmentation mask can indicate that the unsafe driving condition is in or outside a shoulder of the road at the roadside position indicated by the geolocation stamp, and the electronic alert can recommend (e.g., via 1008) that caution be exercised when passing the roadside position.

Although not explicitly shown in FIG. 35, the electronic alert can comprise a timestamp (e.g., 1004) recorded by a clock (e.g., 906) of the first vehicle, and the timestamp can indicate when the unsafe driving condition was localized by the first vehicle.

Although not explicitly shown in FIG. 35, the electronic alert can comprise the roadside data captured by the one or more cameras, the one or more microphones, or the one or more other sensors of the first vehicle.

Although not explicitly shown in FIG. 35, the electronic alert can comprise an identifier (e.g., 1006) associated with the first vehicle, wherein the identifier can comprise at least one from the group consisting of a license plate of the first vehicle, a first name of an owner of the first vehicle, a first address of the owner of the first vehicle, a second name of a current driver of the first vehicle, and a second address of the current driver of the first vehicle.

Now, consider FIG. 36. In various embodiments, act 3602 can include receiving, by a device (e.g., via 1606) operatively coupled to a processor (e.g., 1602) aboard a vehicle (e.g., 116) traveling on a road (e.g., 100) and via a peer-to-peer communication link (e.g., 120), an electronic alert (e.g., 902) broadcasted by another vehicle (e.g., 112) traveling on the road.

In various aspects, act 3604 can include determining, by the device (e.g., via 1608) and via parsing, whether the electronic alert indicates that an unsafe driving condition is located along the road ahead of the vehicle.

In various instances, act 3606 can include initiating, by the device (e.g., via 1610) and in response to a determination (e.g., 1702) that the electronic alert indicates that the unsafe driving condition is located along the road ahead of the vehicle, one or more electronic actions based on the unsafe driving condition.

Although not explicitly shown in FIG. 36, the one or more electronic actions can comprise: rendering, by the device (e.g., via 1610) and on an electronic navigation display (e.g., 1802) of the vehicle, a graphical representation (e.g., 2002, 2004) of the unsafe driving condition.

Although not explicitly shown in FIG. 36, the one or more electronic actions can comprise: updating, by the device (e.g., via 1610), an electronic navigation route of the vehicle, such that the updated electronic navigation route avoids the unsafe driving condition (e.g., as shown in FIGS. 22-23).

Although not explicitly shown in FIG. 36, the one or more electronic actions can comprise: causing, by the device (e.g., via 1610), the vehicle to decelerate or change lanes (e.g., 2502) when passing the unsafe driving condition.

Although not explicitly shown in FIG. 36, the electronic alert can indicate roadside data (e.g., 208) captured by one or more sensors (e.g., 302, 304, 306, 308, 310) of the another vehicle, the electronic alert can indicate that the another vehicle localized the unsafe driving condition by executing a first deep learning neural network (e.g., 402) on the roadside data, and the one or more electronic actions can comprise: verifying, by the device (e.g., via 1610), such localization by executing a second deep learning neural network (e.g., 2702) on the roadside data.

Although not explicitly shown in FIG. 36, the electronic alert can specify a roadside position (e.g., via 1002) at which the unsafe driving condition was localized by the another vehicle, and the one or more electronic actions can comprise: capturing, by the device (e.g., via 1610) and via one or more sensors (e.g., 3002, 3004, 3006, 3008, 3010) of the vehicle, roadside data (e.g., 3012) as the vehicle passes the roadside position; and confirming, by the device (e.g., 1610), whether the unsafe driving condition is still present at the roadside position by executing a deep learning neural network (e.g., 2702) on the roadside data. In various aspects, the deep learning neural network can localize the unsafe driving condition based on the roadside data, and the one or more electronic actions can further comprise: broadcasting, by the device (e.g., via 1610) and to the another vehicle via the peer-to-peer communication link, an electronic reply indicating that the unsafe driving condition is still present at the roadside position (e.g., as shown in FIGS. 32-33). In various instances, the deep learning neural network can fail to localize the unsafe driving condition based on the roadside data, and the one or more electronic actions can further comprise: broadcasting, by the device (e.g., via 1610) and to the another vehicle via the peer-to-peer communication link, an electronic reply indicating that the unsafe driving condition is no longer present at the roadside position (e.g., as shown in FIGS. 32-33).

Although the herein disclosure mainly described various embodiments as implementing deep learning neural networks (e.g., 402, 2702), this is a mere non-limiting example. In various aspects, the herein-described teachings can be implemented via any suitable machine learning models exhibiting any suitable artificial intelligence architectures (e.g., support vector machines, naïve Bayes, linear regression, logistic regression, decision trees, random forest).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

Figure 37:
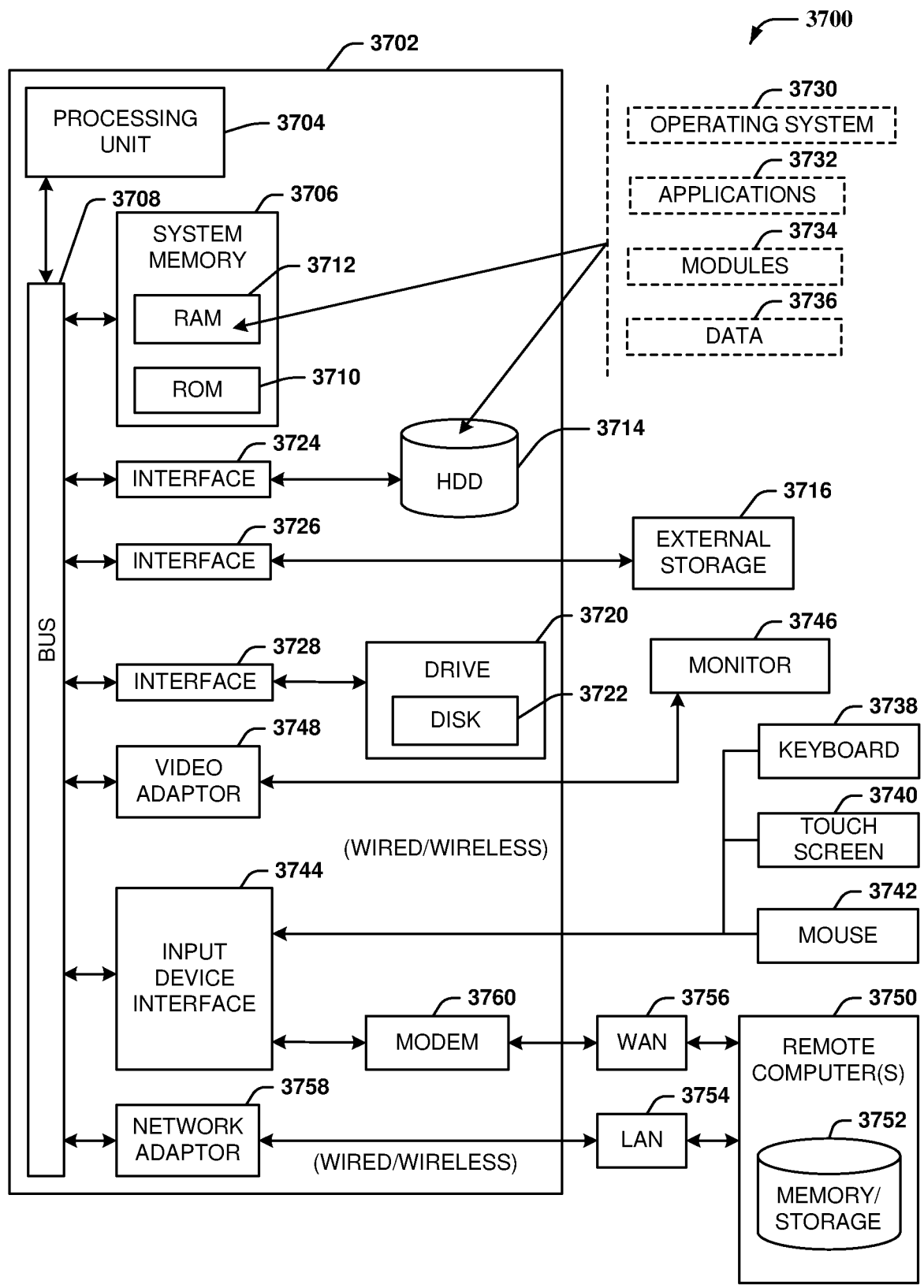
FIG. 37 illustrates a block diagram of an example, non-limiting operating environment in which one or more embodiments described herein can be facilitated.

In order to provide additional context for various embodiments described herein, FIG. 37 and the following discussion are intended to provide a brief, general description of a suitable computing environment 3700 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 37, the example environment 3700 for implementing various embodiments of the aspects described herein includes a computer 3702, the computer 3702 including a processing unit 3704, a system memory 3706 and a system bus 3708. The system bus 3708 couples system components including, but not limited to, the system memory 3706 to the processing unit 3704. The processing unit 3704 can be any of various commercially available processors. Dual microprocessors and other multi-processor architectures can also be employed as the processing unit 3704.

The system bus 3708 can be any of several types of bus structure that can further interconnect to a memory bus (with or without a memory controller), a peripheral bus, and a local bus using any of a variety of commercially available bus architectures. The system memory 3706 includes ROM 3710 and RAM 3712. A basic input/output system (BIOS) can be stored in a non-volatile memory such as ROM, erasable programmable read only memory (EPROM), EEPROM, which BIOS contains the basic routines that help to transfer information between elements within the computer 3702, such as during startup. The RAM 3712 can also include a high-speed RAM such as static RAM for caching data.

The computer 3702 further includes an internal hard disk drive (HDD) 3714 (e.g., EIDE, SATA), one or more external storage devices 3716 (e.g., a magnetic floppy disk drive (FDD) 3716, a memory stick or flash drive reader, a memory card reader, etc.) and a drive 3720, e.g., such as a solid state drive, an optical disk drive, which can read or write from a disk 3722, such as a CD-ROM disc, a DVD, a BD, etc. Alternatively, where a solid state drive is involved, disk 3722 would not be included, unless separate. While the internal HDD 3714 is illustrated as located within the computer 3702, the internal HDD 3714 can also be configured for external use in a suitable chassis (not shown). Additionally, while not shown in environment 3700, a solid state drive (SSD) could be used in addition to, or in place of, an HDD 3714. The HDD 3714, external storage device(s) 3716 and drive 3720 can be connected to the system bus 3708 by an HDD interface 3724, an external storage interface 3726 and a drive interface 3728, respectively. The interface 3724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 3702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 3712, including an operating system 3730, one or more application programs 3732, other program modules 3734 and program data 3736. All or portions of the operating system, applications, modules, or data can also be cached in the RAM 3712. The systems and methods described herein can be implemented utilizing various commercially available operating systems or combinations of operating systems.

Computer 3702 can optionally comprise emulation technologies. For example, a hypervisor (not shown) or other intermediary can emulate a hardware environment for operating system 3730, and the emulated hardware can optionally be different from the hardware illustrated in FIG. 37. In such an embodiment, operating system 3730 can comprise one virtual machine (VM) of multiple VMs hosted at computer 3702. Furthermore, operating system 3730 can provide runtime environments, such as the Java runtime environment or the .NET framework, for applications 3732. Runtime environments are consistent execution environments that allow applications 3732 to run on any operating system that includes the runtime environment. Similarly, operating system 3730 can support containers, and applications 3732 can be in the form of containers, which are lightweight, standalone, executable packages of software that include, e.g., code, runtime, system tools, system libraries and settings for an application.

Further, computer 3702 can be enable with a security module, such as a trusted processing module (TPM). For instance with a TPM, boot components hash next in time boot components, and wait for a match of results to secured values, before loading a next boot component. This process can take place at any layer in the code execution stack of computer 3702, e.g., applied at the application execution level or at the operating system (OS) kernel level, thereby enabling security at any level of code execution.

A user can enter commands and information into the computer 3702 through one or more wired/wireless input devices, e.g., a keyboard 3738, a touch screen 3740, and a pointing device, such as a mouse 3742. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 3704 through an input device interface 3744 that can be coupled to the system bus 3708, but can be connected by other interfaces, such as a parallel port, an IEEE 1394 serial port, a game port, a USB port, an IR interface, a BLUETOOTH® interface, etc.

A monitor 3746 or other type of display device can be also connected to the system bus 3708 via an interface, such as a video adapter 3748. In addition to the monitor 3746, a computer typically includes other peripheral output devices (not shown), such as speakers, printers, etc.

The computer 3702 can operate in a networked environment using logical connections via wired or wireless communications to one or more remote computers, such as a remote computer(s) 3750. The remote computer(s) 3750 can be a workstation, a server computer, a router, a personal computer, portable computer, microprocessor-based entertainment appliance, a peer device or other common network node, and typically includes many or all of the elements described relative to the computer 3702, although, for purposes of brevity, only a memory/storage device 3752 is illustrated. The logical connections depicted include wired/wireless connectivity to a local area network (LAN) 3754 or larger networks, e.g., a wide area network (WAN) 3756. Such LAN and WAN networking environments are commonplace in offices and companies, and facilitate enterprise-wide computer networks, such as intranets, all of which can connect to a global communications network, e.g., the Internet.

When used in a LAN networking environment, the computer 3702 can be connected to the local network 3754 through a wired or wireless communication network interface or adapter 3758. The adapter 3758 can facilitate wired or wireless communication to the LAN 3754, which can also include a wireless access point (AP) disposed thereon for communicating with the adapter 3758 in a wireless mode.

When used in a WAN networking environment, the computer 3702 can include a modem 3760 or can be connected to a communications server on the WAN 3756 via other means for establishing communications over the WAN 3756, such as by way of the Internet. The modem 3760, which can be internal or external and a wired or wireless device, can be connected to the system bus 3708 via the input device interface 3744. In a networked environment, program modules depicted relative to the computer 3702 or portions thereof, can be stored in the remote memory/storage device 3752. It will be appreciated that the network connections shown are example and other means of establishing a communications link between the computers can be used.

When used in either a LAN or WAN networking environment, the computer 3702 can access cloud storage systems or other network-based storage systems in addition to, or in place of, external storage devices 3716 as described above, such as but not limited to a network virtual machine providing one or more aspects of storage or processing of information. Generally, a connection between the computer 3702 and a cloud storage system can be established over a LAN 3754 or WAN 3756 e.g., by the adapter 3758 or modem 3760, respectively. Upon connecting the computer 3702 to an associated cloud storage system, the external storage interface 3726 can, with the aid of the adapter 3758 or modem 3760, manage storage provided by the cloud storage system as it would other types of external storage. For instance, the external storage interface 3726 can be configured to provide access to cloud storage sources as if those sources were physically connected to the computer 3702.

The computer 3702 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 38:
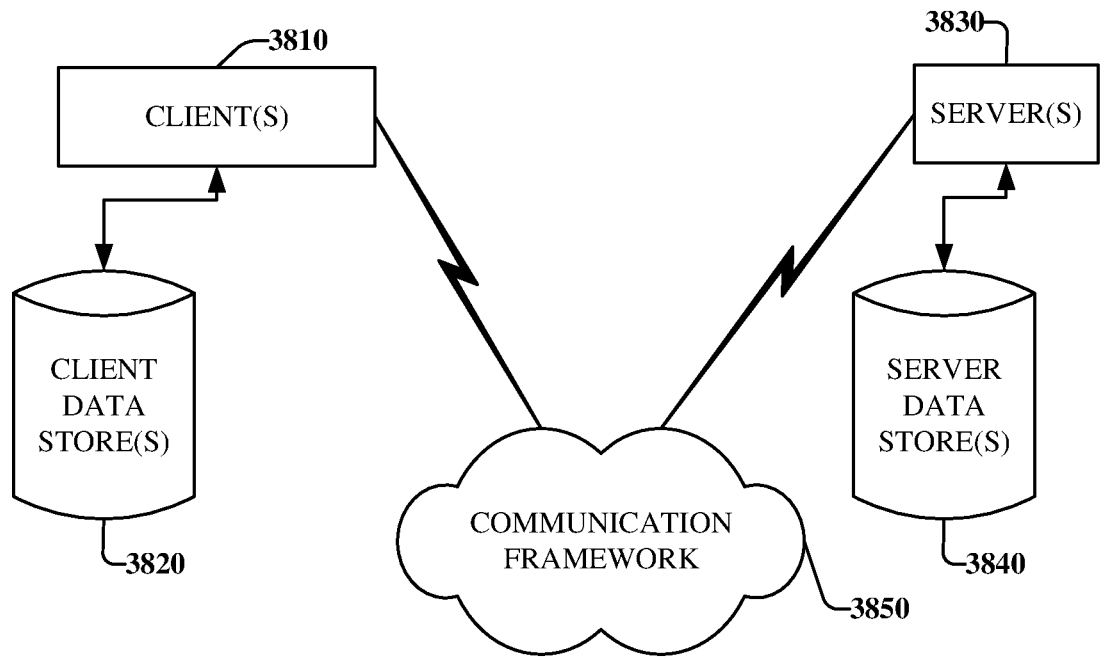
FIG. 38 illustrates an example networking environment operable to execute various implementations described herein.

FIG. 38 is a schematic block diagram of a sample computing environment 3800 with which the disclosed subject matter can interact. The sample computing environment 3800 includes one or more client(s) 3810. The client(s) 3810 can be hardware or software (e.g., threads, processes, computing devices). The sample computing environment 3800 also includes one or more server(s) 3830. The server(s) 3830 can also be hardware or software (e.g., threads, processes, computing devices). The servers 3830 can house threads to perform transformations by employing one or more embodiments as described herein, for example. One possible communication between a client 3810 and a server 3830 can be in the form of a data packet adapted to be transmitted between two or more computer processes. The sample computing environment 3800 includes a communication framework 3850 that can be employed to facilitate communications between the client(s) 3810 and the server(s) 3830. The client(s) 3810 are operably connected to one or more client data store(s) 3820 that can be employed to store information local to the client(s) 3810. Similarly, the server(s) 3830 are operably connected to one or more server data store(s) 3840 that can be employed to store information local to the servers 3830.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various non-limiting aspects of various embodiments described herein are presented in the following clauses.

Clause 1: A system onboard a vehicle, the system comprising: a processor that executes computer-executable components stored in a non-transitory computer-readable memory, the computer-executable components comprising: a sensor component that captures, via one or more external sensors of the vehicle, roadside data associated with a road on which the vehicle is traveling; an inference component that localizes, via execution of a deep learning neural network, an unsafe driving condition along the road based on the roadside data; and a broadcast component that broadcasts, via one or more peer-to-peer communication links, an electronic alert regarding the unsafe driving condition to one or more other vehicles traveling on the road.

Clause 2: The system of any preceding clause, wherein the one or more external sensors comprise one or more cameras of the vehicle that capture one or more roadside images, one or more microphones of the vehicle that capture one or more roadside noises, one or more thermometers of the vehicle that capture one or more roadside temperatures, one or more hygrometers of the vehicle that capture one or more roadside humidities, or one or more radar, sonar, or lidar sensors of the vehicle that capture one or more roadside proximity detections.

Clause 3: The system of any preceding clause, wherein the one or more external sensors comprise one or more cameras of a drone launched by the vehicle that capture one or more roadside images, one or more microphones of the drone that capture one or more roadside noises, one or more thermometers of the drone that capture one or more roadside temperatures, one or more hygrometers of the drone that capture one or more roadside humidities, or one or more radar, sonar, or lidar sensors of the drone that capture one or more roadside proximity detections.

Clause 4: The system of any preceding clause, wherein the unsafe driving condition comprises an object obstructing one or more lanes of the road, wherein the deep learning neural network receives the roadside data as input, and wherein the deep learning neural network produces as output a classification label, a bounding box, or a pixel-wise segmentation mask indicating the object.

Clause 5: The system of any preceding clause, wherein the object is at least one from the group consisting of a pothole, a fallen tree limb, a fallen rock, a fallen power line, a piece of furniture, a damaged tire, a stationary vehicle, an animal, an ice patch, a flood patch, and a fog patch.

Clause 6: The system of any preceding clause, wherein the unsafe driving condition comprises an object located on or outside a shoulder of the road, wherein the deep learning neural network receives the roadside data as input, and wherein the deep learning neural network produces as output a classification label, a bounding box, or a pixel-wise segmentation mask indicating the object.

Clause 7: The system of any preceding clause, wherein the unsafe driving condition comprises another vehicle that is weaving between lanes of the road, that is traveling above a speed limit of the road, or that is travelling in a wrong direction along the road, wherein the deep learning neural network receives the roadside data as input, and wherein the deep learning neural network produces as output a classification label, a bounding box, or a pixel-wise segmentation mask indicating the another vehicle.

In various cases, any suitable combination or combinations of clauses 1 to 7 can be implemented.

Clause 8: A computer-implemented method, comprising: capturing, by a device operatively coupled to a processor and via one or more external sensors of a vehicle, roadside data associated with a road on which the vehicle is traveling; localizing, by the device and via execution of a deep learning neural network, an unsafe driving condition along the road based on the roadside data; and broadcasting, by the device and via one or more peer-to-peer communication links, an electronic alert regarding the unsafe driving condition to one or more other vehicles traveling on the road.

Clause 9: The computer-implemented method of any preceding clause, wherein the one or more external sensors comprise one or more cameras of the vehicle that capture one or more roadside images, one or more microphones of the vehicle that capture one or more roadside noises, one or more thermometers of the vehicle that capture one or more roadside temperatures, one or more hygrometers of the vehicle that capture one or more roadside humidities, or one or more radar, sonar, or lidar sensors of the vehicle that capture one or more roadside proximity detections.

Clause 10: The computer-implemented method of any preceding clause, wherein the one or more external sensors comprise one or more cameras of a drone launched by the vehicle that capture one or more roadside images, one or more microphones of the drone that capture one or more roadside noises, one or more thermometers of the drone that capture one or more roadside temperatures, one or more hygrometers of the drone that capture one or more roadside humidities, or one or more radar, sonar, or lidar sensors of the drone that capture one or more roadside proximity detections.

Clause 11: The computer-implemented method of any preceding clause, wherein the unsafe driving condition comprises an object obstructing one or more lanes of the road, wherein the deep learning neural network receives the roadside data as input, and wherein the deep learning neural network produces as output a classification label, a bounding box, or a pixel-wise segmentation mask indicating the object.

Clause 12: The computer-implemented method of any preceding clause, wherein the object is at least one from the group consisting of a pothole, a fallen tree limb, a fallen rock, a fallen power line, a piece of furniture, a damaged tire, a stationary vehicle, an animal, an ice patch, a flood patch, and a fog patch.

Clause 13: The computer-implemented method of any preceding clause, wherein the unsafe driving condition comprises an object located on or outside a shoulder of the road, wherein the deep learning neural network receives the roadside data as input, and wherein the deep learning neural network produces as output a classification label, a bounding box, or a pixel-wise segmentation mask indicating the object.

Clause 14: The computer-implemented method of any preceding clause, wherein the unsafe driving condition comprises another vehicle that is weaving between lanes of the road, that is traveling above a speed limit of the road, or that is travelling in a wrong direction along the road, wherein the deep learning neural network receives the roadside data as input, and wherein the deep learning neural network produces as output a classification label, a bounding box, or a pixel-wise segmentation mask indicating the another vehicle.

In various cases, any suitable combination or combinations of clauses 8 to 14 can be implemented.

Clause 15: A computer program product for facilitating peer-to-peer vehicular provision of artificially intelligent traffic analysis, the computer program product comprising a non-transitory computer-readable memory having program instructions embodied therewith, the program instructions executable by a processor onboard a vehicle to cause the processor to: capture, via one or more external sensors of the vehicle, roadside data associated with a road on which the vehicle is traveling; localize, via execution of a deep learning neural network, an unsafe driving condition along the road based on the roadside data; and broadcast, via one or more peer-to-peer communication links, an electronic alert regarding the unsafe driving condition to one or more other vehicles traveling on the road.

Clause 16: The computer program product of any preceding clause, wherein the one or more external sensors comprise one or more cameras of the vehicle that capture one or more roadside images, one or more microphones of the vehicle that capture one or more roadside noises, one or more thermometers of the vehicle that capture one or more roadside temperatures, one or more hygrometers of the vehicle that capture one or more roadside humidities, or one or more radar, sonar, or lidar sensors of the vehicle that capture one or more roadside proximity detections.

Claim 17: The computer program product of any preceding clause, wherein the one or more external sensors comprise one or more cameras of a drone launched by the vehicle that capture one or more roadside images, one or more microphones of the drone that capture one or more roadside noises, one or more thermometers of the drone that capture one or more roadside temperatures, one or more hygrometers of the drone that capture one or more roadside humidities, or one or more radar, sonar, or lidar sensors of the drone that capture one or more roadside proximity detections.

Clause 18: The computer program product of any preceding clause, wherein the unsafe driving condition comprises an object obstructing one or more lanes of the road, wherein the deep learning neural network receives the roadside data as input, and wherein the deep learning neural network produces as output a classification label, a bounding box, or a pixel-wise segmentation mask indicating the object.

Clause 19: The computer program product of any preceding clause, wherein the object is at least one from the group consisting of a pothole, a fallen tree limb, a fallen rock, a fallen power line, a piece of furniture, a damaged tire, a stationary vehicle, an animal, an ice patch, a flood patch, and a fog patch.

Clause 20: The computer program product of any preceding clause, wherein the unsafe driving condition comprises an object located on or outside a shoulder of the road, wherein the deep learning neural network receives the roadside data as input, and wherein the deep learning neural network produces as output a classification label, a bounding box, or a pixel-wise segmentation mask indicating the object.

In various cases, any suitable combination or combinations of clauses 15 to 20 can be implemented.

Clause 21: A system onboard a first vehicle, the system comprising: a processor that executes computer-executable components stored in a non-transitory computer-readable memory, the computer-executable components comprising: a sensor component that captures, via one or more cameras, one or more microphones, or one or more other sensors of the first vehicle, roadside data associated with a road on which the first vehicle is traveling; an inference component that executes a deep learning neural network on the roadside data, wherein the deep learning neural network produces as output a classification label, a bounding box, or a pixel-wise segmentation mask localizing an unsafe driving condition along the road; and a broadcast component that transmits, via a peer-to-peer communication link to a second vehicle traveling on the road, an electronic alert based on the unsafe driving condition.

Clause 22: The system of any preceding clause, wherein the electronic alert comprises the classification label, the bounding box, or the pixel-wise segmentation mask.

Clause 23: The system of any preceding clause, wherein the electronic alert comprises a geolocation stamp recorded by a global positioning sensor or a wi-fi positioning sensor of the first vehicle, and wherein the geolocation stamp indicates a roadside position along the road at which the unsafe driving condition is located.

Clause 24: The system of any preceding clause, wherein the classification label, the bounding box, or the pixel-wise segmentation mask indicate that the unsafe driving condition is in one or more lanes of the road at the roadside position indicated by the geolocation stamp, and wherein the electronic alert recommends that the one or more lanes be avoided when passing the roadside position.

Clause 25: The system of any preceding clause, wherein the classification label, the bounding box, or the pixel-wise segmentation mask indicate that the unsafe driving condition is in or outside a shoulder of the road at the roadside position indicated by the geolocation stamp, and wherein the electronic alert recommends that caution be exercised when passing the roadside position.

Clause 26: The system of any preceding clause, wherein the electronic alert comprises a timestamp recorded by a clock of the first vehicle, and wherein the timestamp indicates when the unsafe driving condition was localized by the first vehicle.

Clause 27: The system of any preceding clause, wherein the electronic alert comprises the roadside data captured by the one or more cameras, the one or more microphones, or the one or more other sensors of the first vehicle.

Clause 28: The system of any preceding clause, wherein the electronic alert comprises an identifier associated with the first vehicle, wherein the identifier comprises at least one from the group consisting of a license plate of the first vehicle, a first name of an owner of the first vehicle, a first address of the owner of the first vehicle, a second name of a current driver of the first vehicle, and a second address of the current driver of the first vehicle.

In various cases, any suitable combination or combinations of clauses 21 to 28 can be implemented.

Clause 29: A computer-implemented method, comprising: capturing, by a device operatively coupled to a processor and via one or more cameras, one or more microphones, or one or more other sensors of a first vehicle, roadside data associated with a road on which the first vehicle is traveling; executing, by the device, a deep learning neural network on the roadside data, wherein the deep learning neural network produces as output a classification label, a bounding box, or a pixel-wise segmentation mask localizing an unsafe driving condition along the road; and transmitting, by the device and via a peer-to-peer communication link to a second vehicle traveling on the road, an electronic alert based on the unsafe driving condition.

Clause 30: The computer-implemented method of any preceding clause, wherein the electronic alert comprises the classification label, the bounding box, or the pixel-wise segmentation mask.

Clause 31: The computer-implemented method of any preceding clause, wherein the electronic alert comprises a geolocation stamp recorded by a global positioning sensor or a wi-fi positioning sensor of the first vehicle, and wherein the geolocation stamp indicates a roadside position along the road at which the unsafe driving condition is located.

Clause 32: The computer-implemented method of any preceding clause, wherein the classification label, the bounding box, or the pixel-wise segmentation mask indicate that the unsafe driving condition is in one or more lanes of the road at the roadside position indicated by the geolocation stamp, and wherein the electronic alert recommends that the one or more lanes be avoided when passing the roadside position.

Clause 33: The computer-implemented method of any preceding clause, wherein the classification label, the bounding box, or the pixel-wise segmentation mask indicate that the unsafe driving condition is in or outside a shoulder of the road at the roadside position indicated by the geolocation stamp, and wherein the electronic alert recommends that caution be exercised when passing the roadside position.

Clause 34: The computer-implemented method of any preceding clause, wherein the electronic alert comprises a timestamp recorded by a clock of the first vehicle, and wherein the timestamp indicates when the unsafe driving condition was localized by the first vehicle.

Clause 35: The computer-implemented method of any preceding clause, wherein the electronic alert comprises the roadside data captured by the one or more cameras, the one or more microphones, or the one or more other sensors of the first vehicle.

Clause 36: The computer-implemented method of any preceding clause, wherein the electronic alert comprises an identifier associated with the first vehicle, wherein the identifier comprises at least one from the group consisting of a license plate of the first vehicle, a first name of an owner of the first vehicle, a first address of the owner of the first vehicle, a second name of a current driver of the first vehicle, and a second address of the current driver of the first vehicle.

In various cases, any suitable combination or combinations of clauses 29 to 36 can be implemented.

Clause 37: A computer program product for facilitating peer-to-peer vehicular provision of artificially intelligent traffic analysis, the computer program product comprising a non-transitory computer-readable memory having program instructions embodied therewith, the program instructions executable by a processor onboard a first vehicle to cause the processor to: capture, via one or more cameras, one or more microphones, or one or more other sensors of the first vehicle, roadside data associated with a road on which the first vehicle is traveling; execute a deep learning neural network on the roadside data, wherein the deep learning neural network produces as output a classification label, a bounding box, or a pixel-wise segmentation mask localizing an unsafe driving condition along the road; and transmit, via a peer-to-peer communication link to a second vehicle traveling on the road, an electronic alert based on the unsafe driving condition.

Clause 38: The computer program product of any preceding clause, wherein the electronic alert comprises the classification label, the bounding box, or the pixel-wise segmentation mask.

Clause 39: The computer program product of any preceding clause, wherein the electronic alert comprises a geolocation stamp recorded by a global positioning sensor or a wi-fi positioning sensor of the first vehicle, and wherein the geolocation stamp indicates a roadside position along the road at which the unsafe driving condition is located.

Clause 40: The computer program product of any preceding clause, wherein the classification label, the bounding box, or the pixel-wise segmentation mask indicate that the unsafe driving condition is in one or more lanes of the road at the roadside position indicated by the geolocation stamp, and wherein the electronic alert recommends that the one or more lanes be avoided when passing the roadside position.

In various cases, any suitable combination or combinations of clauses 37 to 40 can be implemented.

Clause 41: A system onboard a vehicle traveling on a road, the system comprising: a processor that executes computer-executable components stored in a non-transitory computer-readable memory, the computer-executable components comprising: a receiver component that receives, via a peer-to-peer communication link, an electronic alert broadcasted by another vehicle traveling on the road; a determination component that determines, via parsing, whether the electronic alert indicates that an unsafe driving condition is located along the road ahead of the vehicle; and an execution component that initiates, in response to a determination that the electronic alert indicates that the unsafe driving condition is located along the road ahead of the vehicle, one or more electronic actions based on the unsafe driving condition.

Clause 42: The system of any preceding clause, wherein the execution component renders, on an electronic navigation display of the vehicle, a graphical representation of the unsafe driving condition.

Clause 43: The system of any preceding clause, wherein the execution component updates an electronic navigation route of the vehicle, such that the updated electronic navigation route avoids the unsafe driving condition.

Clause 44: The system of any preceding clause, wherein the execution component causes the vehicle to decelerate or change lanes when passing the unsafe driving condition.

Clause 45: The system of any preceding clause, wherein the electronic alert indicates roadside data captured by one or more sensors of the another vehicle, wherein the electronic alert indicates that the another vehicle localized the unsafe driving condition by executing a first deep learning neural network on the roadside data, and wherein the execution component verifies such localization by executing a second deep learning neural network on the roadside data.

Clause 46: The system of any preceding clause, wherein the electronic alert specifies a roadside position at which the unsafe driving condition was localized by the another vehicle, wherein the execution component captures, via one or more sensors of the vehicle, roadside data as the vehicle passes the roadside position, and wherein the execution component confirms whether the unsafe driving condition is still present at the roadside position by executing a deep learning neural network on the roadside data.

Clause 47: The system of any preceding clause, wherein the deep learning neural network localizes the unsafe driving condition based on the roadside data, and wherein the execution component broadcasts, to the another vehicle via the peer-to-peer communication link, an electronic reply indicating that the unsafe driving condition is still present at the roadside position.

Clause 48: The system of any preceding clause, wherein the deep learning neural network fails to localize the unsafe driving condition based on the roadside data, and wherein the execution component broadcasts, to the another vehicle via the peer-to-peer communication link, an electronic reply indicating that the unsafe driving condition is no longer present at the roadside position.

In various cases, any suitable combination or combinations of clauses 41 to 48 can be implemented.

Clause 49: A computer-implemented method, comprising: receiving, by a device operatively coupled to a processor aboard a vehicle traveling on a road and via a peer-to-peer communication link, an electronic alert broadcasted by another vehicle traveling on the road; determining, by the device and via parsing, whether the electronic alert indicates that an unsafe driving condition is located along the road ahead of the vehicle; and initiating, by the device and in response to a determination that the electronic alert indicates that the unsafe driving condition is located along the road ahead of the vehicle, one or more electronic actions based on the unsafe driving condition.

Clause 50: The computer-implemented method of any preceding clause, wherein the one or more electronic actions comprise: rendering, by the device and on an electronic navigation display of the vehicle, a graphical representation of the unsafe driving condition.

Clause 51: The computer-implemented method of any preceding clause, wherein the one or more electronic actions comprise: updating, by the device, an electronic navigation route of the vehicle, such that the updated electronic navigation route avoids the unsafe driving condition.

Clause 52: The computer-implemented method of any preceding clause, wherein the one or more electronic actions comprise: causing, by the device, the vehicle to decelerate or change lanes when passing the unsafe driving condition.

Clause 53: The computer-implemented method of any preceding clause, wherein the electronic alert indicates roadside data captured by one or more sensors of the another vehicle, wherein the electronic alert indicates that the another vehicle localized the unsafe driving condition by executing a first deep learning neural network on the roadside data, and wherein the one or more electronic actions comprise: verifying, by the device, such localization by executing a second deep learning neural network on the roadside data.

Clause 54: The computer-implemented method of any preceding clause, wherein the electronic alert specifies a roadside position at which the unsafe driving condition was localized by the another vehicle, and wherein the one or more electronic actions comprise: capturing, by the device and via one or more sensors of the vehicle, roadside data as the vehicle passes the roadside position; and confirming, by the device, whether the unsafe driving condition is still present at the roadside position by executing a deep learning neural network on the roadside data.

Clause 55: The computer-implemented method of any preceding clause, wherein the deep learning neural network localizes the unsafe driving condition based on the roadside data, and wherein the one or more electronic actions further comprise: broadcasting, by the device and to the another vehicle via the peer-to-peer communication link, an electronic reply indicating that the unsafe driving condition is still present at the roadside position.

Clause 56: The computer-implemented method of any preceding clause, wherein the deep learning neural network fails to localize the unsafe driving condition based on the roadside data, and wherein the one or more electronic actions further comprise: broadcasting, by the device and to the another vehicle via the peer-to-peer communication link, an electronic reply indicating that the unsafe driving condition is no longer present at the roadside position.

In various cases, any suitable combination or combinations of clauses 49 to 56 can be implemented.

Clause 57: A computer program product for facilitating peer-to-peer vehicular provision of artificially intelligent traffic analysis, the computer program product comprising a non-transitory computer-readable memory having program instructions embodied therewith, the program instructions executable by a processor onboard a vehicle traveling on a road to cause the processor to: receive, via a peer-to-peer communication link, an electronic alert broadcasted by another vehicle traveling on the road; determine, via parsing, whether the electronic alert indicates that an unsafe driving condition is located along the road ahead of the vehicle; and initiate, in response to a determination that the electronic alert indicates that the unsafe driving condition is located along the road ahead of the vehicle, one or more electronic actions based on the unsafe driving condition.

Clause 58: The computer program product of any preceding clause, wherein the processor renders, on an electronic navigation display of the vehicle, a graphical representation of the unsafe driving condition.

Clause 59: The computer program product of any preceding clause, wherein the processor updates an electronic navigation route of the vehicle, such that the updated electronic navigation route avoids the unsafe driving condition.

Clause 60: The computer program product of any preceding clause, wherein the processor causes the vehicle to decelerate or change lanes when passing the unsafe driving condition.

In various cases, any suitable combination or combinations of clauses 57 to 60 can be implemented.

In various cases, any suitable combination or combinations of clauses 1 to 60 can be implemented.

What is claimed is:

1. A system of a first vehicle, the system comprising:
a memory that stores computer executable components; and
a processor that executes at least one of the computer-executable components that:
captures, via at least one sensor of the first vehicle, raw data associated with a road on which the first vehicle is traveling, wherein the at least one sensor comprises at least one of an image sensor or a sound sensor;
generates, using a first deep learning neural network of the first vehicle on the raw data, an output comprising a classification label, a bounding box, and a pixel-wise segmentation mask localizing an unsafe driving condition along the road;
transmits, via a peer-to-peer communication link between the first vehicle and a second vehicle traveling on the road, an electronic alert to the second vehicle based on the unsafe driving condition, wherein the electronic alert comprises the raw data, the classification label, the bounding box, and the pixel-wise segmentation mask localizing the unsafe driving condition along the road; and
receiving, via the peer-to-peer communication link, from the second vehicle, based on an output generated from a second deep learning neural network of the second vehicle using the raw data, the classification label, the bounding box, and the pixel-wise segmentation mask from the first vehicle, an indication of whether the unsafe driving condition was verified by the second deep learning neural network of the second vehicle.

2. The system of claim 1, wherein the electronic alert comprises a geolocation stamp recorded by a global positioning sensor or a wi-fi positioning sensor of the first vehicle, and wherein the geolocation stamp indicates a roadside position along the road at which the unsafe driving condition is located.

3. The system of claim 2, wherein the electronic alert indicates that the unsafe driving condition is in one or more lanes of the road at the roadside position indicated by the geolocation stamp, and wherein the electronic alert recommends that the one or more lanes be avoided when passing the roadside position.

4. The system of claim 2, wherein the electronic alert indicates that the unsafe driving condition is in or outside a shoulder of the road at the roadside position indicated by the geolocation stamp, and wherein the electronic alert recommends that caution be exercised when passing the roadside position.

5. The system of claim 1, wherein the electronic alert comprises a timestamp recorded by a clock of the first vehicle, and wherein the timestamp indicates when the unsafe driving condition was localized by the first vehicle.

6. The system of claim 1, wherein the at least one sensor comprises the audio sensor, the raw data comprises sounds associated with the road, and wherein the first deep learning neural network, using the sounds:
determines that an object that has fallen onto the road; and
based on a sound associated with the object falling onto the road, identifies a type of the object, wherein the unsafe driving condition comprises the object that has fallen on the road.

7. The system of claim 1, wherein the electronic alert comprises an identifier associated with the first vehicle, and wherein the identifier comprises at least one of a license plate of the first vehicle, a first name of an owner of the first vehicle, a first address of the owner of the first vehicle, a second name of a current driver of the first vehicle, or a second address of the current driver of the first vehicle.

8. The system of claim 1, wherein the object is a fallen rock, a fallen power line, or a fallen tree branch.

9. The system of claim 1, wherein the object is furniture that has fallen off of another vehicle on the road or a damaged tired that has fallen off of another vehicle on the road.

10. A computer-implemented method, comprising:
capturing, by a system of a first vehicle, via at least one sensor of the first vehicle, data associated with a road on which the first vehicle is traveling, wherein the at least one sensor comprises at least one of an image sensor or a sound sensor;
generating, by the system, using a first deep learning neural network of the first vehicle on the raw data, an output comprising a classification label, a bounding box, and a pixel-wise segmentation mask localizing an unsafe driving condition along the road;
transmitting, by the system, via a peer-to-peer communication link between the first vehicle and a second vehicle traveling on the road, an electronic alert to the second vehicle based on the unsafe driving condition, wherein the electronic alert comprises the raw data, the classification label, the bounding box, and the pixel-wise segmentation mask localizing the unsafe driving condition along the road; and
receiving, by the system, via the peer-to-peer communication link, from the second vehicle, based on an output generated from a second deep learning neural network of the second vehicle using the raw data, the classification label, the bounding box, and the pixel-wise segmentation mask from the first vehicle, an indication of whether the unsafe driving condition was verified by the second deep learning neural network of the second vehicle.

11. The computer-implemented method of claim 10, wherein the electronic alert comprises a geolocation stamp recorded by a global positioning sensor or a wi-fi positioning sensor of the first vehicle, and wherein the geolocation stamp indicates a roadside position along the road at which the unsafe driving condition is located.

12. The computer-implemented method of claim 11, wherein the electronic alert indicates that the unsafe driving condition is in one or more lanes of the road at the roadside position indicated by the geolocation stamp, and wherein the electronic alert recommends that the one or more lanes be avoided when passing the roadside position.

13. The computer-implemented method of claim 11, wherein the electronic alert indicates that the unsafe driving condition is in or outside a shoulder of the road at the roadside position indicated by the geolocation stamp, and wherein the electronic alert recommends that caution be exercised when passing the roadside position.

14. The computer-implemented method of claim 10, wherein the electronic alert comprises a timestamp recorded by a clock of the first vehicle, and wherein the timestamp indicates when the unsafe driving condition was localized by the first vehicle.

15. The computer-implemented method of claim 10, wherein the electronic alert comprises an identifier associated with the first vehicle, and wherein the identifier comprises at least one of a license plate of the first vehicle, a first name of an owner of the first vehicle, a first address of the owner of the first vehicle, a second name of a current driver of the first vehicle, or a second address of the current driver of the first vehicle.

16. A computer program product for facilitating peer-to-peer vehicular provision of artificially intelligent traffic analysis, the computer program product comprising a non-transitory computer-readable memory having program instructions embodied therewith, the program instructions executable by a processor of a first vehicle to cause the processor to:
capture, via at least one sensor of the first vehicle, raw data associated with a road on which the first vehicle is traveling, wherein the at least one sensor comprises at least one of an image sensor or a sound sensor;
generate, using first deep learning neural network of the first vehicle on the raw data, an output comprising a classification label, a bounding box, and a pixel-wise segmentation mask localizing an unsafe driving condition along the road;
transmit, via a peer-to-peer communication link between the first vehicle and a second vehicle traveling on the road, an electronic alert to the second vehicle based on the unsafe driving condition, wherein the electronic alert comprises the raw data, the classification label, the bounding box, and the pixel-wise segmentation mask localizing the unsafe driving condition along the road; and
receive, via the peer-to-peer communication link, from the second vehicle, based on an output generated from a second deep learning neural network of the second vehicle using the raw data, the classification label, the bounding box, and the pixel-wise segmentation mask from the first vehicle, an indication of whether the unsafe driving condition was verified by the second deep learning neural network of the second vehicle.

17. The computer program product of claim 16, wherein the electronic alert comprises a geolocation stamp recorded by a global positioning sensor or a wi-fi positioning sensor of the first vehicle, and wherein the geolocation stamp indicates a roadside position along the road at which the unsafe driving condition is located.

18. The computer program product of claim 17, wherein the electronic alert indicates that the unsafe driving condition is in one or more lanes of the road at the roadside position indicated by the geolocation stamp, and wherein the electronic alert recommends that the one or more lanes be avoided when passing the roadside position.

19. The computer program product of claim 17, wherein the electronic alert indicates that the unsafe driving condition is in or outside a shoulder of the road at the roadside position indicated by the geolocation stamp, and wherein the electronic alert recommends that caution be exercised when passing the roadside position.

20. The computer program product of claim 16, wherein the electronic alert comprises a timestamp recorded by a clock of the first vehicle, and wherein the timestamp indicates when the unsafe driving condition was localized by the first vehicle.

* * * * *